United States Patent [19]

Childress et al.

[11] 4,122,496
[45] Oct. 24, 1978

[54] APPARATUS AND METHOD FOR DIGITAL HALFTONE REPRODUCTION

[75] Inventors: Lorenza Steward Childress, New Paltz; Thomas Edward Gagnon, Kingston; Donald Russell Thompson, Woodstock; Larry Reed Zucker, Saugerties, all of N.Y.

[73] Assignee: International Business Machines Corporation, Armonk, N.Y.

[21] Appl. No.: 771,271

[22] Filed: Feb. 23, 1977

[51] Int. Cl.$^2$ .............................................. H04N 1/40
[52] U.S. Cl. ..................................... 358/298; 358/283
[58] Field of Search ............................... 358/298, 283

[56] References Cited

U.S. PATENT DOCUMENTS

| 3,646,262 | 2/1972 | Moe | 358/283 |
|---|---|---|---|
| 4,032,978 | 6/1977 | Wong | 358/298 |

OTHER PUBLICATIONS

IBM Technical Disclosure Bulletin, vol. 18, No. 3, 8-75, pp. 914–917.

*Primary Examiner*—John H. Wolff

*Attorney, Agent, or Firm*—Edwin Lester

[57] ABSTRACT

Apparatus and method of producing a halftone image reproduction of a continuous tone photograph. Scanning means is provided to scan the photograph to be reproduced along a series of scan lines. Incremental control parameters are provided in accordance with a reproduction ratio to define predetermined scan sample points for each scan line. Control means is provided for controlling the scanning means to produce successive sets of digital sharp and unsharp gray level data signals at the predetermined scan sample points proportional to the light reflected from successive concentric sharp and unsharp areas with the sharp area at each scan sample point corresponding to the general area of a predetermined portion of a halftone cell. The successive sets of digital sharp and unsharp gray level data signals are combined in accordance with a sharpness factor having a predetermined value in accordance with the original image being scanned to produce a succession of digital resultant gray level data signals which are processed into halftone digital data signals and applied to a photosensitive material to produce a halftone image reproduction of the continuous tone original photograph.

20 Claims, 70 Drawing Figures

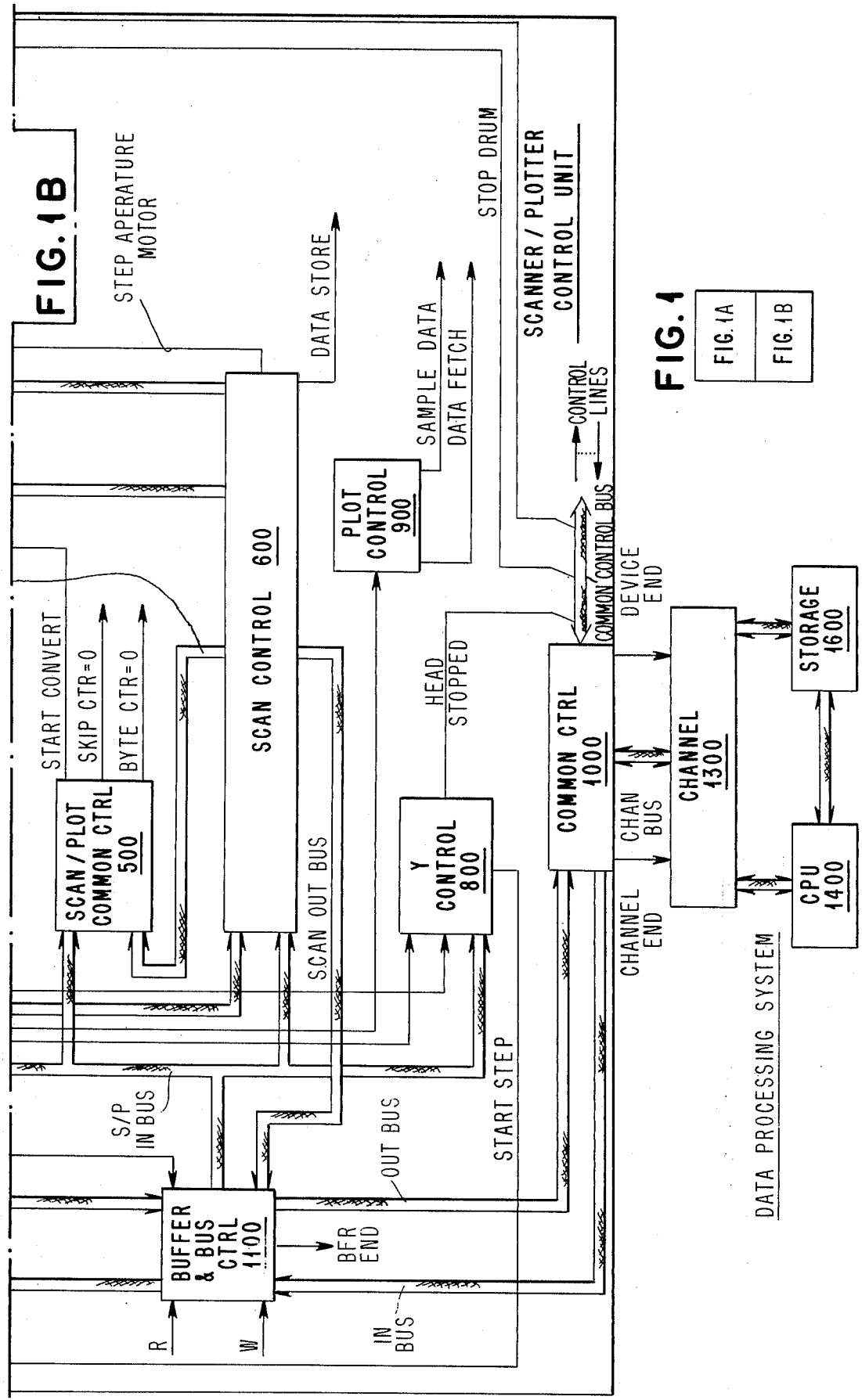

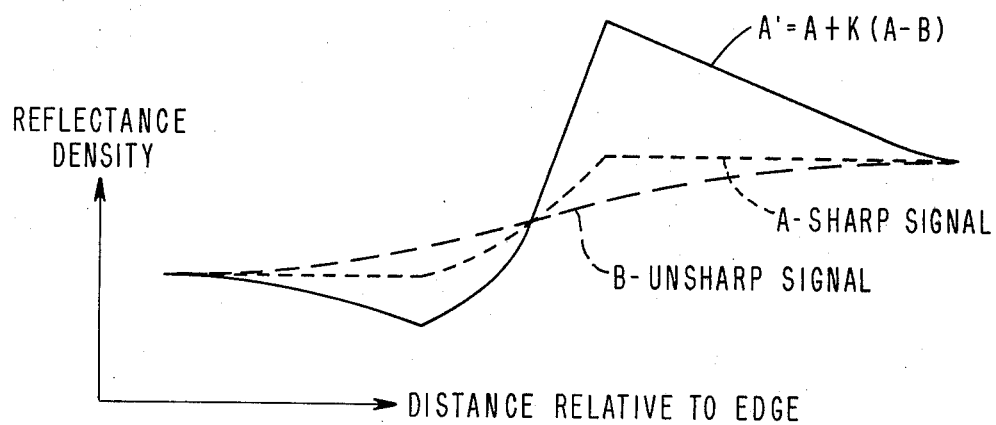

SINGLE SAMPLE / HALFTONE CELL

QUADRANT SAMPLING / HALFTONE CELL K=0

QUADRANT SAMPLING / HALFTONE CELL K=3

NORMAL-POSITIVE

NORMAL-NEGATIVE

MIRROR-POSITIVE

MIRROR-NEGATIVE

FIG.17  CONTROL SET UP
CONTROL SET UP COMMAND
CCW
| CMD | DATA ADR | FLG | COUNT |
|-----|----------|-----|-------|
| 47  |          |     | 5     |
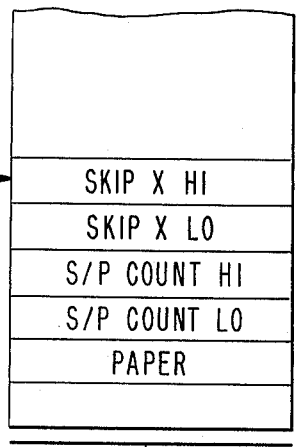
```
SKIP X HI
SKIP X LO
S/P COUNT HI
S/P COUNT LO
PAPER
```
| ISS | DATA XFER |
|-----|-----------|
|     |        CE |
|     |        DE |
| 0 | SKIP X HI | | | | | | |
|---|---|---|---|---|---|---|---|
| | ✕ | ✕ | 8192 | 4096 | 2048 | 1024 | 512 | 256 |
| | 0 | 1 | 2 | 3 | 4 | 5 | 6 | 7 |
| 1 | SKIP X LO | | | | | | |
|---|---|---|---|---|---|---|---|
| | 128 | 64 | 32 | 16 | 8 | 4 | 2 | 1 |
| | 0 | 1 | 2 | 3 | 4 | 5 | 6 | 7 |
| 2 | SCAN/PLOT COUNT HI | | | | | | |
|---|---|---|---|---|---|---|---|
| | ✕ | ✕ | ✕ | 4096 | 2048 | 1024 | 512 | 256 |
| | 0 | 1 | 2 | 3 | 4 | 5 | 6 | 7 |
| 3 | SCAN/PLOT COUNT LO | | | | | | |
|---|---|---|---|---|---|---|---|
| | 128 | 64 | 32 | 16 | 8 | 4 | 2 | 1 |
| | 0 | 1 | 2 | 3 | 4 | 5 | 6 | 7 |
| 4 | PAPER | | | | | | |
|---|---|---|---|---|---|---|---|
| | ✕ | ✕ | ✕ | ✱ | ✕ | ✕ | ✕ | ✕ |
| | 0 | 1 | 2 | 3 | 4 | 5 | 6 | 7 |
✱  0 = FILM
   1 = PAPER

FIG.18 CONTROL SET REPRO CMD OPERATION
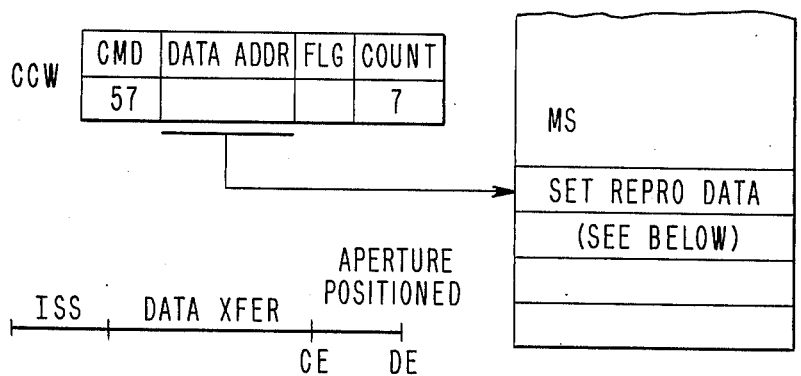

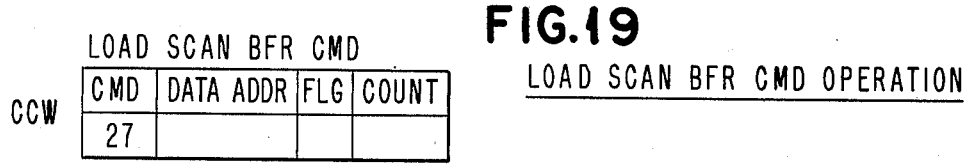
FIG.19 LOAD SCAN BFR CMD OPERATION
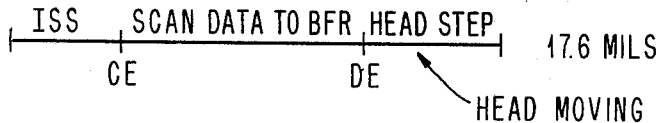
FIG.20
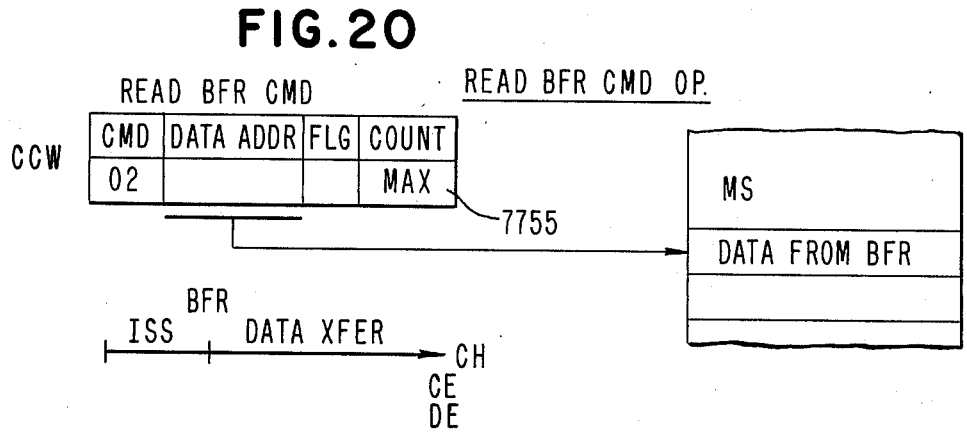
FIG.21
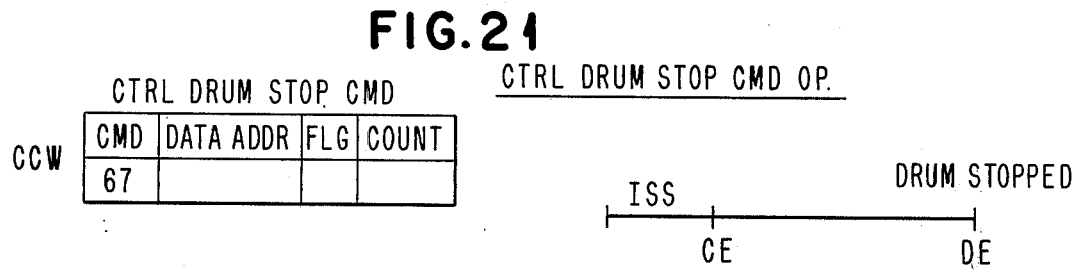
FIG.22
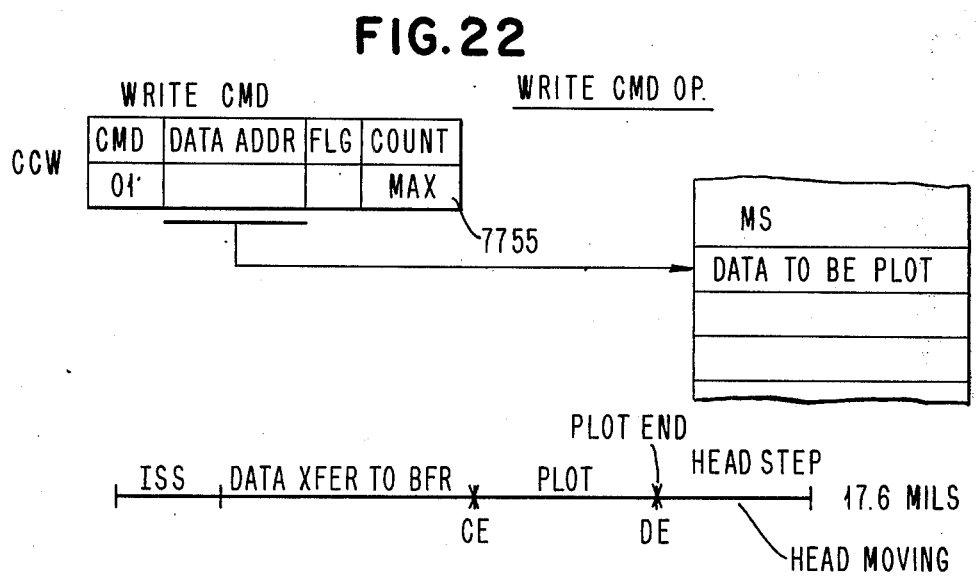

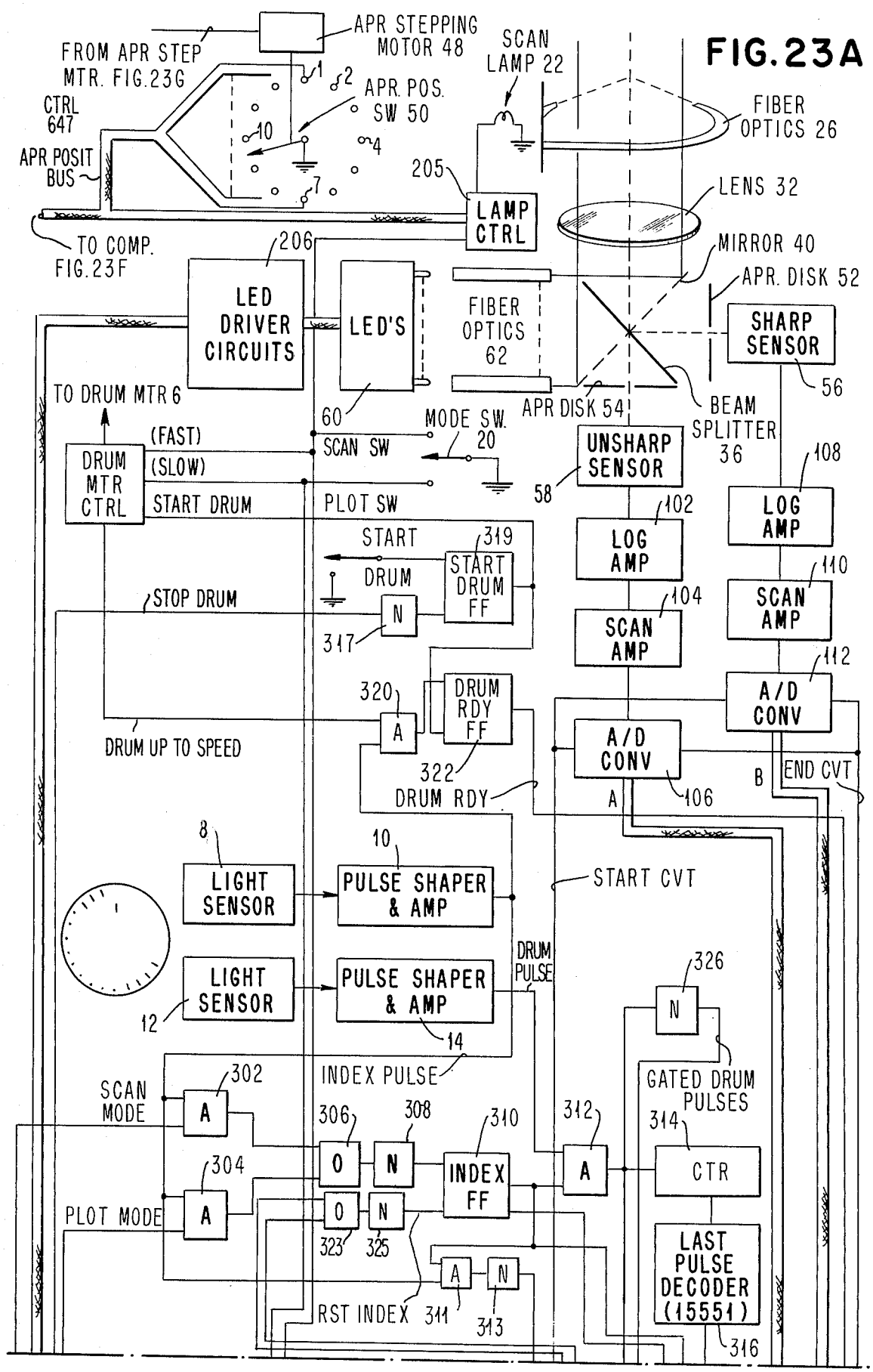

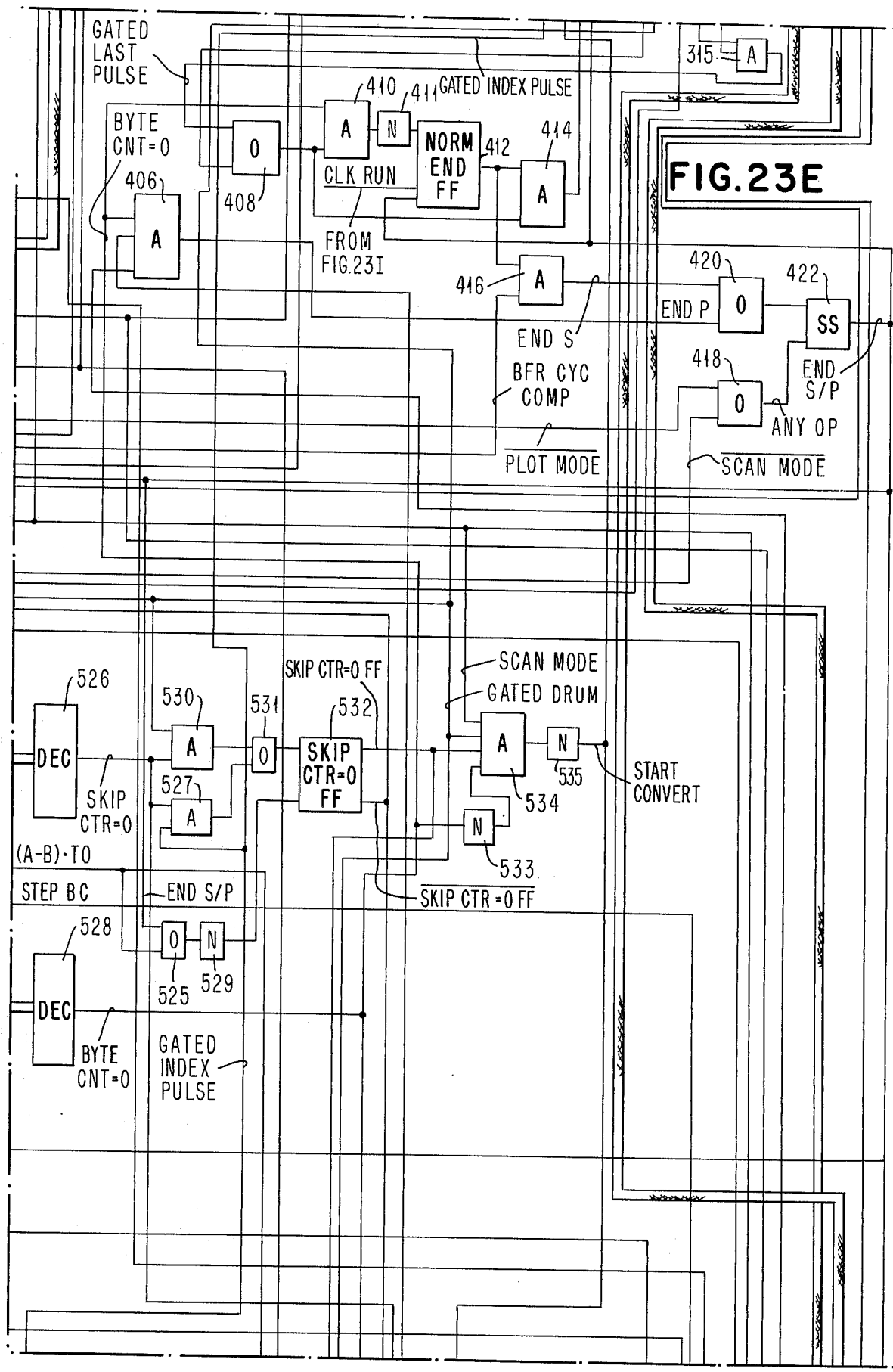

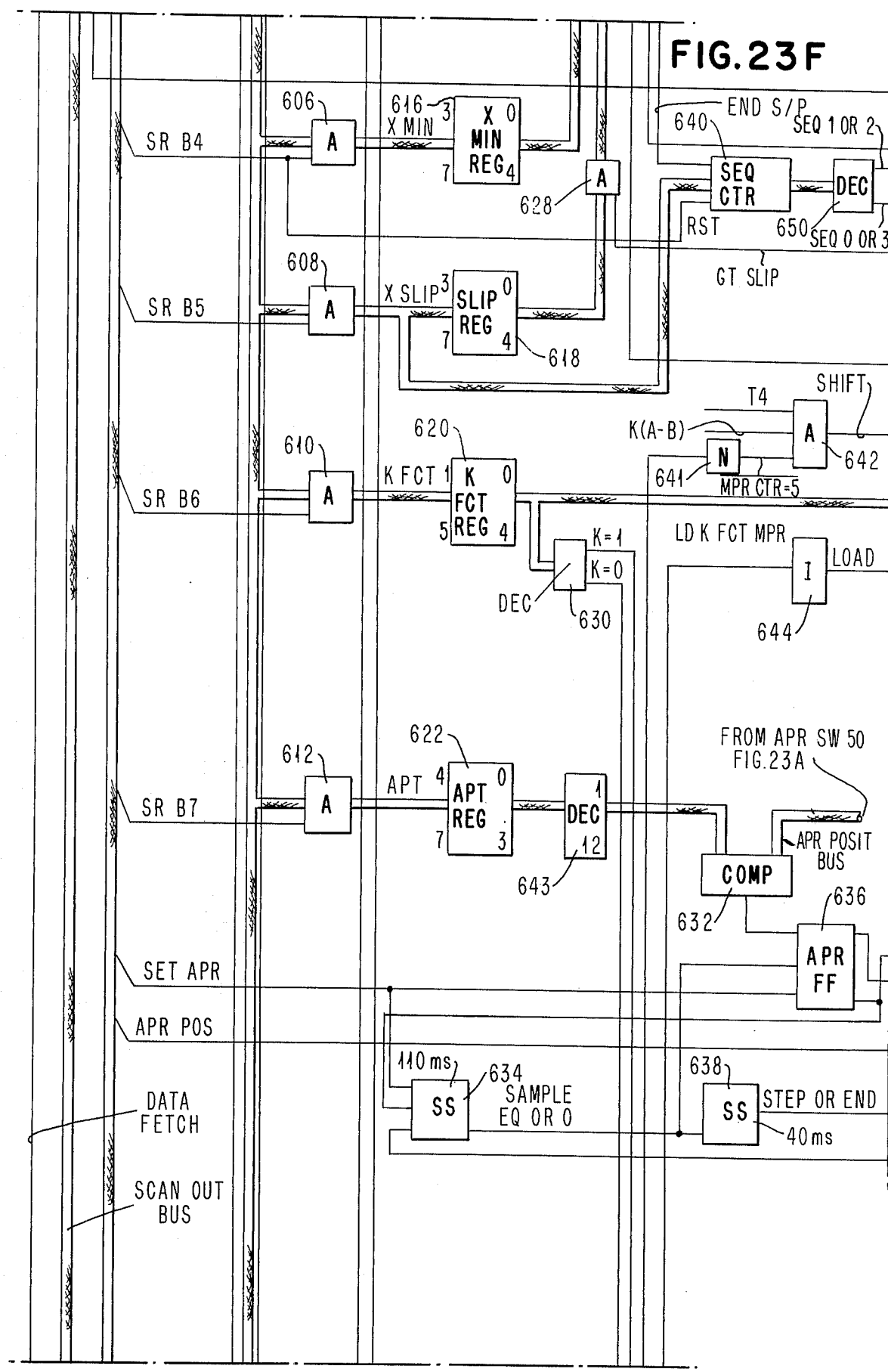

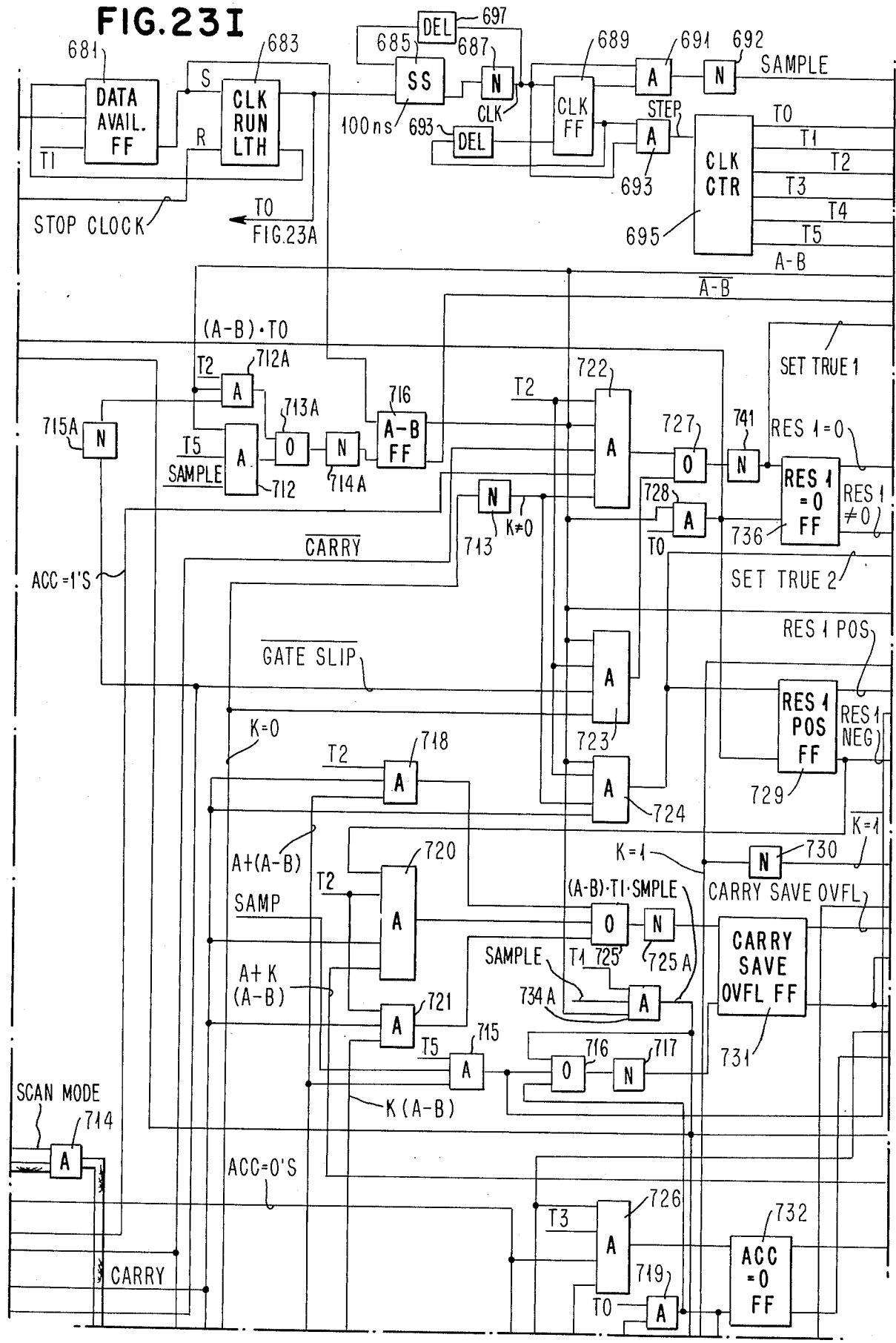

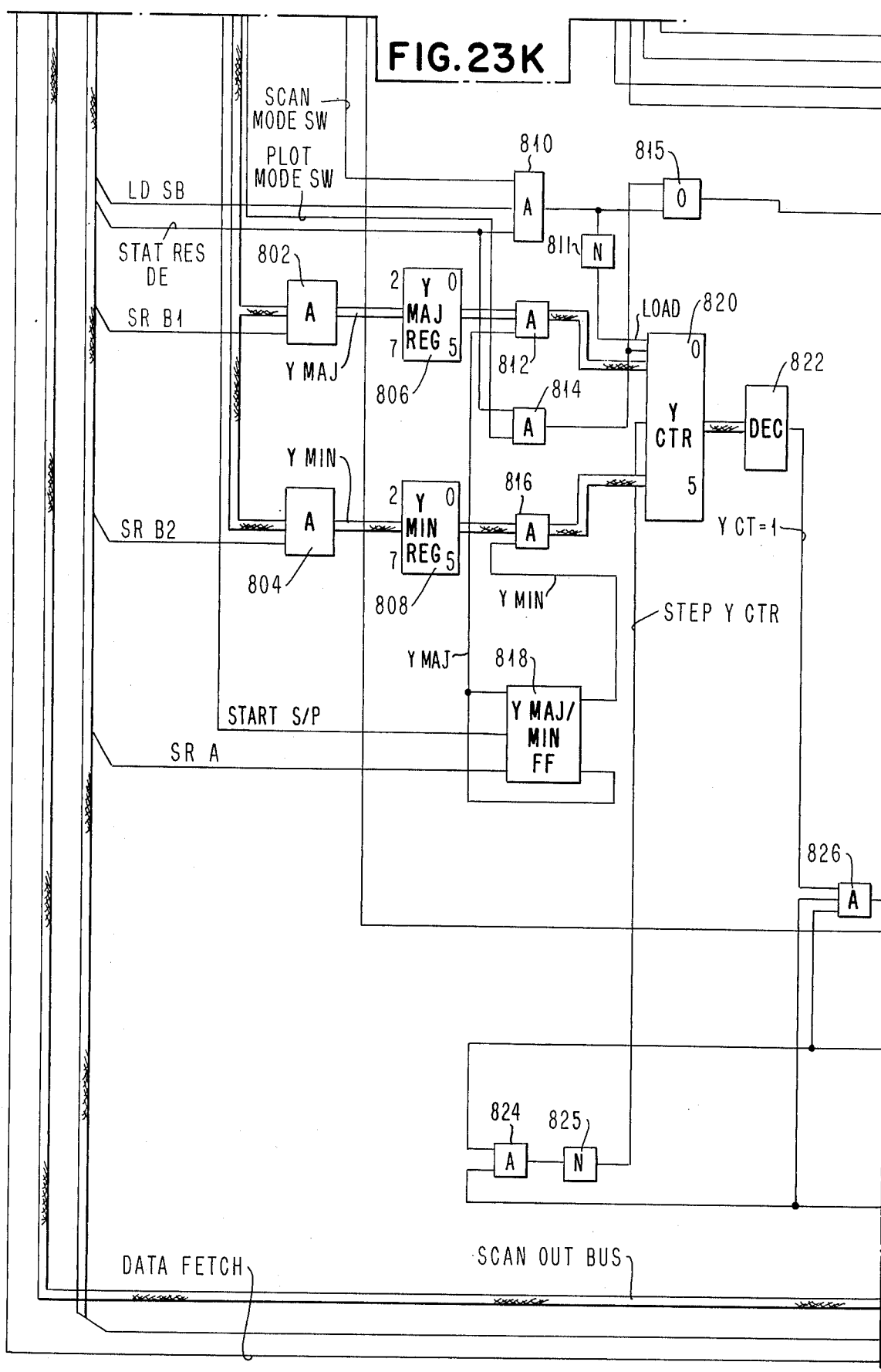

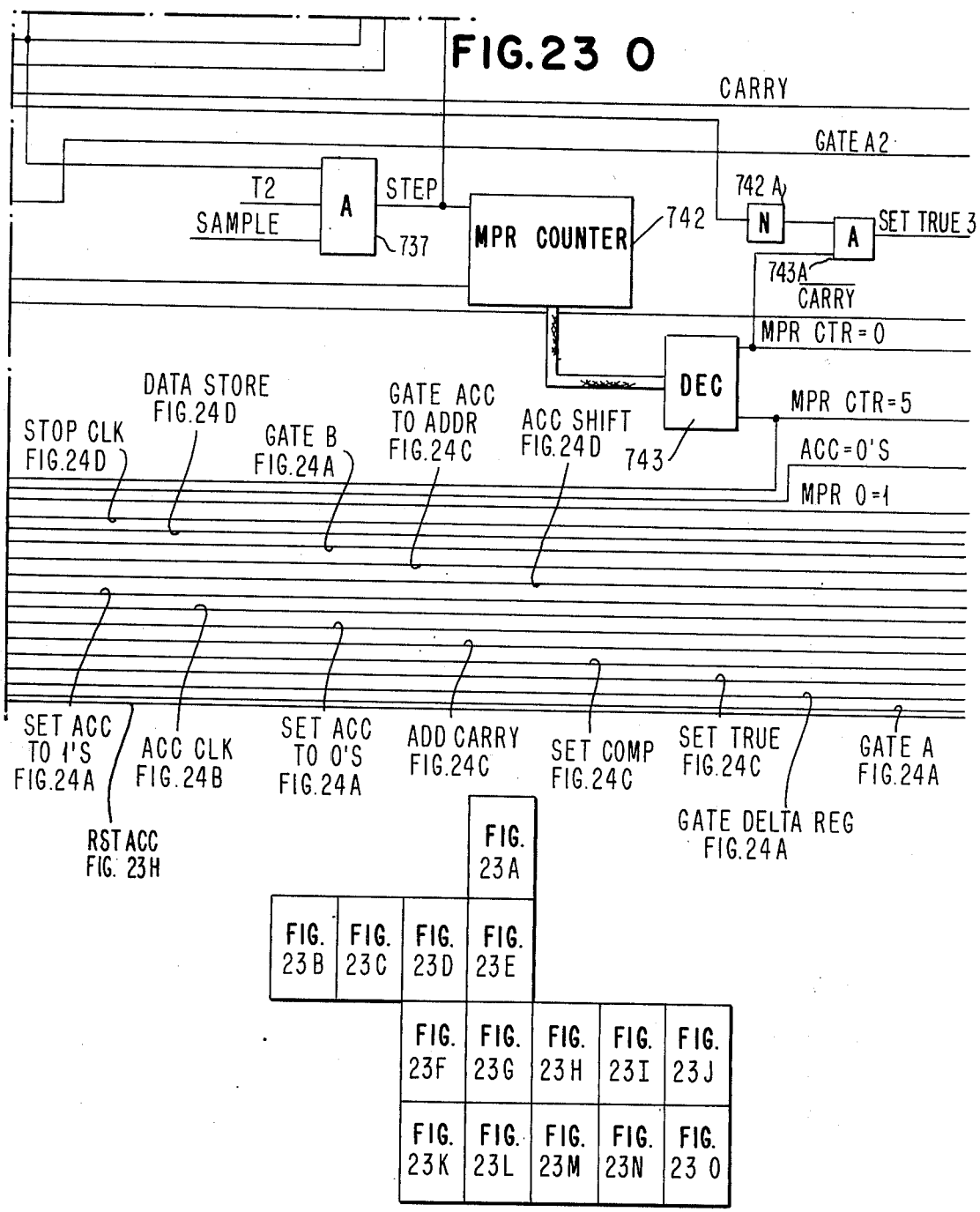

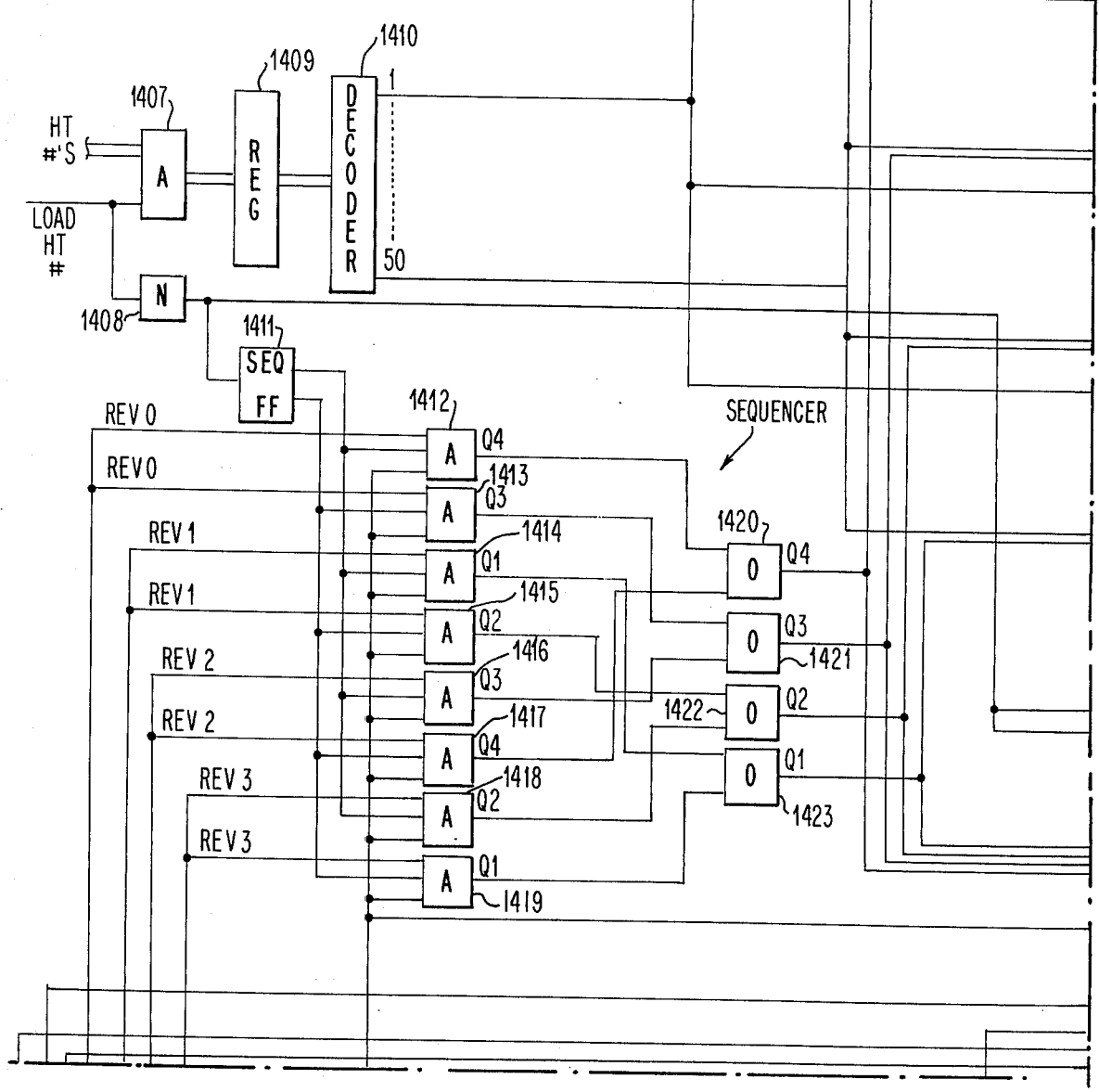

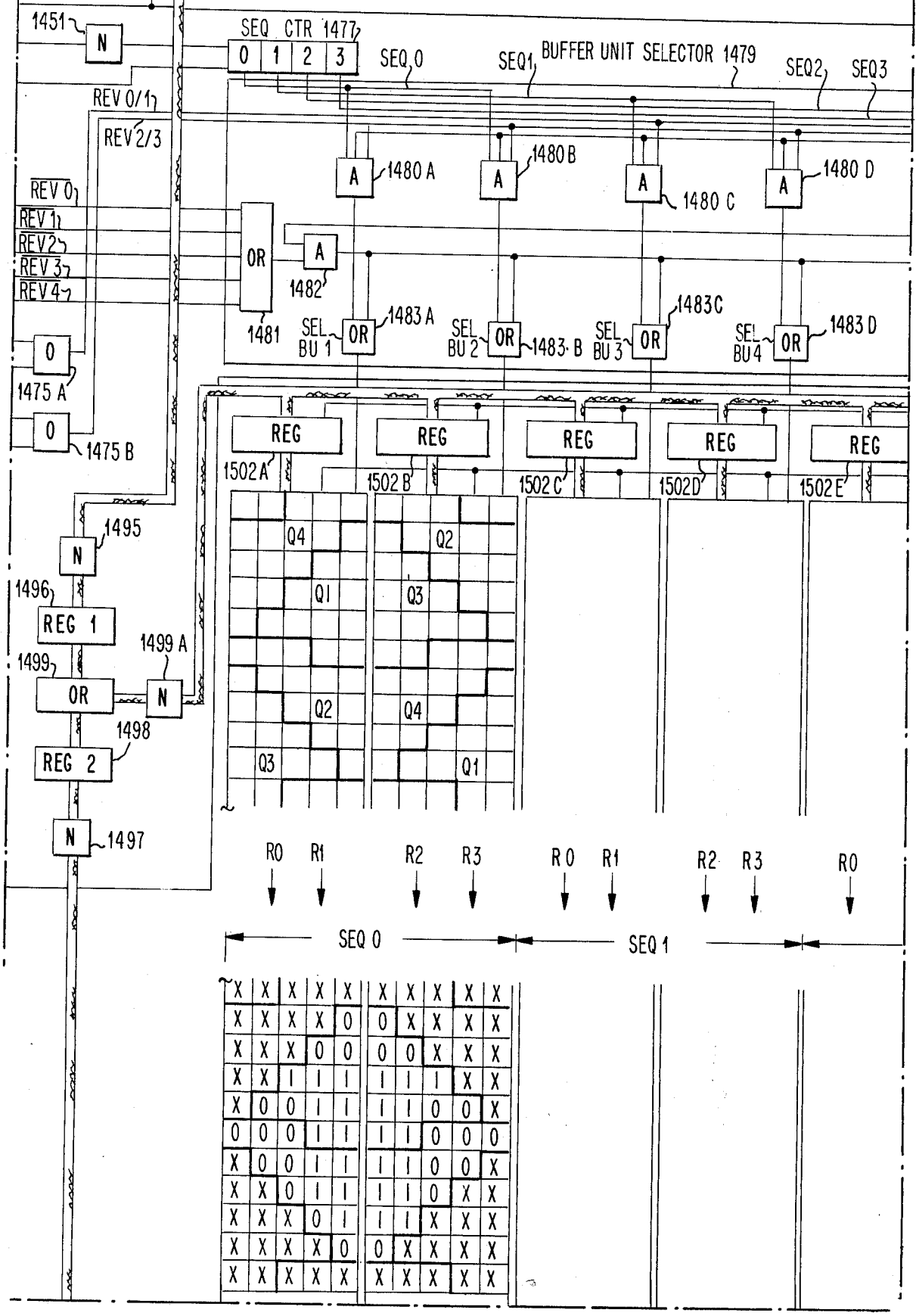

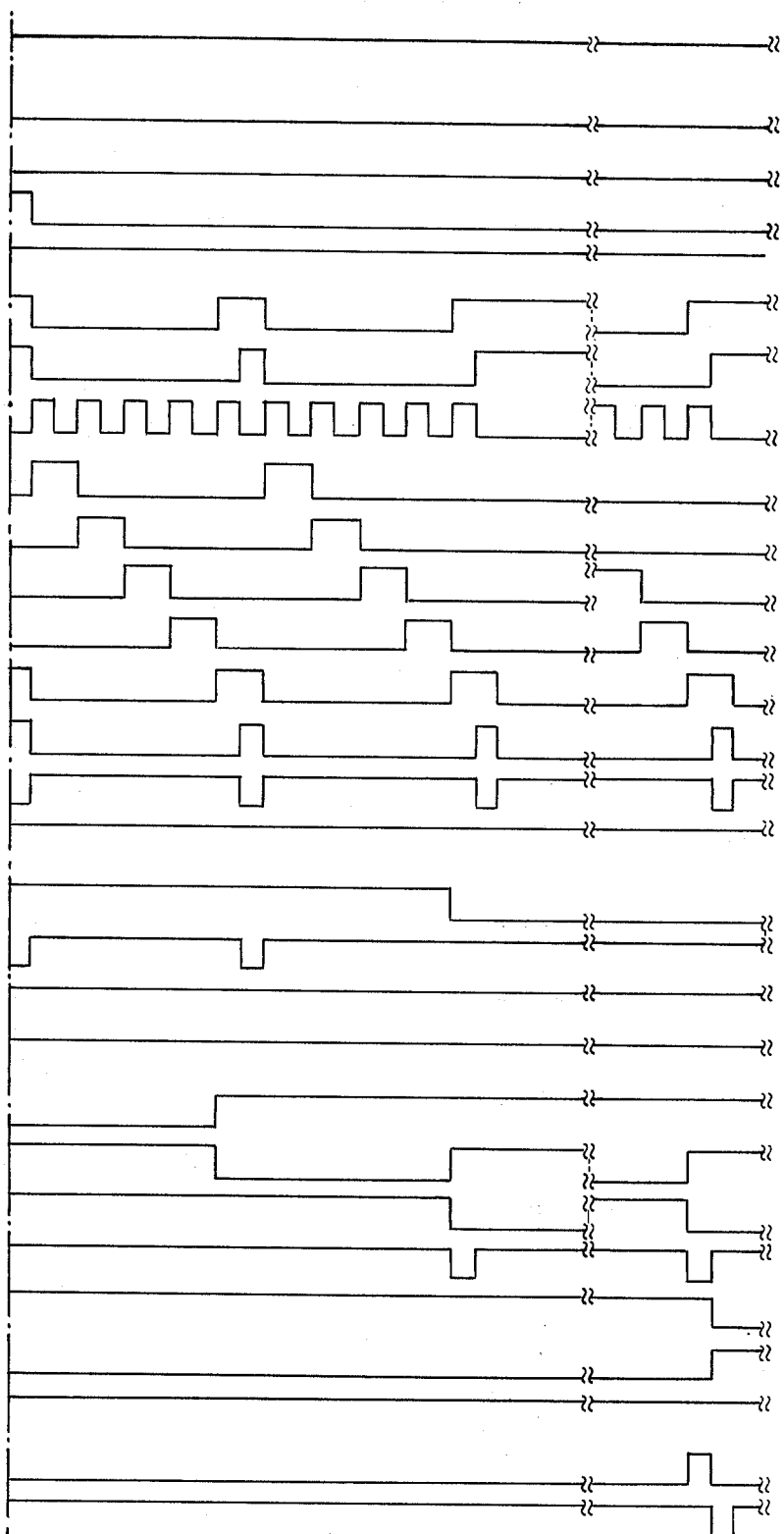
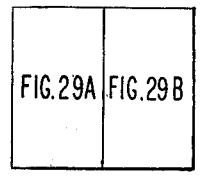
FIG. 29
FIG. 29B

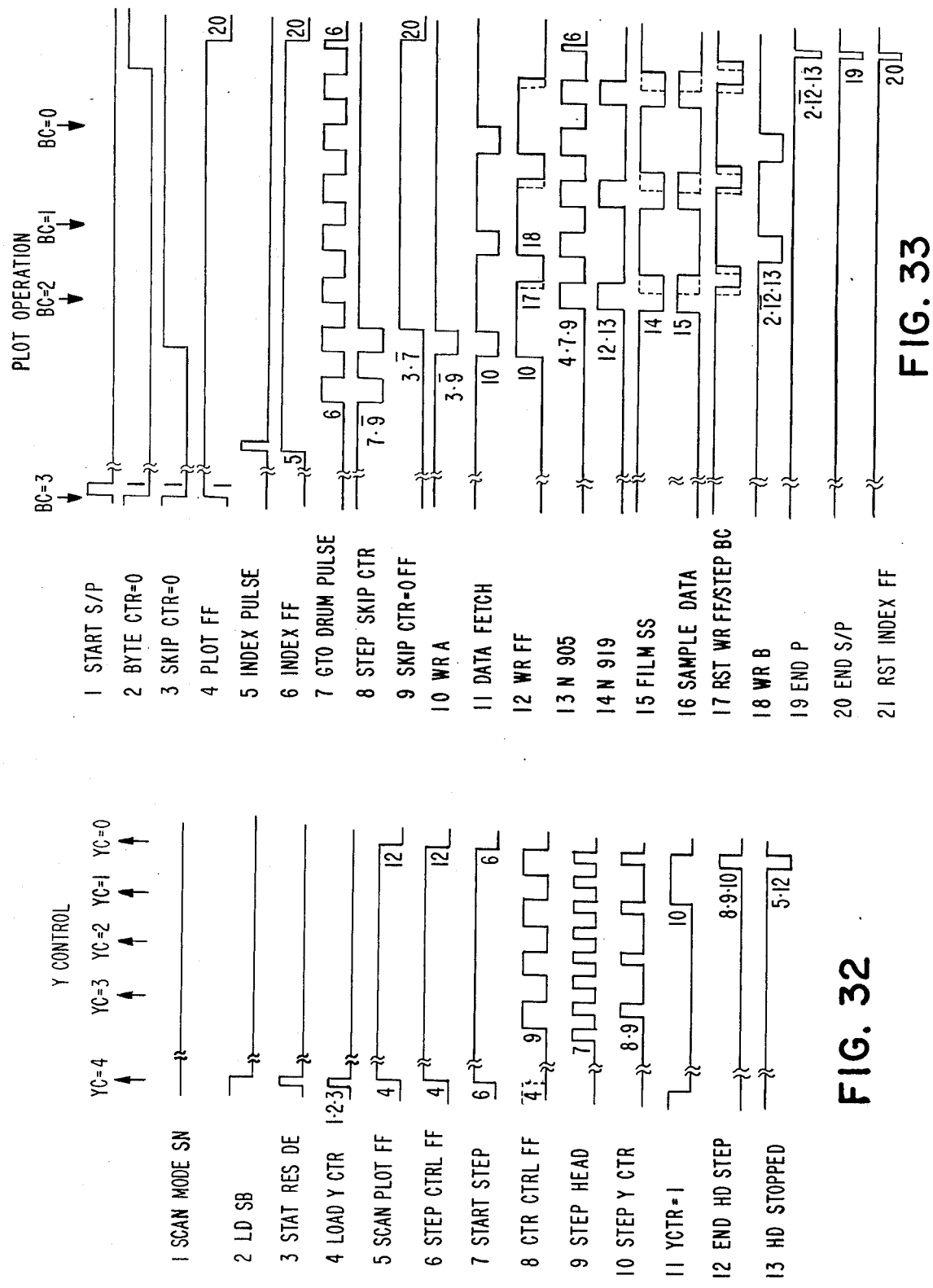

APPARATUS AND METHOD FOR DIGITAL HALFTONE REPRODUCTION

BACKGROUND OF THE INVENTION

This invention relates to an image reproduction system and, more particularly, to a digital system for producing a halftone image reproduction of a continuous tone original image.

Halftone reproduction methods have heretofore utilized a technique in which a continuous tone photograph is reproduced through a halftone screen upon a high contrast photosensitive material. The screen may be made of two sheets of glass, each covered with black lines, and oriented so that the black lines on one are at right angles to the lines on the other. The screen permits light to pass only through the spaces between the lines so that the light is broken into tiny dots, the size of each of which is proportional to the amount of light reflected from the various tones in the original picture. The reflected light passing through the screen is photographed on a high contrast photosensitive material which is then developed, transferred to an engraving plate which is then etched by standard photo engraving techniques to produce a metal plate ready for printing. Another conventional and currently more popular camera screen halftone technique is to replace the ruled glass screen with a contact screen which allows for better brightness distribution. Both of these techniques require considerable amount of camera work artistry, opto-mechanical expertise and a great deal of processing labor in order to produce high quality halftone reproductions.

The advent of modern day electronic photocomposition systems in the printing and publishing industry has produced devices which are capable of high speed production of justified copy on photographic materials ready for flat engraving or paste up for letter press or lithographic reproduction. However, these photocomposers have limited capability and do not completely satisfy the need for high speed full page newspaper production, mainly because of the inability of these systems to include continuous tone graphics in their format. Much work has been done in an attempt to produce electronic halftones which are quality competitive with original camera-screened halftones and compatible with a text composing system. However, the various techniques proposed have yet to produce a halftone quality which is competitive with the camera-screening technique.

SUMMARY OF THE INVENTION

Accordingly, it is an object of the invention to provide high quality electronic halftone image reproduction of a continuous tone photograph.

Another object of the invention is to provide electronic halftones which are compatible with text photocomposing systems.

In accordance with the invention, a scanner/plotter system is provided for producing a halftone image reproduction of a continuous tone original image. Scanning means is provided to scan the original image along a series of scan lines. A set of incremental control parameters is provided in accordance with a reproduction ratio which may vary from an enlargement to a reduction of the original image. The set of incremental control parameters define predetermined scan sample points at which scan samples are taken. Control means is provided for controlling the scanning means to produce successive sets of digital sharp and unsharp gray level data signals at the predetermined scan sample points proportional to the light reflective density of successive sets of concentric sharp and unsharp elemental areas with the sharp area at each scan sample point corresponding to the general area of a predetermined portion of a halftone cell to be reproduced. The successive sets of digital sharp and unsharp gray level data signals are then combined in a predetermined manner to produce a succession of digital resultant gray level data signals. The digital resultant gray level data signals are then processed into halftone data signals and applied to a photosensitive material for producing a halftone image reproduction corresponding to the continuous tone original image.

An advantage of this technique of electronic halftone reproduction is the ability to control the halftone dot shape independent of the halftone cell shape by dividing the normal halftone cell geometry into a predetermined number of areas thereby permitting a halftone reproduction to be produced, the quality of which is competitive with the conventional camera screen halftone.

Another advantage of this technique of electronic halftone reproduction is the addition of controllable unsharp masking for each sharp area resulting in a sharpness enhanced output which further improves the quality of the halftone reproduction.

Still another advantage of this reproduction system is the conversion of resultant gray level value data to halftone data which is compatible in format with text data.

The foregoing and other objects, features and advantages of the invention will be apparent from the following more particular description of the preferred embodiment of the invention, as illustrated in the accompanying drawings.

BRIEF DESCRIPTION OF THE DRAWINGS

FIG. 1 is a diagram of how FIGS. 1A and 1B may be placed to form a composite block diagram.

FIGS. 1A and 1B, taken together, comprise a block diagram of the scanner/plotter system of the present invention.

FIG. 6 illustrates edge enhancement and the extent of edge enhancement.

FIG. 6B illustrates in graphic form the course of brightness resulting from the sharp area A and from the unsharp area B in close proximity to both sides of the demarcation line.

FIG. 6C illustrates in graphic form the variation of tone density as influenced by different sharpness factor values.

FIG. 16 illustrates the various plot options.

FIG. 17 illustrates the format of a control set up command, the format of the control bytes associated with that command and a timing diagram of the execution of the command.

FIG. 18 illustrates the format of a control set repro command, the format of control bytes associated with that command and a timing diagram of the execution of the command.

FIG. 19 illustrates the format of a load scan buffer command and a timing diagram of the execution of the command.

FIG. 20 illustrates the format of a read buffer command and a timing diagram of the execution of the command.

FIG. 21 illustrates the format of the control drum stop command and a timing diagram of the execution of the command.

FIG. 22 illustrates the format of a write command and a timing diagram of the execution of the command.

FIGS. 28A through 28J, taken together, comprise a detailed schematic diagram of the data processing apparatus of the present invention.

FIGS. 29A and 29B, taken together, comprise a timing diagram of a cycle of operation of the data processing apparatus for a write operation.

FIG. 32 comprises a timing diagram of a cycle of operation of the Y control.

FIG. 33 comprises a timing diagram of a cycle of operation of the scanner/plotter control unit during a plot operation.

The specific description of the invention will be developed with reference to the topics and subtopics noted in the following index of the subject matter of the present invention.

GENERAL DESCRIPTION OF SCANNER/PLOTTER SYSTEM

Figure 1A:
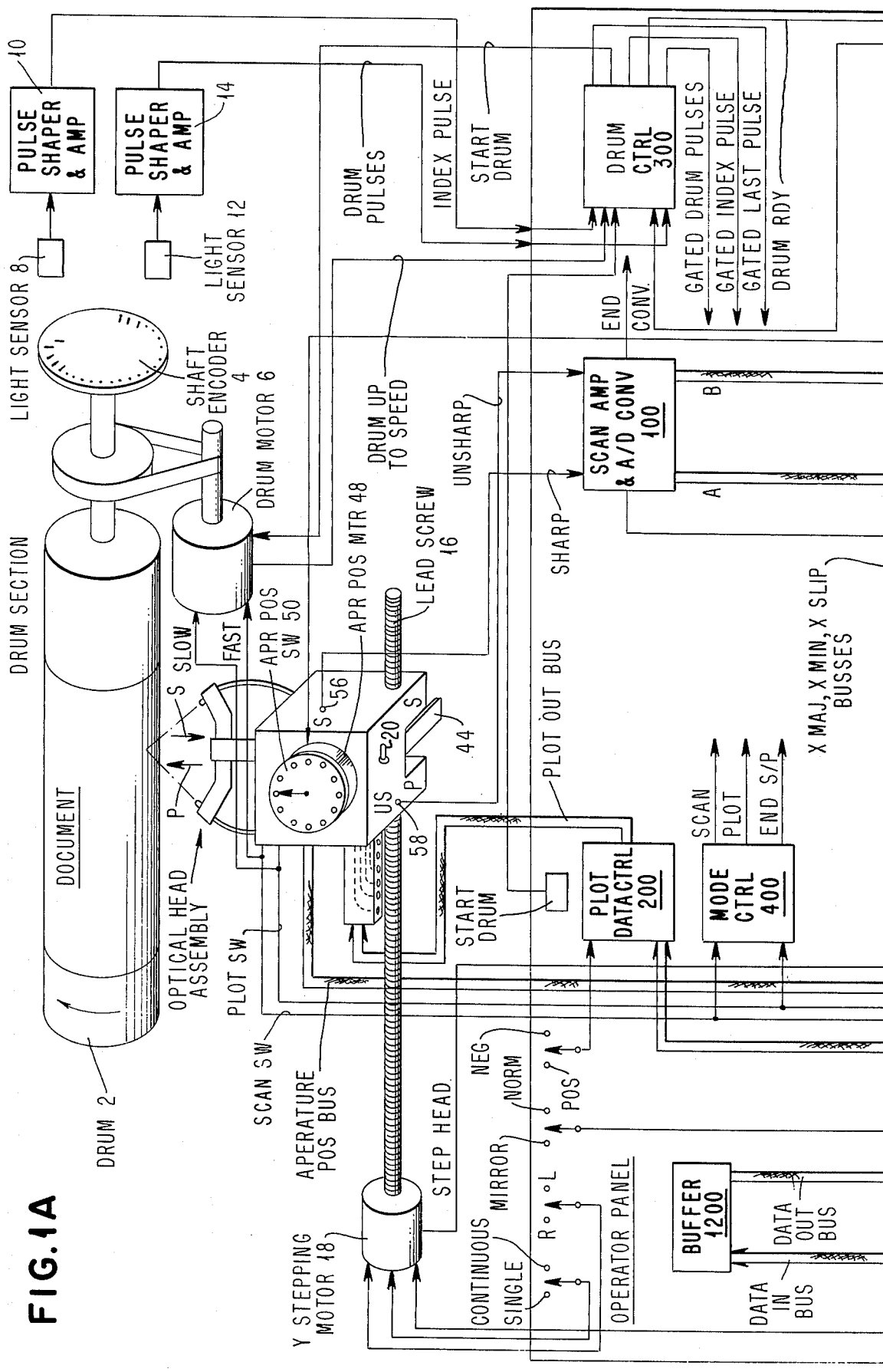

Referring to FIG. 1 there is shown a data flow block diagram of the scanner/plotter system including some of the more significant control lines. The system includes a drum section, an optical head assembly and scanner/plotter control unit connected to the channel of a Data Processing System.

The drum section includes drum 2 having a circumference of approximately 23.1 inches and a length of approximately 24 inches, shaft encoder 4, drum motor 6 and a belt pulley assembly to obtain the desired drum speed. Drum speed is pre-set and depends on the mode of operation. Nominal speed for scanning is 9.61 revolutions/second which, for the drum circumference of 23.1 inches, corresponds to a surface velocity of 222 (9.61 × 23.1) inches/second whereas nominal speed for plotting is 6.41 revolutions/second which, for the drum circumference of 23.1 inches, corresponds to a surface velocity of 148 (6.41 × 23.1) inches/second. The shaft encoder 4 is an optical disk mounted directly on the drum shaft and is provided with two tracks. One track includes 15,510 equally spaced black-white drum line pairs which are sensed by a light sensor 8, converted to electrical signals and passed to a pulse shaper and amplifier 10 to provide a train of 15,510 equally spaced drum pulses per revolution. The other track includes a single index black line preceding the first black drum line on the other track which is also sensed by a light sensor 12, converted to an electrical signal and passed to a pulse shaper and amplifier 14 to produce a single pulse, called the index pulse, once per revolution of the shaft encoder 4. This index signal enables the synchronization of the control unti logic with drum rotation and position.

The document to be scanned may consist of black and white continuous tone photos while the document to be plotted may consist of photographic film or photosensitive paper. The maximum scanable or plottable document area is 17.061 inches × 23.9888 inches. Scan operations require a coordinate system which enables identification of the position of documents in X and Y on the drum. For this purpose, a carrier sheet is required which may consist of any suitable grid frequency which is consistent with software requirements for interpreting document location. These carrier sheets can be mounted with documents at work stations and then carried to the drum for the scan operation. The carrier sheet with the document to be scanned or the document to be plotted is mounted on the drum surface by aligning the upper edge of the carrier sheet or document under a guidebar that runs the length of the drum. The document is held in place by a document hold down mechanism that may consist of registration pins and tension springs. The index pulse is adjusted to occur just as the document guidebar is passing under the optical head assembly.

The optical head assembly is mounted on a precision lead screw 16 driven by a Y stepping motor 18. The drum rotation gives motion in a "X" dimension while the optical head assembly driven by the lead screw 16 imparts motion in the "Y" dimension. By virtue of the optical shaft encoder 4, X axis position addressability of 1.1 mils per drum pulse is provided for scanning whereas Y axis stepping provided by the combination of the lead screw 16 and Y stepping motor 18 permits 0.55 mil increments or Y steps. The head assembly includes a two position mode switch 20. In the Scan position, mode switch 20 provides a scan mode control signal which is used to turn on a scan lamp within the assembly for illuminating the document and to signal the drum motor control to drive the drum 2 at the fast speed. In the Plot position, mode switch 20 provides a plot mode control signal which is used to signal the drum motor control to drive the drum 2 at the slow speed. Additionally, both signals are applied to the Scanner/Plotter Control Unit for control purposes.

In a scan mode operation, during each revolution of the drum 2, a series of scan samples are taken along a scan line in the X direction. Since the head assembly is held stationary while the document is being scanned, some portion of the drum surface must be reserved for head assembly stepping to the next scan line. The time required for the head assembly stepping is approximately 27.1 millisec. Since the drum rotates at approximately 222 in./sec. (4.5 millisec./in.) in the scan mode and with a drum circumference of 23.1 inches, the time/rev. of the drum is 103.95 (0.0045 × 23.1) millisec. Consequently, with a head assembly stepping time of 27.1 milliseconds, the maximum time for scanning a document is 76.85 (103.95 × 27.1) millisec. and with a drum velocity of 222 in./sec., the maximum document size in the X direction is 17.061 (0.07685 × 222) inches.

The present system allows for a variable reproduction ratio R, where R is indicated by the following formula:

$$R = 10 \text{ (Output Size)}/0.5N \text{ (Input Size)} \quad N = 10, 100$$

Figure 2:
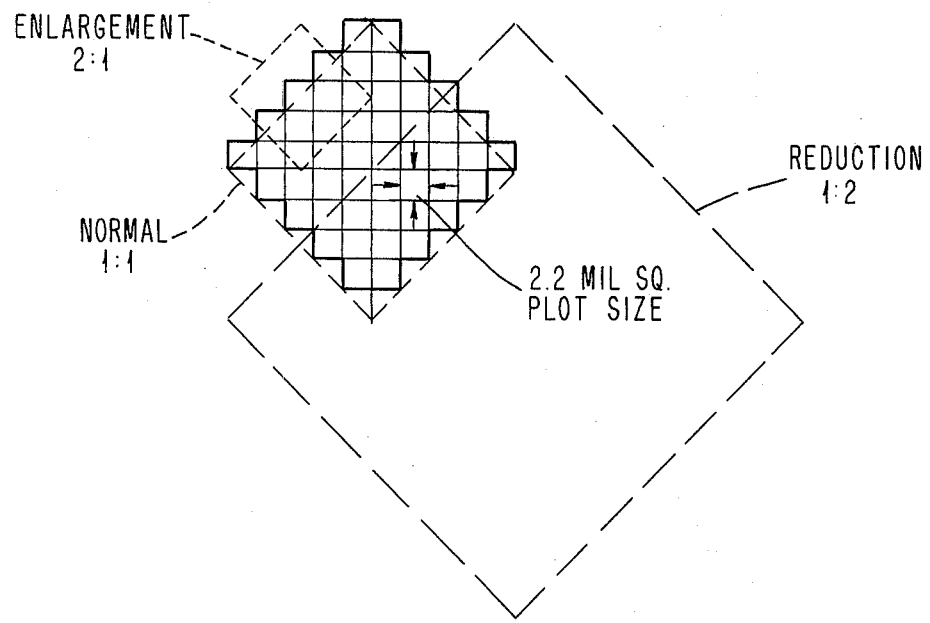
FIG. 2 is a diagram illustrating representative variable scan sample input sizes relative to a fixed plot halftone cell output size for different reproduction ratios.

The numerator indicates a fixed output size and the denominator the relative input size. For the values indicated, the reproduction ratio R ranges from 10:5 (2:1 enlargement) to 10:50 (1:5 reduction). FIG. 2 illustrates representative variable scan sample input sizes relative to a fixed plot halftone cell output size for different reproduction ratios. In view of this variable size of the scan sample, the distance between scan samples or the number of scan samples/scan line and the distance between scan lines or the number of scan lines/document are variable and proportional to the reproduction ratio.

Because the space between scan lines is variable and proportional to the reproduction ratio, the number of 0.55 mil Y steps or increments of the head assembly between scan lines is also variable and proportional to the reproduction ratio.

Figure 3:
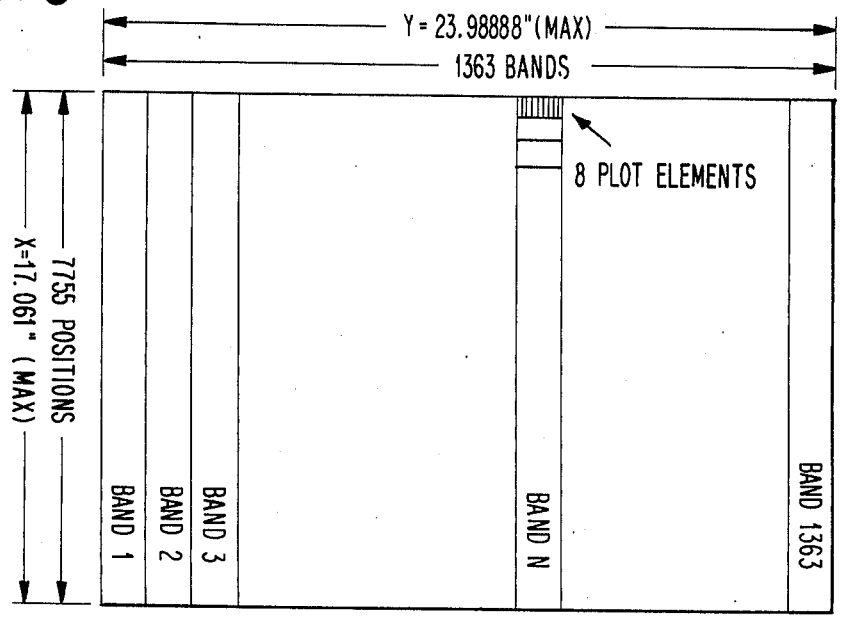
FIG. 3 is a diagram illustrating the halftone reproduction formed by bands of plot data.

In a plot mode operation, during each revolution of the drum 2, the halftone reproduction is formed by 8 track bands with each band corresponding to a data block consisting of 8 bit bytes up to a maximum of 7755 bytes as shown in FIG. 3. Each plot spot at the drum surface is 2.2 mils square and with an 8 spot wide plot band, the dimensional width of the plot band is 17.6 (2.2 × 8) mils. Therefore a film or photosensitive paper having a maximum size of approximately 24 inches in the Y direction requires a total of 1363 (24 ÷ 0.0176) plot bands. Since the drum rotates at approximately 148 in./sec. (6.75 millisec./in.) in the plot mode and with the drum circumference of 23.1 in., the time/rev. of the drum is 155.93 (6.75 × 23.1) millisec. Therefore, a full page of 1363 plot bands requires a plot time of approximately 212.53 (0.15593 × 1363) sec. or 3.5 minutes. Additionally, since the plot width size is fixed at 17.6 mils and the head assembly steps in 0.55 mil increments, there are 32 (17.6 ÷ 0.55) Y steps or increments of the head assembly between plot bands.

Figure 4:
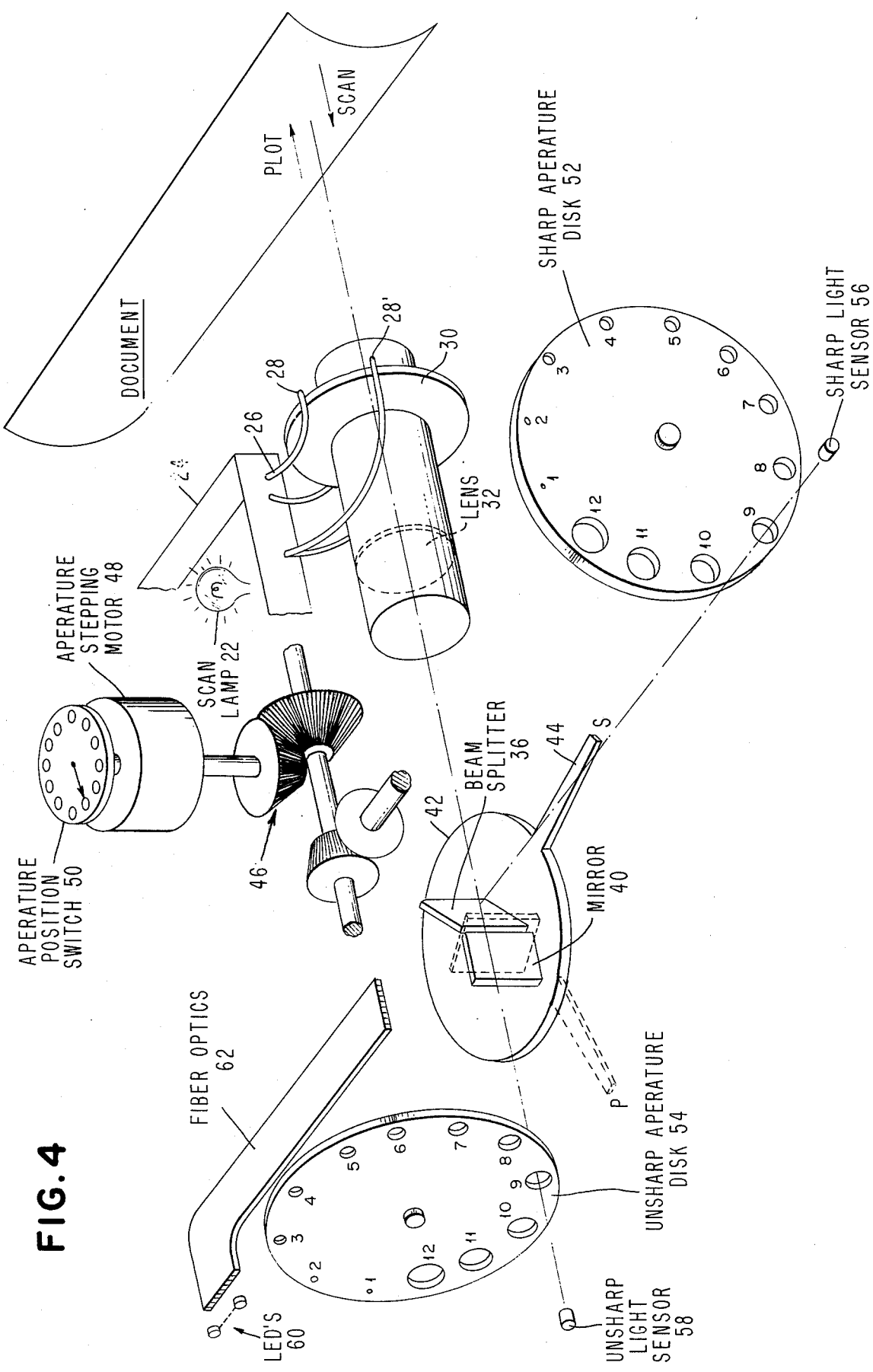
FIG. 4 is a diagram of the optical head assembly including scan and plot sections.

Referring now of FIG. 4, the optical head assembly includes a scan section and a plot section. The scan section includes a scan lamp 22 in housing 24 for lighting the document via an optical bundle 26 connected to light elements 28 mounted on support 30, a microscope objective lens 32, a beam splitter 36 to direct reflected light from the scan area, program selectable aperature disks 52 and 54 and two light sensors 56 and 58. The lens 32 has a 16 mm FL with 0.35NA and is used at 6X to magnify the scan area which is imaged at two aperture planes by means of the beam splitter 36. A pair of rotary disks 52 and 54 each containing a set of 12 aperture holes providing spot sizes which will permit enlargement and reduction of scanned documents are positioned at the aperture planes. Disk 52 is termed the sharp disk while disk 54 is termed the unsharp disk with the diameter of the aperture on the unsharp disk 54 being approximately three times the diameter of the corresponding aperture on the sharp disk 52. The two imaged areas produced have a common center and shape with the smaller including the general area of a halftone cell quadrant. The two aperture disks are mechanically linked by gears 46 so as to select the proper set as a function of the reproduction ratio. Solid state sensors 56 and 58 are located behind each of the aperture disks to provide a sharp and unsharp signal. The aperture disks 52 and 54 are commonly driven by an aperture stepping motor 48 which is program controlled to select one of the 12 aperture sets. The 12 sets provide for 91 reproduction ratios ranging from 2X (enlargement) to 0.02X (reduction). A rotary aperture position switch 50 is mounted on the same shaft as the stepping motor 48 to provide electrical signals indicative of the selected aperture position.

The plot section includes 8 LED light sources 60 having their outputs directed via a fiber optic bundle 62 to a mirror 40 mounted on the same support 42 as the beam splitter 36 with the support 42 being manually moveable by lever 44 from a scan position to a plot position. In the plot position, a 1×8 array is imaged from the fiber optic bundle 62 onto the mirror 40 where the light energy is reflected via lens 32 to the document surface. The halftone reproduction is thus formed by an 8 track band. Each light source 60 is independently controlled by one bit in an eight bit data byte. The output duration of the light source is program controllable depending upon whether the plotting is done on photosensitive paper or photographic film which may require different levels of exposure.

Figure 5:
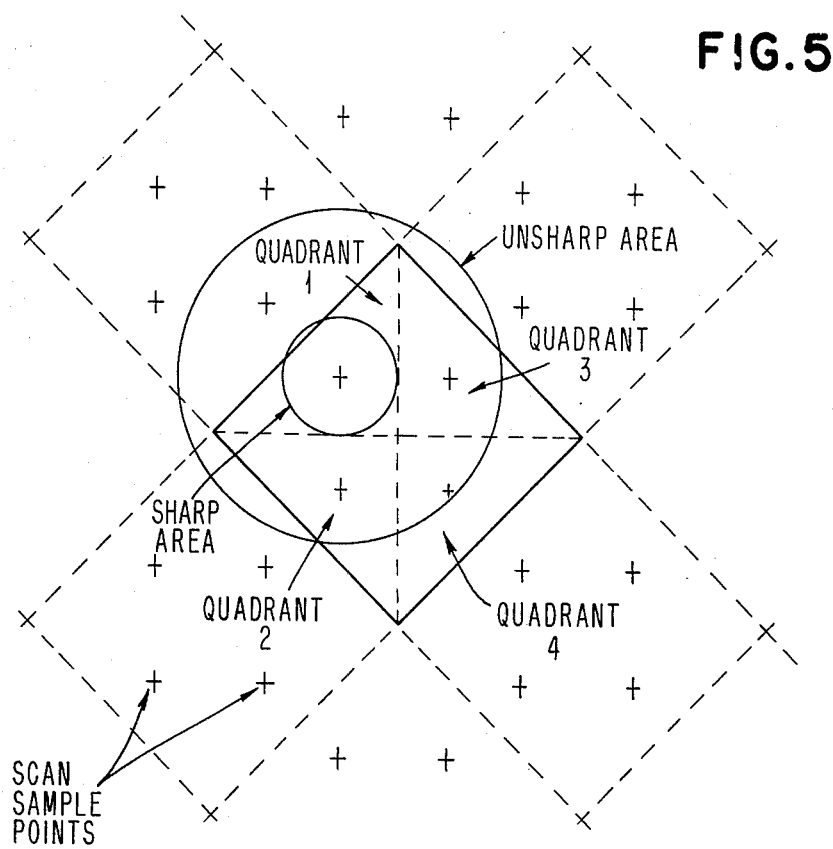
FIG. 5 is a diagram illustrating the normal halftone cell geometry divided into four quadrants and the sharp and unsharp area associated with a quadrant 1 scan sample point.

In order to allow for control of halftone dot shape independent of the constraint of the cell shape, the normal cell geometry is divided into four quadrants as shown in FIG. 5. Each quadrant is measured for its brightness content during scanning. The size of the area measured is a function of the reproduction ratio required for the particular photo being scanned. Simultaneously, with the collection of the quadrant sample, termed the sharp area, a much larger concentric area is measured, termed the unsharp area. It will be apparent that the size of these areas will vary in proportion to the reproduction ratio desired. Analog signals produced by the light sensors immediately behind the sharp and unsharp aperture disks undergo logarithmic amplification followed by digitizing, at selected scan sample points, through two 8 bit analog to digital converters as will be further described in connection with the scanner/plotter control unit. The digitized versions A and B of the analog signals have gray level values which range from 0 to 255 and are linear with the original document reflectance density for the individual areas sensed. The two digital signals A and B are utilized to produce a single modified 8 bit quadrant digital signal having a resultant gray level value expressed by the formula:

$$RGL = A + K(A-B)$$

where K is a variable factor used to control the extent of sharp signal modification.

Figure 6A:
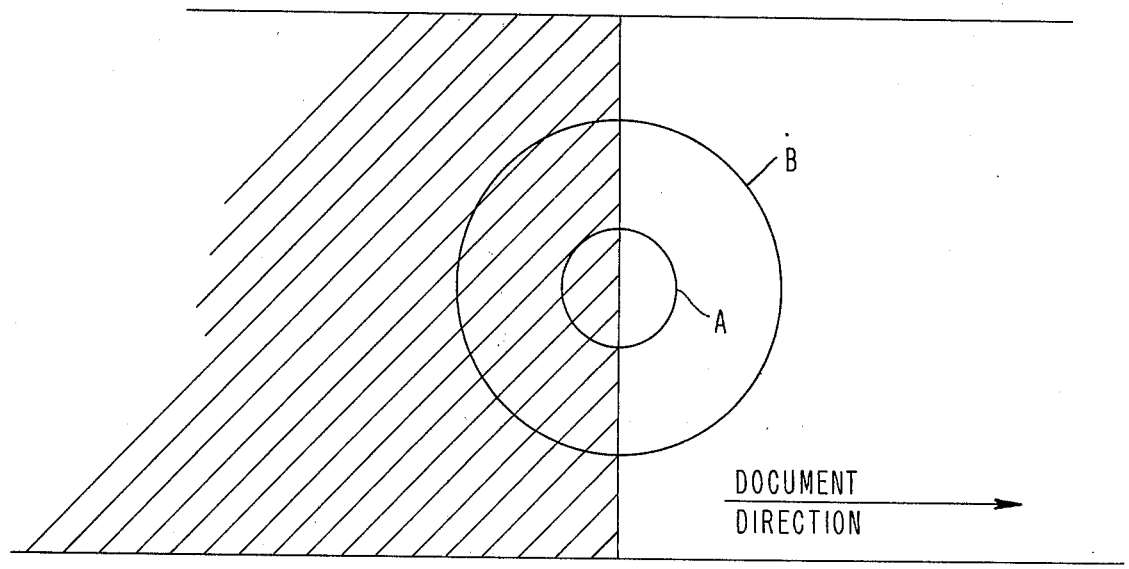
FIG. 6A illustrates a scan sample point at the demarcation line between a dark and light picture portion.

Edge enhancement and the extent of edge enhancement is illustrated in FIG. 6. Referring to FIG. 6A, the sharp area A and unsharp area B are shown at a demarcation line or edge between a darker picture portion and a brighter picture portion. FIG. 6B shows in graphic form the course of brightness resulting from the sharp area A and from the surrounding unsharp area B in close proximity to both sides of the edge line. Curve $A^1$ illustrates the course of the brightness resulting from the sharp area brightness being additively modified by the brightness difference between A and B where the K factor is greater than zero. The effect of this modification, in the vicinity of the edge, is to increase the tone density of the darker portion and after crossing the edge to decrease the tonal density of the lighter portion. FIG. 6C illustrates in graphic form the variation of tone density as influenced by different values of the K factor.

Figure 7:
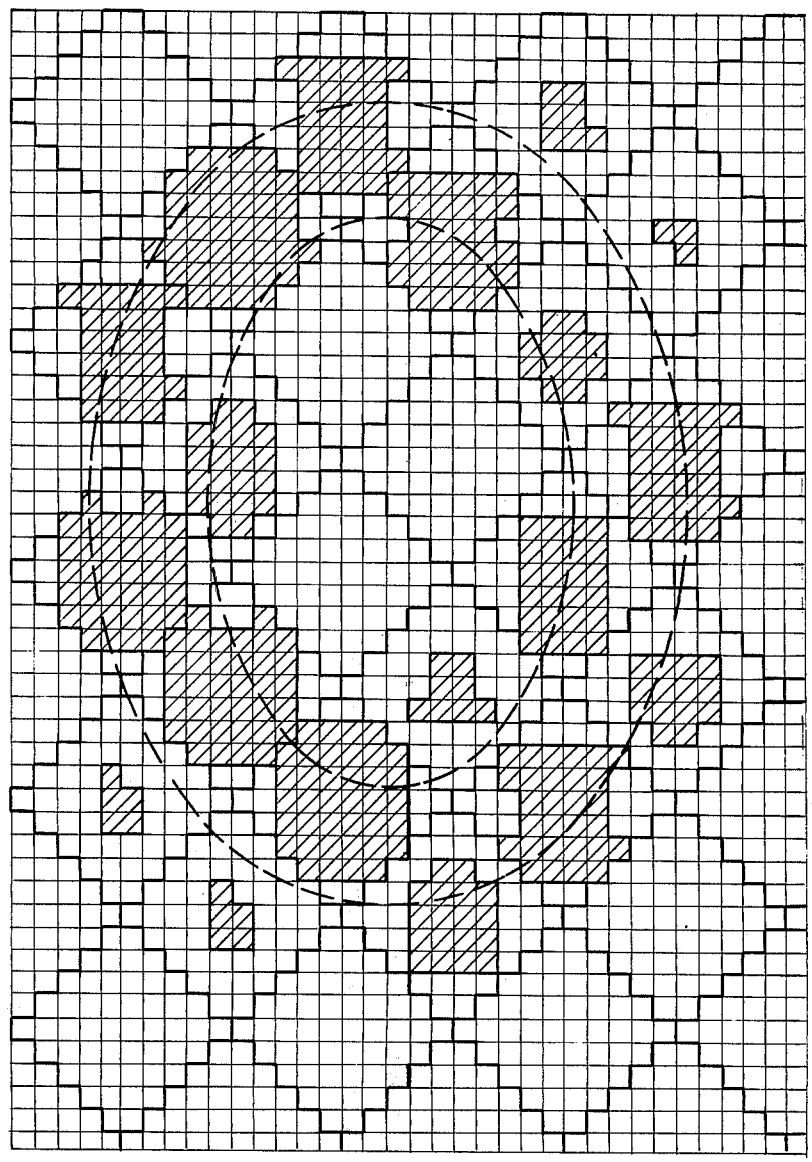
FIG. 7 illustrates the plot results in which a single sample is taken per halftone cell.
Figure 8:
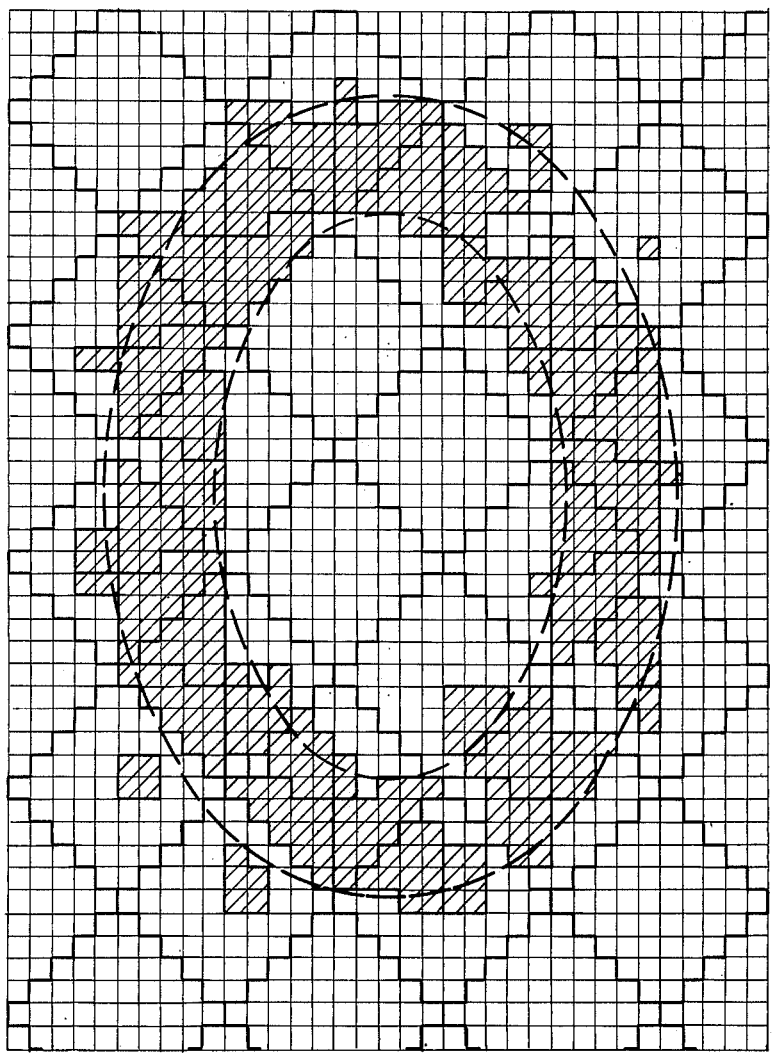
FIG. 8 illustrates the plot results in which quadrant sampling is performed with the sharpness factor K=0.
Figure 9:
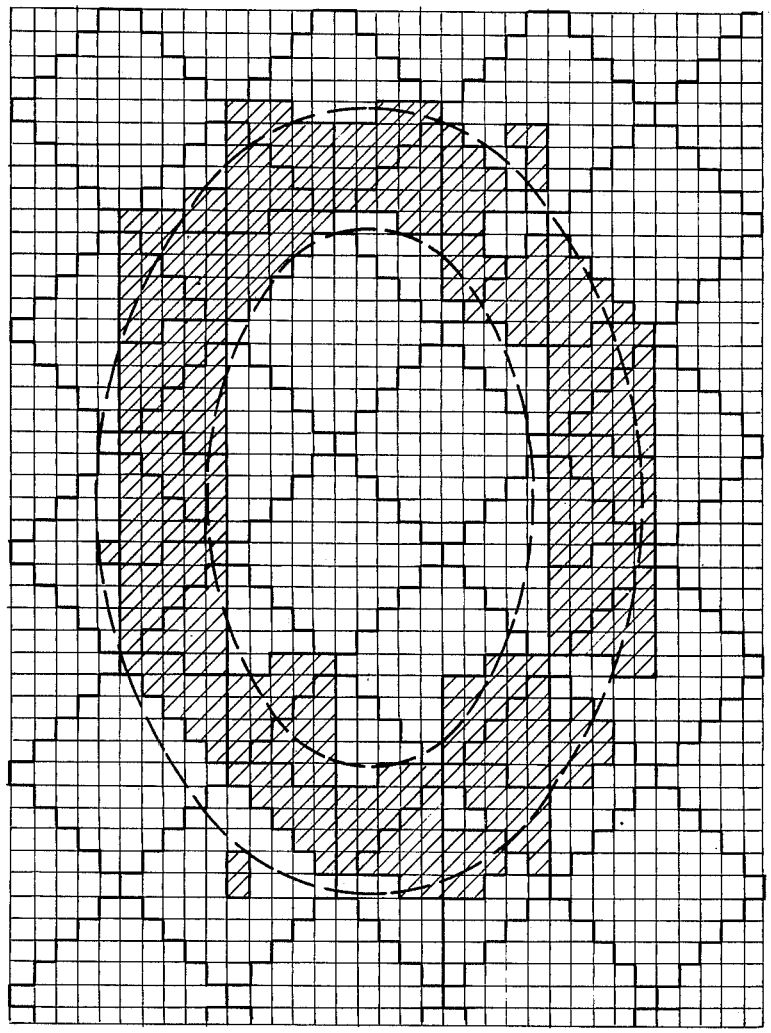
FIG. 9 illustrates the plot results in which quadrant sampling is performed with the sharpness factor K=3.

Referring now to FIG. 7, there is illustrated the plot result of prior art systems in which a single sample is taken per halftone cell. By the system of the present invention, in which quadrant scan sampling is performed, the quality of the halftone reproduction is significantly enhanced as illustrated in FIG. 8 and as contrasted with the results of prior art systems shown in FIG. 7. The influence resulting from edge sharpness enhancement where the sharp area brightness A is additively modified by the difference between the sharp area brightness A and the unsharp area brightness B, and the extent of such enhancement determined in accordance with the sharpness factor K i.e. A + K (A−B) is illustrated in FIG. 9.

Figure 10:
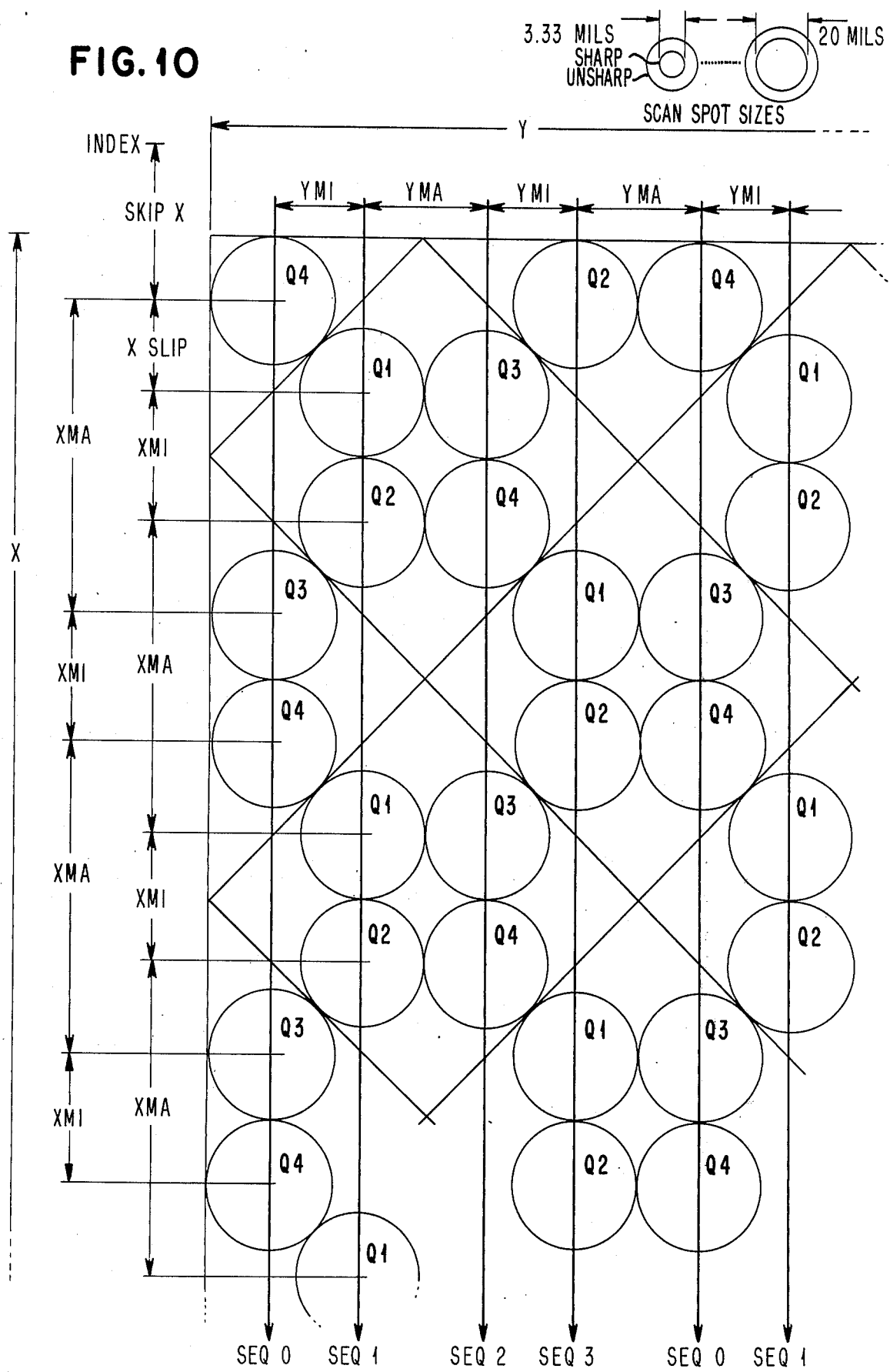
FIG. 10 illustrates the reproduction control parameters required for quadrant scan data collection as well as the variation in scan spot size of the sharp and unsharp areas.

Scan parameters for scanning a document on the drum is supplied by the data processing system and transmitted to the scanner/plotter control unit where they are stored and used to control the selection of scan sample points. Separate reproduction ratio parameters will be required for each document. FIG. 10 indicates the prime control parameters required for scan data collection. The skip X parameter specifies the number of 1.1 mil X increments to skip from the index point prior to beginning a scan sample. To sample scan points corresponding to the quadrant of the halftone cells the document is scanned in a pattern which repeats every four scan lines, each group of four being designated Seq 0, Seq 1, Seq 2 and Seq 3, the repetative scan sample pattern being as follows:

Seq 0 = Q4, Q3 − Q4, Q3 − Q4, Q3 − Q4, . . . .

Seq 1 = Q1 − Q2, Q1 − Q2, Q1 − Q2 . . . .

Seq 2 = Q3 − Q4, Q3 − Q4, Q3 − Q4 . . . .

Seq 3 = Q2, Q1 − Q2, Q1 − Q2, Q1 − Q2, . . . .

The X major and X minor incremental control parameters represent the number of 1.1 mil increments between scan samples while the Y major and Y minor incremental control parameters represent the number of 0.55 mil steps to be taken by the head assembly in the Y direction. A X slip incremental control parameter is provided in order to allow for a 45° orientation for the halftone reproduction that is essential from a human factor standpoint. The X slip value, therefore, represents the number of 1.1 mil increments to "slip" in the X dimension.

The values for the incremental control parameters are mathematically related to the reproduction ratio R and may be derived as follows:

X minor* = 6/R

X major = (20/R) − X minor

Y major* = 12/R

Y minor = (20/R) − Y major

X slip* = 4/R

*nearest integer.

Likewise, the number of scan samples (X direction) per scan line and the number of scan lines (Y direction) per document are also related to the reproduction ratio R and can be calculated as follows:

$$\text{*Scan Samples/San Line} = \frac{\text{Document length in mils}}{11} \times R$$

$$\text{**Scan Lines/Document} = \frac{\text{Document width in mils}}{5.5} \times R$$

*integer
**even interger

It should be noted that there are 10 plot positions per plot band and 2 scan sample points per scan line corresponding to each half tone cell. This results in 5 plot positions per scan sample point. Since the maximum plot positions per plot band is 7755, it should be apparent that there is a maximum number of scan sample points per scan line, namely, 7755 ÷ 5 = 1551. Thus, for reproduction ratios greater than 1, the document scan line dimension (X) would have to be reduced to permit a full size enlargement halftone plot. Similarly, it should be noted that there are 16 scanlines per 5 plot bands resulting in 3.2 scanlines per plot band. Since the maximum number of plot bands per document is 1363, it should be apparent that there is a maximum number of scan lines per document, namely, 1363 × 3.2 = 4362. Again, for reproduction ratio greater than 1, the document scan width (Y) would have to be reduced to permit a full size enlargement halftone plot.

The following Table I lists the five incremental control parameters in number of 1.1 mil steps and aperature set number for 91 reproduction ratios.

TABLE I

| | Reproduction Ratio Parameters | | | | | |
|---|---|---|---|---|---|---|
| O/I | XSLIP | XMAJ | XMIN | YMIN | YMAJ | APERTURE NO. |
| 10/ 5.0 | 2 | 7 | 3 | 4 | 6 | 1 (20)* |
| 10/ 5.5 | 2 | 8 | 3 | 4 | 7 | 1 |
| 10/ 6.0 | 2 | 8 | 4 | 5 | 7 | 2 (24)* |
| 10/ 6.5 | 3 | 9 | 4 | 5 | 8 | 2 |
| 10/ 7.0 | 3 | 10 | 4 | 6 | 8 | 3 (28)* |
| 10/ 7.5 | 3 | 10 | 5 | 6 | 9 | 3 |
| 10/ 8.0 | 3 | 11 | 5 | 6 | 10 | 4 (32)* |
| 10/ 8.5 | 3 | 12 | 5 | 7 | 10 | 4 |
| 10/ 9.0 | 4 | 13 | 5 | 7 | 11 | 5 (36)* |
| 10/ 9.5 | 4 | 13 | 6 | 8 | 11 | 5 |
| 10/10.0 | 4 | 14 | 6 | 8 | 12 | 6 (40)* |
| 10/10.5 | 4 | 15 | 6 | 8 | 13 | 6 |
| 10/11.0 | 4 | 15 | 7 | 9 | 13 | 6 |
| 10/11.5 | 5 | 16 | 7 | 9 | 14 | 6 |
| 10/12.0 | 5 | 17 | 7 | 10 | 14 | 7 (48)* |
| 10/12.5 | 5 | 17 | 8 | 10 | 15 | 7 |
| 10/13.0 | 5 | 18 | 8 | 10 | 16 | 7 |
| 10/13.5 | 5 | 19 | 8 | 11 | 16 | 7 |
| 10/14.0 | 6 | 20 | 8 | 11 | 17 | 8 (56)* |
| 10/14.5 | 6 | 20 | 9 | 12 | 17 | 8 |
| 10/15.0 | 6 | 21 | 9 | 12 | 18 | 8 |
| 10/15.5 | 6 | 22 | 9 | 12 | 19 | 8 |
| 10/16.0 | 6 | 22 | 10 | 13 | 19 | 8 |
| 10/16.5 | 7 | 23 | 10 | 13 | 20 | 8 |
| 10/17.0 | 7 | 24 | 10 | 14 | 20 | 9 (68)* |
| 10/17.5 | 7 | 24 | 11 | 14 | 21 | 9 |
| 10/18.0 | 7 | 25 | 11 | 14 | 22 | 9 |
| 10/18.5 | 7 | 26 | 11 | 15 | 22 | 9 |
| 10/19.0 | 8 | 27 | 11 | 15 | 23 | 9 |
| 10/19.5 | 8 | 27 | 12 | 16 | 23 | 9 |
| 10/20.0 | 8 | 28 | 12 | 16 | 24 | 10 (80)* |
| 10/20.5 | 8 | 29 | 12 | 16 | 25 | 10 |
| 10/21.0 | 8 | 29 | 13 | 17 | 25 | 10 |
| 10/21.5 | 9 | 30 | 13 | 17 | 26 | 10 |
| 10/22.0 | 9 | 31 | 13 | 18 | 26 | 10 |
| 10/22.5 | 9 | 31 | 14 | 18 | 27 | 10 |
| 10/23.0 | 9 | 32 | 14 | 18 | 28 | 10 |
| 10/23.5 | 9 | 33 | 14 | 19 | 28 | 10 |
| 10/24.0 | 10 | 34 | 14 | 19 | 29 | 11 (96)* |
| 10/24.5 | 10 | 34 | 15 | 20 | 29 | 11 |
| 10/25.0 | 10 | 35 | 15 | 20 | 30 | 11 |
| 10/25.5 | 10 | 36 | 15 | 20 | 31 | 11 |
| 10/26.0 | 10 | 36 | 16 | 21 | 31 | 11 |
| 10/26.5 | 11 | 37 | 16 | 21 | 32 | 11 |
| 10/27.0 | 11 | 38 | 16 | 22 | 32 | 11 |
| 10/27.5 | 11 | 38 | 17 | 22 | 33 | 11 |
| 10/28.0 | 11 | 39 | 17 | 22 | 34 | 11 |
| 10/28.5 | 11 | 40 | 17 | 23 | 34 | 11 |
| 10/29.0 | 12 | 41 | 17 | 23 | 35 | 11 |
| 10/29.5 | 12 | 41 | 18 | 24 | 35 | 11 |
| 10/30.0 | 12 | 42 | 18 | 24 | 36 | 12 (120)* |
| 10/30.5 | 12 | 43 | 18 | 24 | 37 | 12 |
| 10/31.0 | 12 | 43 | 19 | 25 | 37 | 12 |
| 10/31.5 | 13 | 44 | 19 | 25 | 38 | 12 |
| 10/32.0 | 13 | 45 | 19 | 26 | 38 | 12 |
| 10/32.5 | 13 | 45 | 20 | 26 | 39 | 12 |
| 10/33.0 | 13 | 46 | 20 | 26 | 40 | 12 |
| 10/33.5 | 13 | 47 | 20 | 27 | 40 | 12 |
| 10/34.0 | 14 | 48 | 20 | 27 | 41 | 12 |
| 10/34.5 | 14 | 48 | 21 | 28 | 41 | 12 |
| 10/35.0 | 14 | 49 | 21 | 28 | 42 | 12 |
| 10/35.5 | 14 | 50 | 21 | 28 | 43 | 12 |
| 10/36.0 | 14 | 50 | 22 | 29 | 43 | 12 |
| 10/36.5 | 15 | 51 | 22 | 29 | 44 | 12 |
| 10/37.0 | 15 | 52 | 22 | 30 | 44 | 12 |
| 10/37.5 | 15 | 52 | 23 | 30 | 45 | 12 |
| 10/38.0 | 15 | 53 | 23 | 30 | 46 | 12 |
| 10/38.5 | 15 | 54 | 23 | 31 | 46 | 12 |
| 10/39.0 | 16 | 55 | 23 | 31 | 47 | 12 |
| 10/39.5 | 16 | 55 | 24 | 32 | 47 | 12 |
| 10/40.0 | 16 | 56 | 24 | 32 | 48 | 12 |
| 10/40.5 | 16 | 57 | 24 | 32 | 49 | 12 |
| 10/41.0 | 16 | 57 | 25 | 33 | 49 | 12 |
| 10/41.5 | 17 | 58 | 25 | 33 | 50 | 12 |
| 10/42.0 | 17 | 59 | 25 | 34 | 50 | 12 |
| 10/42.5 | 17 | 59 | 26 | 34 | 51 | 12 |
| 10/43.0 | 17 | 60 | 26 | 34 | 52 | 12 |
| 10/43.5 | 17 | 61 | 26 | 35 | 52 | 12 |
| 10/44.0 | 18 | 62 | 26 | 35 | 53 | 12 |
| 10/44.5 | 18 | 62 | 27 | 36 | 53 | 12 |
| 10/45.0 | 18 | 63 | 27 | 36 | 54 | 12 |
| 10/45.5 | 18 | 64 | 27 | 36 | 55 | 12 |
| 10/46.0 | 18 | 64 | 28 | 37 | 55 | 12 |
| 10/46.5 | 19 | 65 | 28 | 37 | 56 | 12 |
| 10/47.0 | 19 | 66 | 28 | 38 | 56 | 12 |
| 10/47.5 | 19 | 66 | 29 | 38 | 57 | 12 |
| 10/48.0 | 19 | 67 | 29 | 38 | 58 | 12 |
| 10/48.5 | 19 | 68 | 29 | 39 | 58 | 12 |
| 10/49.0 | 20 | 69 | 29 | 39 | 59 | 12 |
| 10/49.5 | 20 | 69 | 30 | 40 | 49 | 12 |
| 10/50.0 | 20 | 70 | 30 | 40 | 60 | 12 |

*Sharp Aperture Diameter Size in Mils

Figure 11:
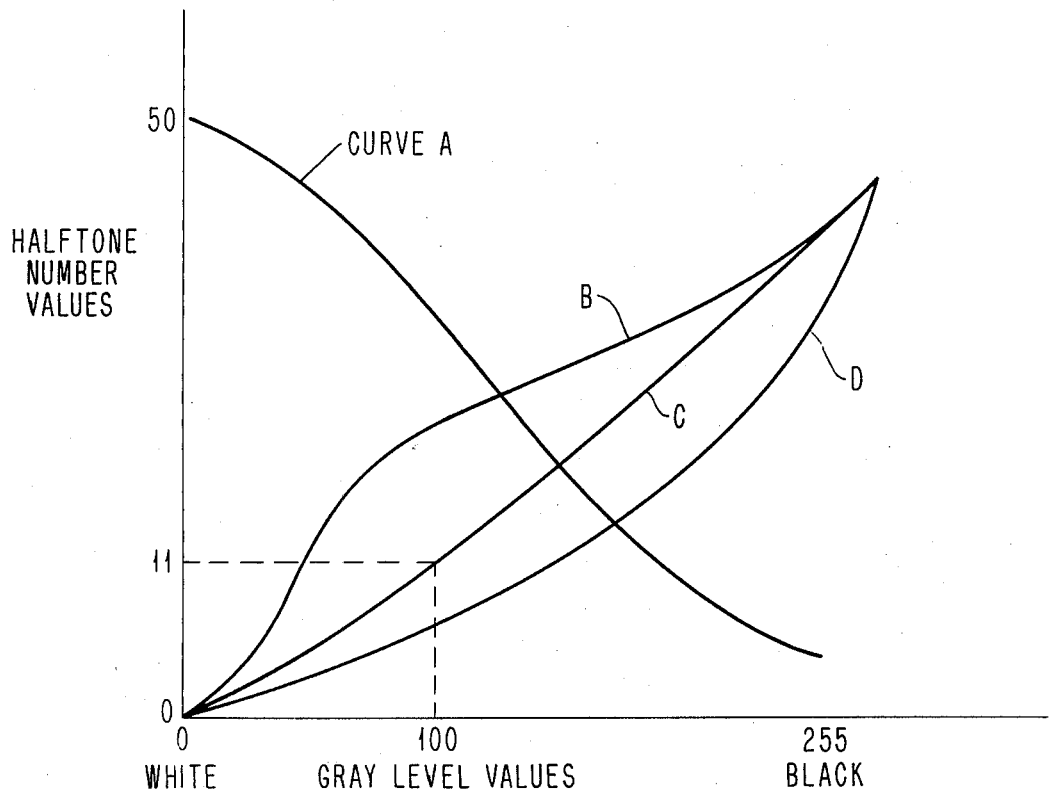
FIG. 11 illustrates in graphic form a relationship between halftone number values and gray level values for different scanned documents.

In the scan mode of operation, the quadrant scan sample data, termed the resultant gray level (RGL) data, is buffered at the scanner/plotter control unit and then transferred to the data processing system as will be explained in greater detail hereinafter. At the data processing system, the resultant gray level values are converted to halftone number values in accordance with a given scan document. This may be accomplished by means of a tone control table look up technique or other means such as an algorithm calculation. This conversion relates the quadrant RGL data (0–255) to a halftone cell structure comprised of from one to 50 available locations within the halftone cell. This relationship is a function of the document being scanned and will be designated by a skilled operator to produce the best output for a given document. FIG. 11 illustrates the relationship in graphic form of the gray level values to halftone number values for different given scan documents. Once the tone conversion is completed, the structuring of the halftone plot data can then be performed.

Figure 12:
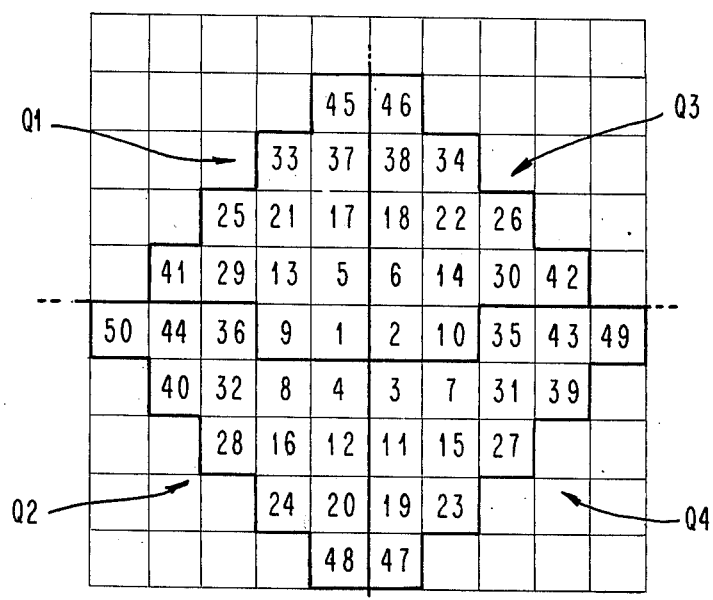
FIG. 12 illustrates the layout of a halftone cell with halftone value assignment and quadrant delinears.
Figure 14:
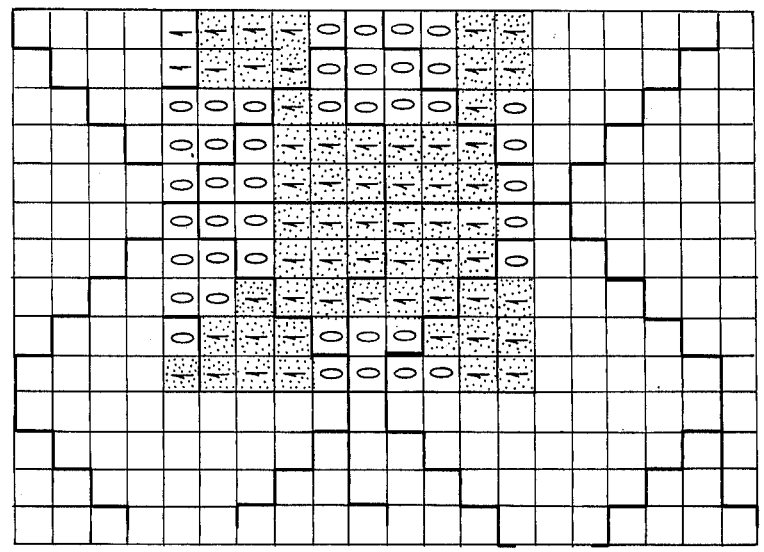
FIG. 14 illustrates the relationship of the individual spot within the halftone cell for the illustrated example of FIG. 13 based on the halftone pattern of FIG. 12.
Figure 13:
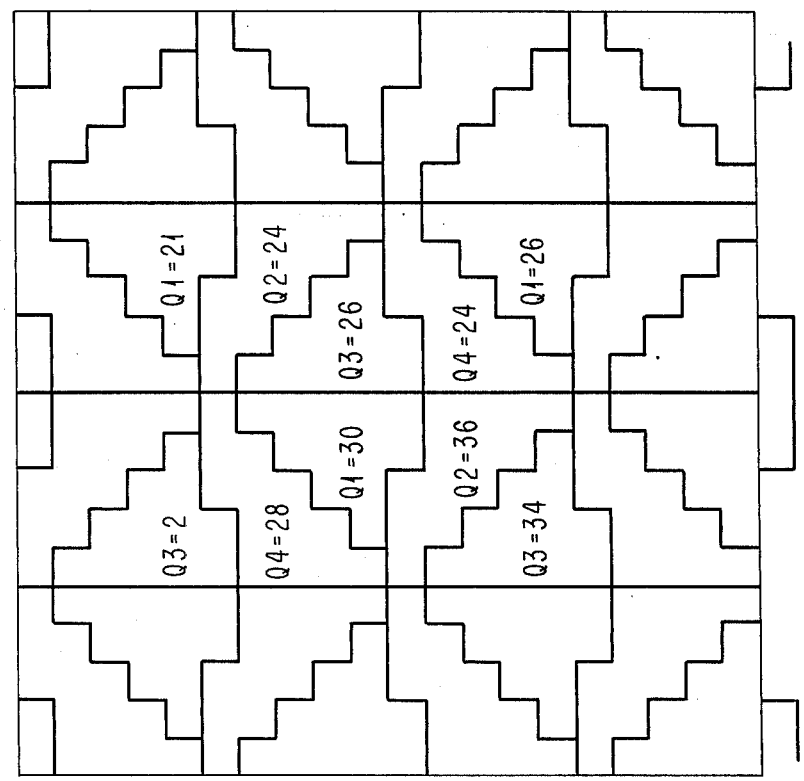
FIG. 13 illustrates a halftone cell with four different quadrant values and the quadrant values surrounding the cell which are produced as a result of a representative scan operation.
Figure 15:
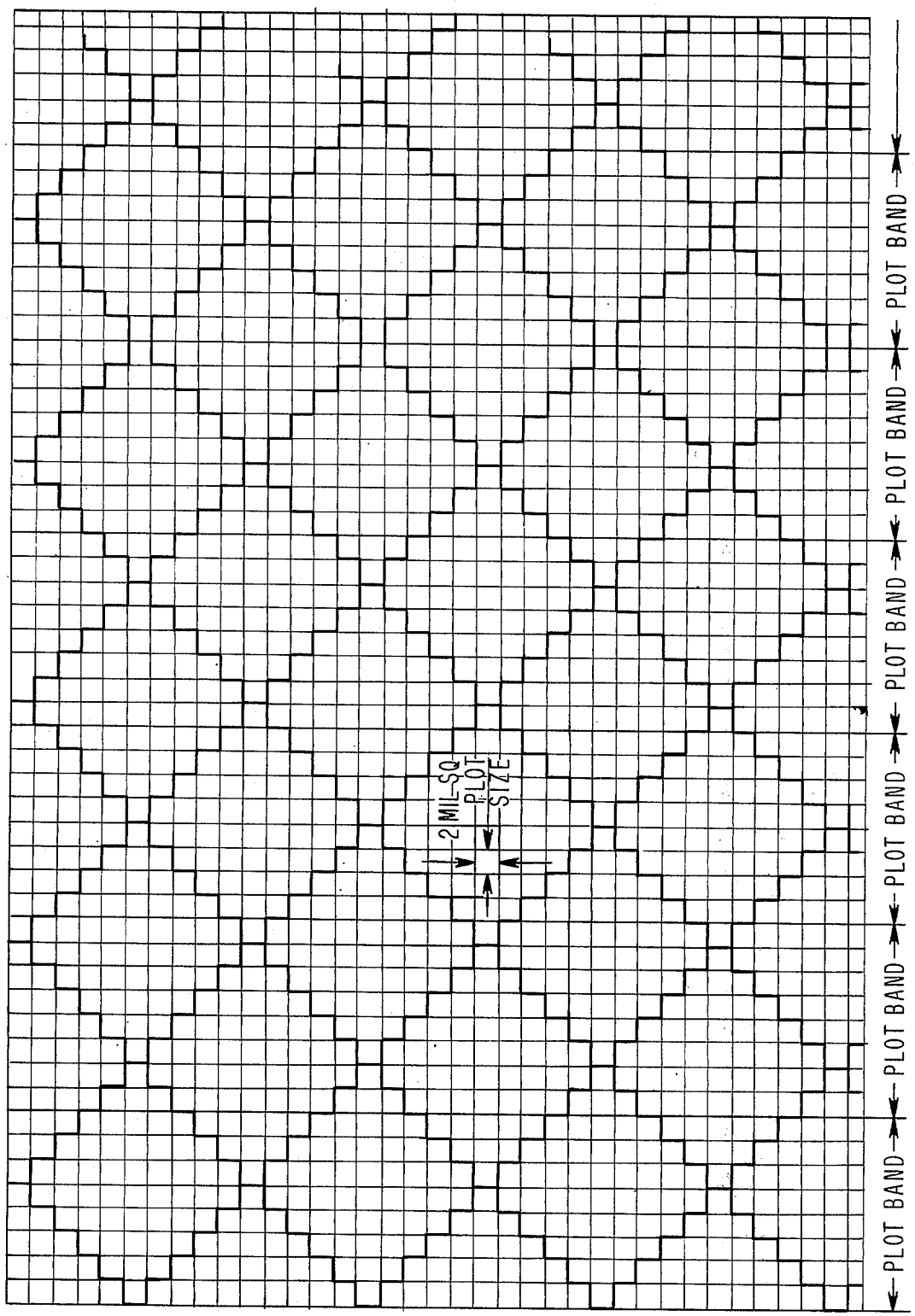
FIG. 15 illustrates the relationship of the plot bands to the halftone pattern.

Plot data is provided in successive 8 bit bytes to the 1×8 array at the optical head assembly. This method requires that the data to be plotted be formated into bands 8 spots (bits) wide up to a maximum of 7755 bytes per band. Referring now to FIG. 12, the layout of a halftone cell is shown with halftone value assignments and quadrant delinears. For a given quadrant, all bit positions in that quadrant portion having assigned values that are equal to or less than the halftone number value are designated as a 1 bit. FIG. 13 illustrates a halftone cell with four different quadrant values which are produced as a result of the scan operation. FIG. 14 illustrates the relationship of the individual spots within the halftone cell for the illustrated example of FIG. 13 based on the halftone pattern of FIG. 12. The data processing system extracts the binary plot pattern data for each quadrant halftone value and formats it with adjacent cell binary plot pattern data, in a manner which will be described in greater detail hereinafter, to provide a meshed cell configuration. The assembled plot data is then transmitted in a byte wide data record from the data processing system to the scanner/plotter control unit for plotting. FIG. 15 illustrates the relationship of the plot bands to the halftone pattern. It should be noted that halftone configuration repeats for every five plot bands or every forty bits in the Y direction.

Figure 16A:
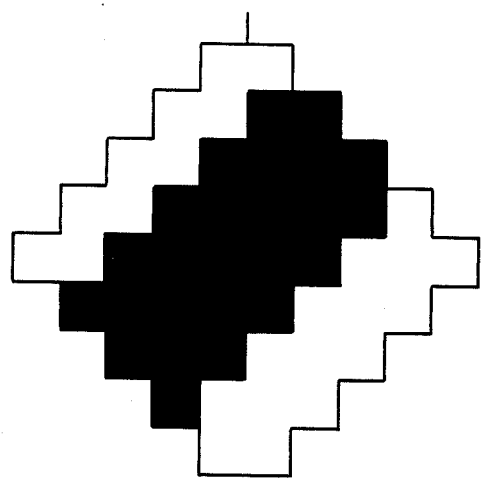
FIG. 16A illustrates the normal-positive plot pattern for plotting data bytes as received.
Figure 16B:
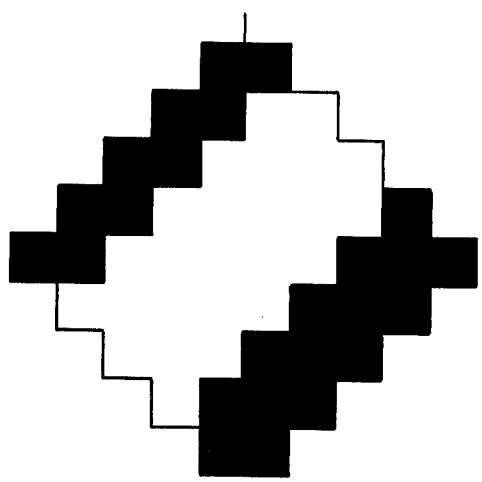
FIG. 16B illustrates the normal-negative plot pattern for inverting data bytes prior to plotting.
Figure 16C:
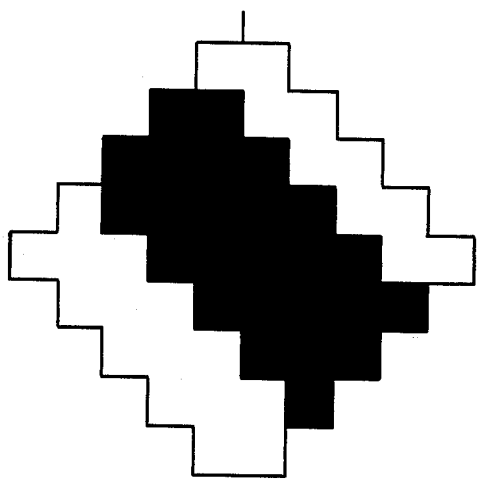
FIG. 16C illustrates the mirror-positive plot pattern for swapping the bits within a data byte before plotting.
Figure 16D:
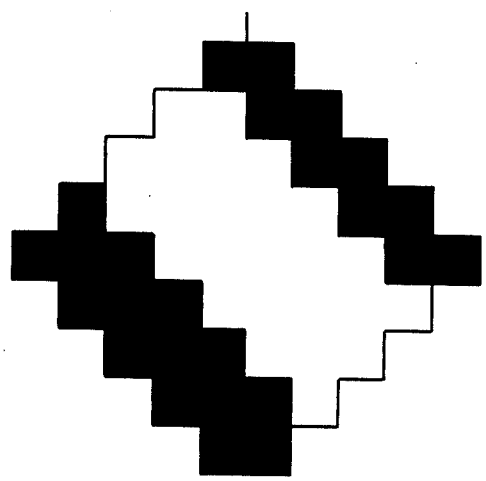
FIG. 16D illustrates the mirror-negative plot pattern in which the bits within a data byte are swapped and inverted before being plotted.

Three operator controlled switches are provided at the operator panel of the scanner/plotter control unit for the plot operation, namely a positive/negative switch, a mirror/normal switch and a right/left switch which will be described in greater detail hereinafter. When the mirror/normal switch is in the normal position and the positive/negative switch is in the positive position, data bytes are plotted as received as illustrated in FIG. 16A. When the mirror/normal switch is in the normal position and the positive/negative switch is in the negative position bits within the data bytes are inverted and then plotted as illustrated in FIG. 16B. Mirror image plotting is accomplished by reversing the direction of head stepping which is accomplished by the operator controlled right/left switch and by reversing the data bits within a byte. Accordingly, with the right-/left switch in the right position, the positive/negative switch in the positive position and the mirror/normal switch in the mirror position, bits within a data byte are swapped i.e. bit 0 for bit 7, bit 1 for bit 6, etc. and then plotted as illustrated in FIG. 16C. When the right/left switch is in the left position, the positive/negative switch is in the negative position and the mirror/normal switch is in the mirror position, the bits within a data byte are swapped and inverted and then plotted as illustrated in FIG. 16D.

SCANNER/PLOTTER SYSTEM COMMAND OPERATIONS

The scanner/plotter control unit is program controlled by the data processing system to respond to a series of commands and control data to perform the scan and plot operations. The scan operation is basically a read operation while the plot operation is basically a write operation.

The scan operation is performed by the following sequence of commands:

Control Set Up
Control Set Repro
*Load Scan Buffer
*Read Buffer
Control Drum Stop

*Repeated for each block of data transferred from the Scanner/Plotter to the Data Processing System.

Referring now to FIG. 17, the format of the channel command word (CCW) at the data processing system is shown for a control set up command. The CCW includes a command portion which identifies this command as the control set up command, an address pointer designating a location in storage and a count value indicating 5 bytes to be transmitted from the data processing system to the scanner/plotter control unit starting from the designated location. The control set up command is used in both the scan and plot modes to transmit set-up parameters i.e. skip value and scan/plot byte count, to the scanner/plotter control unit. This command need only be sent once per document in the scan mode and once per full page plot in the plot mode. Bytes 0 and 1 specify the number of 1.1 mil X increments to skip prior to beginning an actual scan or plot operation. Bytes 2 and 3 specify the number of scan samples to be made or the number of plot bytes to be plotted. Byte 4 specifies whether film or photosensitive paper is used in the plot mode. In executing this command, the command is transmitted by the data processing system to the scanner/plotter control unit where it is decoded during an initial selection sequence (ISS) after which the 5 bytes of data are transmitted in sequence to the scanner/plotter control unit where they are stored in preparation for the next command operation. At the completion of the control data transfer, the scanner/plotter control unit transmits a channel end and device end signal back to the data processing system to indicate that the execution of the control set up command has been completed.

Referring now to FIG. 18, the format of the CCW at the data processing system is shown for a control set repro command. The CCW includes a command portion which identifies this command as the control set repro command, an address pointer designating a location in storage and a count value indicating 7 bytes to be transmitted from the data processing system to the scanner/plotter control unit starting from the designated location. The control set repro command is used in the scan mode to transmit the necessary reproduction ratio parameters to the scanner/plotter control unit and need only be sent once per document. Bytes 0 and 1 specify the number of 0.55 mil steps to be taken in the Y direction during a Y major or Y minor axial movement of the head assembly. Bytes 2 and 3 specify the number of 1.1 mil increments to be taken between scan samples for the X major or X minor parameter. Bits 3 to 7 of byte 4 are used to specify the number of 1.1 mil increments to slip in the X dimension to permit sampling at a 45° orientation. Bits 0 and 1 of byte 4 are used to reset a sequence counter in the scanner/plotter control unit which keeps track of each sequence of four scan lines. Byte 5 specifies the sharpness factor K ranging from 0–7.5 in 0.25 increments. Byte 6 specifies the aperture set numbers from 1 to 12. In executing this command, the command is transmitted by the data processing system to the scanner/plotter control unit where it is decoded during the ISS after which the 7 bytes of reproduction ratio parameter control data are transmitted in sequence to the scanner/plotter control unit where they are stored in preparation for the next command operation. At the completion of the control data transfer the scanner/plotter transmits a channel end signal to the data processing system to indicate the completion of the data transfer. The scanner/plotter control unit in response to the aperture set information will begin to rotate the aperture disks from their current position to a position which matches the control data after which the scanner/plotter transmits a device end signal to the data processing system to indicate that the aperture disks have been physically positioned and that the execution of the control set repro command has been completed.

Referring now to FIG. 19, the format of the CCW at the data processing system is shown for a load scan buffer command. The CCW includes a command portion which identifies this command as the load scan buffer command. This command causes synchronization between the drum and the scanner/plotter during a scan operation. No data is transferred to the channel. In executing this command, the command is transmitted by the data processing system to the scanner/plotter where it is decoded during an ISS after which a channel end signal is sent back to the data processing system to indicate the initial selection sequence is completed. The scanner/plotter then initiates the sampling of a block of scan data from the document which is loaded in a buffer in the scanner/plotter. The number of scan samples taken or the number of data bytes stored in the buffer is specified by the scan/plot count specified by the previous control set up command. When the buffer in the scanner/plotter is loaded with the scanned data block, the scanner/plotter transmits a device end signal to the data processing system to indicate that the execution of the load scan buffer command has been completed and at the same time to signal the head assembly to start moving in the axial direction in preparation for being positioned for the next scan line during the next revolution of the drum.

Referring now to FIG. 20, the format of the channel command word at the data processing system is shown for a read buffer command. The CCW includes a command portion which identifies this command as the read buffer command, an address pointer designating a starting location in storage where the data from the buffer of the scanner/plotter is to be stored and a count value indicating the number of bytes to be transmitted from the scanner/plotter to the data processing system up to a maximum of 7755 bytes. The read buffer command is used in the scan operation to cause the contents of the buffer of the scanner/plotter to be transmitted to the data processing system. At the completion of the data transfer, the scanner/plotter transmits a channel end and device end signal to the data processing system to indicate that the execution of the read buffer command has been completed. The command sequence, load scan buffer-read buffer is repeated for each succeeding scan line of the document until the entire document is scanned. At the completion of the total scan, a control drum stop command is issued to stop the rotation of the drum.

Referring now to FIG. 21, the format of the CCW at the data processing system is shown for a control drum stop command. The CCW includes a command portion which identifies this command as the drum stop command. The control drum stop command provides program control for stopping the motion of the drum. No data is transferred to the channel. In executing this command, the command is transmitted by the data processing system to the scanner/plotter where it is decoded during an ISS after which a channel end signal is sent to the data processing system to indicate the initial selection sequence is completed. The scanner/plotter then activates the control to stop the drum. When the scanner/plotter detects that the drum is stopped a device end signal is transmitted to the data processing system to indicate that the execution of the control drum stop command has been completed.

The plot operation is performed by the following sequence of commands:
Control Set Up
Write
Control Drum Stop The control set up command operates in a similar manner as previously described to transmit set up parameters i.e. skip value and plot count, to the scanner/plotter.

Referring now to FIG. 22, the format of the CCW at the data processing system is shown for a write command. The CCW includes a command portion which identifies this command as a write command, an address pointer designating a starting location for a record block of data and a count value indicating the number of bytes to be transmitted from the data processing system to the buffer of the scanner/plotter up to a maximum of 7755 bytes. This command causes synchronization between the drum and the scanner/plotter during a plot operation. In executing this command, the command is transmitted by the data processing system to the scanner/plotter where it is decoded during an ISS after which the plot data is transferred from the data processing system to the buffer of the scanner/plotter. At the completion of the plot data transfer a channel end signal is sent to the data processing system to indicate this condition and the plot operation is initiated to unload the buffer and plot a data block or band of plot data on the film or photosensitive paper up to a maximum of 7755 bytes. At the completion of the plot operation, a device end signal is transmitted to the data processing system to indicate that the execution of the write command has been completed and a fixed axial movement of the head assembly is initiated in preparation for plotting the next data block band of plot data. Successive write commands are issued by the data processing system to plot successive bands of plot data on the plot document. At the completion of the full plot a control drum stop command is issued to stop the movement of the drum.

General Description of Scanner/Plotter System Operations Scan Operation

Referring back to FIG. 1, the general organization of the scanner/plotter control unit and scan mode operation will now be described. The carrier sheet with the document to be scanned is mounted on the drum 2 and by a combination of the operation of the single/continuous and right/left switches at the operator panel the head assembly is moved into position adjacent an edge of the document. At the head assembly, the scan/plot lever 44 is moved to the scan position and switch 20 is switched to the scan position to bring up a signal on the scan sw line. The signal on the scan sw line is applied to condition the drum motor 6 for the higher speed operation, to condition the mode control 400 for the scan mode of operation and to condition Y control 800 for Y minor stepping in the Y direction. The operator then presses the start drum push button which applies a signal to the drum control 300 to produce a start drum signal to initiate movement of the drum motor 6. A time delay relay is provided at the drum motor 6 to allow the motor to reach operating speed after which a signal is applied via the drum up to speed line to the drum control 300. When the synchronization point i.e. index pulse is detected, drum control 300 produces a drum ready signal to signal common control 1000 to bring up a ready device end signal which is applied to the data processing system to initiate the sequence of commands for the scan operation.

The data processing system first issues the control set up command to the scanner/plotter control unit followed by the series of control bytes which are passed via the In Bus and the buffer and bus control 1100 to the S/P in bus. Control signals from common control 1000 direct the control data i.e. skip value and scan count value, on the S/P in bus to a skip register and scan/plot byte register in scan/plot common control 500. Following this, channel end and device end signals are transmitted to the data processing system to indicate that the execution of the control set up command has been completed. The data processing system next issues a control set repro command followed by the incremental control parameters which are applied to common control 1000 of the scanner/plotter control unit. The incremental control parameters are passed via the in bus and the buffer and bus control 1100 to the S/P in bus. Control signals from common control 1000 direct the incremental parameter Y major and Y minor values to registers in the Y control 800, X major, X minor and X slip values to registers in the scan/plot common control 500, reset a sequence counter in scan control 600 to Seq 0 and the K factor and aperture set number values to registers in the scan control 600. An aperture position signal from the aperture position switch 50 on the head assembly is applied via the aperture position bus to the scan control 600 where it is compared with the present content of the aperture position register. Common control 1000 then issues a set aperture position control signal to scan control 600 to test for a comparison of the aperture position signal from the aperture position switch 50 and the aperture position number set into the aperture position register of the scan control 600. If a match is found, an aperture positioned signal is transmitted to common control 1000 otherwise a step aperture motor signal is applied to the aperture position motor 48 to step the aperture position switch 50 which is kept stepping until a match is detected indicating that the aperture disks in the head assembly have been positioned properly in accordance with the predetermined reproduction ratio selected. When the match position is detected an aperture positioned signal is transmitted to common control 1000 to produce a device end signal to the data processing system to indicate that the execution of the control set repro command has been completed.

Next, the data processing system transmits a load scan buffer command to the scanner/plotter control unit. Common control 1000 decodes the command and transmits a channel end signal to the data processing system to indicate the ISS is completed. If the head assembly is stopped, common control 1000 issues a start scan/plot signal to mode control 400, scan/plot common control 500, scan control 600 and Y control 800. At mode control 400, the start scan/plot signal is effective to cause a scan signal to be produced indicating that the scanner/plotter is in the scan mode of operation. The scan signal from mode control 400 is applied to condition drum control 300 in preparation for receiving the index pulse. At scan/plot common control 500, the start scan/plot signal is effective to load the X skip value from the register in which it is stored to a skip counter and to also load the scan count value from the register in which it is stored to a scan/plot byte counter. At the scan control 600, the start scan/plot signal is effective to condition the scan control 600 for an X major step. At Y control 800, the start scan/plot signal is effective to condition Y control 800 for a Y minor step operation.

When the index pulse is received by drum control 300, a gated index pulse is produced and then a series of gated drum pulses. As the drum rotates, the gated drum pulses are applied to scan/plot common control 500 to decrement the skip counter until the skip counter equals zero indicating that the first scan sample position has been reached. Scan/plot common control 500 then issues a start convert signal to the A/D converter 100 to generate a digital sharp value signal A and digital unsharp value signal B corresponding to the sample point presently being scanned. When the A/D conversion is complete, an end convert signal is applied to the scan control 600 to initiate the operation of an arithmetic unit in scan control 600. The arithmetic unit in scan control 600 computes a resultant gray level value $RGL = A + K(A - B)$ corresponding to the sample point. While the computation is being performed, the X major value in the register of scan control 600 is transferred and loaded into the skip counter in the scan/plot common control 500 in preparation for the next scan sample point. Also, the scan/plot byte counter is decremented by 1 indicating that one byte has been sampled. At the end of the computation, the RGL value signal is applied from scan control 600 via the scan out bus to the buffer and bus control 1100 and a data store signal is transmitted to control 1100 to initiate a buffer cycle to load the RGL value in buffer 1200. At the same time, the data store signal conditions scan control 600 for an X minor step for the next scan sample point.

Since the X major value is presently stored in the skip counter of the scan/plot common control 500, the gated drum pulses are applied to decrement this counter down to zero as the drum 2 continues to rotate in the X dimension. When the skip counter equals zero a second conversion is initiated to generate a second sharp value signal A and unsharp value signal B which are applied to scan control 600. At the end of the conversion the computation of the second RGL value is initiated.

While the second RGL is being computed, the X minor value is transferred from scan control 600 and loaded into the skip counter in scan/plot common control 500 and the scan/plot byte counter is decremented a second time to indicate a second byte has been sampled. At the end of the computation, the second RGL is applied via the scan out bus to the buffer and bus control 1100 and another data store signal is applied to buffer and bus control 1100 to initiate another buffer cycle to store the second RGL in buffer 1200. At the same time, the data store signal conditions scan control 600 for an X major step in preparation for the next scan sample point. In a similar manner, scan samples are taken at X major, X minor, X major, X minor distances etc. along the document as shown in FIG. 10. This process continues until the scan/plot byte counter is decremented down to zero. At that point, scan/plot common control 500 issues a byte count equals zero signal to mode control 400. Mode control 400, in turn, signals drum control 300 to terminate further production of gated pulses and produces an end S/P signal which terminates the scan signal and is also applied to scan control 600 and common control 1000 indicating the end of the scan mode of operation. At scan control 600, the end S/P signal is effective to step the sequence counter to Seq 1. At common control 1000, the end S/P signal is effective to cause a device end signal to be transmitted to the data processing system to indicate that the execution of the load scan buffer command has been completed. At the same time, common control 1000 applies a status reset device end signal to Y control 800.

At Y control 800, previously conditioned for Y minor stepping, the status reset device end signal is effective to load the Y minor value from the register in which it is stored to a Y counter in preparation for stepping the head assembly axially in the Y direction in accordance with Y minor value prior to the next revolution of the drum 2 when the next scan line of the document is to sampled. At the same time, Y control 800 applies a start step signal to the Y stepping motor control to initiate movement of the head assembly in the Y direction. The Y stepping motorlead screw combination provides step increments of 0.275 mils per step in the Y direction, two steps are taken for each Y increment and two step head signals are applied back to Y control 800 after which the Y counter in Y control 800 is decremented by 1 to indicate a 0.55 mil Y increment by the head assembly. When the Y counter in the Y control 800 reaches a count of 1, Y control 800 is conditioned to terminate the start step signal and after the next two step head signals are received from the Y stepping motor control the start step signal is terminated to stop the axial movement of the Y motor 18 and to produce a head stopped signal back to common control 1000 to indicate this condition.

At the end of the execution of the load scan buffer command and while the head assembly is moving in the Y direction, the data processing system transmits a read buffer command to the scanner/plotter control unit. Common control 1000 decodes the command and produces a series of read signals to the buffer and bus control 1100 to initiate a series of buffer cycles to unload the buffer 1200 and apply the record block of bytes scanned during the first scan line via the data out bus to buffer and bus control 1100 and via the out bus to common control 1000 and via the channel bus to the data processing system. When the buffer 1200 is completely unloaded this condition is detected by the buffer and bus control 1100 which produces a buffer end signal to common control 1000 to signal this condition. At common control 1000 the buffer end signal is effective to cause channel end and device end signals to be transmitted to the data processing system to indicate that the execution of the read buffer command has been completed.

Next, the data processing system transmits a second load scan buffer command to the scanner/plotter control unit in preparation for performing a scan operation along the second scan line. Common control 1000 decodes the command, as before, and transmits a channel end signal to the data processing system to indicate the ISS is completed. If the head assembly is moving in an axial direction the execution of the command does not proceed until such time as a head stopped signal is received from Y control 800. When the head stopped signal is received, common control 1000 then proceeds to issue a start scan/plot signal to mode control 400, scan/plot common control 500, scan control 600 and Y control 800. At mode control 400, the start scan/plot signal is again effective to cause a scan signal to be produced indicating that the scanner/plotter is in the scan mode of operation. The scan signal from mode control 400 is again applied to drum control 300 to condition circuitry in preparation for receiving the index pulse. At the scan/plot common control 500, the start scan/plot signal is again effective to load the X skip value from the register in which it is stored to the skip counter and to also load the scan count value from the register in which it is stored to the scan/plot byte counter. At the scan control 600, since the sequence counter is now set at Seq 1, the start scan/plot signal is effective to condition the scan control 600 for an X minor step. At Y control 800, the start scan/plot signal is effective to condition Y control 800 for a Y major step operation.

When the index pulse is received by drum control 300, a gated index pulse is again produced as well as a series of gated drum pulses. Since the sequence counter is now set at Seq 1, the gated index pulse further conditions the scan control 600 for an X slip operation. As the drum rotates, the gated drum pulses are applied to scan/plot common control 500 to decrement the skip counter until the skip counter equals zero indicating that the drum has rotated the X skip distance. Scan/plot common control 500 then issues a start convert signal to the A/D converter 100 to generate a digital sharp value signal A and a digital unsharp value B corresponding to the sample point presently being scanned. When the A/D conversion is complete, an end convert signal is applied to the scan control 600 to initiate operation of the arithmetic unit in scan control 600. Since the scan control 600 is conditioned for an X slip operation, the X slip value in the register of scan control 600 is transferred and loaded into the skip counter in the scan/plot common control 500 in preparation for the X slip operation. At the scan control 600, the skip counter is decremented by one, the computation cycle is terminated and the X slip conditioning of the scan control 600 is terminated. As the drum continues to rotate, the gated drum pulses are again applied to scan/plot common control 500 to continue decrementing the X slip value in the skip counter, until the X slip value equals zero and a skip counter equals zero signal is produced indicating the first scan sample position has been reached for the second scan line. It should be noted that this scan sample position of scan line 2 is offset from the first scan sample position of scan line by the X slip value as shown in FIG. 10. Scan/plot common control 500 then issues a start convert to the A/D converter 100 to generate a digital sharp value signal A and a digital unsharp value signal B corresponding to the first sample point presently being scanned. When the A/D conversion is complete, an end convert signal is applied to scan control 600 to initiate the operation of the arithmetic unit in the scan control 600 to compute a RGL value corresponding to the sample point. While the computation is being performed, the X minor value in the register of scan control 600 is transferred and loaded into the skip counter in the scan/plot common control 500 in preparation for the next scan sample point. Also the scan/plot byte counter is decremented by one indicating that one byte has been sampled. At the end of the computation, the RGL signal is applied from the scan control 600 via the scan out bus to the buffer and bus control 1100 and a data store signal is transmitted to control 1100 to initiate a buffer cycle to load the RGL in buffer 1200. At the same time, the data store signal conditions scan control 600 for an X major step for the next scan sample point.

Since the X minor value is presently stored in the skip counter of the scan/plot common control 500, the gated drum pulses are applied to decrement this counter down to zero as the drum 2 continues to rotate in the X dimension. When the skip counter equals zero a second conversion is initiated to generate a second sharp value signal A and an unsharp value signal B which are applied to scan control 600. At the end of the conversion, the computation of a second RGL value is initiated.

While the second RGL is being computed, the X major value is transferred from scan control 600 and loaded into the skip counter in scan/plot common control 500 and the scan/plot byte counter is decremented a second time to indicate a second byte has been sampled. At the end of the computation, the second RGL is applied via the scan out bus to the buffer and bus control 1100 and another data store signal is applied to buffer and bus control 1100 to initiate another buffer cycle to store the second RGL in buffer 1200. At the same time, the data store signal conditions scan control 600 for an X minor step in preparation for the next scan sample point. In a similar manner, scan samples are taken at X minor, X major, X minor, X major distances etc. along the document as shown in FIG. 10. This process continues until the scan/plot byte counter is decremented down to zero. At that point, scan/plot common control 500 issues a byte count equals zero signal to mode control 400. Mode control 400, in turn, signals drum control 300 to terminate further production of gated pulses and produces an end S/P signal which terminates the scan signal and is also applied to scan control 600 and common control 1000 indicating the end of the scan mode of operation. At scan control 600, the S/P signal is effective to step the sequence counter to Seq 2. At common control 1000, the end S/P signal is effective to cause a device end signal to be transmitted to the data processing system to indicate that the execution of the load scan buffer command has been completed. At the same time, common control 1000 applies a status reset device end signal to Y control 800.

At Y control 800, previously conditioned for Y major stepping, the status reset device end signal is effective to load the Y major value from a register in which it is stored to the Y counter in preparation for stepping the head assembly axially in the Y direction in accordance with the Y major value prior to the next revolution of the drum 2 when the third scan line of document is to be sampled. At the same time, Y control 800 again applies a start step signal to the Y stepping motor control to initiate movement of the head assembly in the Y direction. The Y stepping motor-lead screw combination provides two steps for each Y increment and two step head signals are applied back to Y control 800 after which the Y counter in Y control 800 is decremented by one to indicate a 0.55 mil Y increment by the head assembly. When the Y counter in the Y control 800 reaches a count of one, Y control 800 is conditioned to terminate the start step signal and after the next two step head signals are received from the Y stepping motor control, the start step signal is terminated to stop the axial movement of the Y motor 18 and to produce a head stopped signal back to common to indicate this condition.

At the end of the execution of the second load scan buffer command and while the head assembly is moving in the Y direction, the data processing system transmits another read buffer command to the scanner/plotter control unit. This command is executed as before to unload the buffer 1200 and apply the record block of bytes scanned during the second scan line to the data processing system.

Referring now to FIG. 10, it can be seen that the third scan line, which is a Seq 2 operation, is performed in the same manner as that performed for Seq 1 operation for the second scan line and that the fourth scan line, which is a Seq 3 operation, is performed in the same manner as that performed for the first scan line. Thus, by successive load scan buffer and read buffer commands successive scan line operations for the document are performed in which scan samples are taken along the scan line with the RGL values loaded in the buffer of the scanner/plotter after which they are read to the data processing system while the head assembly is moving in an axial direction in preparation for the succeeding scan line. The scanning job, therefore, is performed by a series of successive groups of 4 scan lines corresponding to the 4 sequences.

When the data processing system has determined that the number of scan lines required to scan the entire document has been completed, a control drum stop command is issued to the scanner/plotter control unit in order to stop the operation of the drum 2. Common control 1000 decodes the command and transmits a channel end signal to the data processing system to indicate the ISS is completed. Common control 1000 then issues a stop drum signal to drum control 300 which terminates the start drum signal causing drum 2 to stop and to terminate the drum ready line to common control 1000 to indicate that the drum 2 is no longer in a ready condition. This effectively ends the scan operation.

Scan Data Processing

The data processing system now begins the job of processing the scan data to a form for halftone plotting. This is accomplished in a manner which will be described in greater detail hereafter. Generally, the data processing operation first involves a tone conversion process which converts the quardant RGL data, ranging in values from 0 to 255, to halftone data, ranging in values from 1 to 50. Once the tone conversion process is completed the structuring of halftone plot data is then performed. This is accomplished by extracting binary plot pattern data for each quardant halftone value and formatting it with adjacent binary plot pattern data to provide a meshed cell configuration. The fully assembled meshed halftone plot data corresponding to the original scanned document is then ready to be plotted on film or photosensitive material by the scanner/plotter control unit.

Plot Operation

Referring again to FIG. 1, the film or photosensitive material is mounted on the drum 2 and again by a combination of the operation of the single/continuous and right/left switches at the operator panel, the head assembly is moved into position adjacent an edge of the document. At the operator panel, by operation of a combination of the mirror/normal and positive/negative switches, the operator has the option of plotting normal-positive, normal-negative, mirror-positive or mirror-negative as shown in FIG. 16. The mirror/normal switch signal is applied to the buffer and bus control 1100 to control passing data received from the buffer 1200 to the S/P in bus in a normal or permuted manner while the positive/negative switch signal is applied to plot data control 200 to control passing plot data, whether mirror or normal, received on S/P in bus as received or as inverted. At the head assembly, the scan/plot lever 44 is moved to the plot position and switch 20 is switched to the plot position to bring up a signal on the plot sw line. The signal on the plot sw line is applied to condition the drum 6 for the slower speed operation, to condition mode control 400 and plot control 900 for the plot mode of operation and to condition Y control 800 for a fixed Y stepping in the Y direction. The operator then presses the start drum push button which, as before, applies a signal to the drum control 300 to produce a start drum signal to initiate movement of the drum motor 6. When the drum reaches operating speed, a signal is applied via the drum up to speed line to the drum control 300. When the index point is reached i.e. index pulse is detected, drum control 300 produces a drum ready signal to common control 1000 to bring up a ready device end signal which is applied to the data processing system to initiate the sequence of commands for the plot operation.

The data processing system first issues the control set up command to the scanner/plotter control unit followed by the series of control bytes which are passed via the in bus and buffer and bus control 1100 to the S/P in bus. Control signals from common control 1000 direct the control data i.e. skip value and plot count value on the S/P in bus to the skip register and scan/plot byte register in scan/plot common control 500. The last control byte contains a bit indication as to whether film or photosensitive paper has been mounted on the drum 2. Accordingly, a control signal from common control directs this bit of the last control byte to scan/plot common control 500. If scan/plot common control 500 detects a 1 bit in the last control byte indicating a paper rather than film plot operation, a signal is applied to condition Plot Control 900 for the paper plot operation, otherwise Plot Control 900 is normally conditioned for a film plot operation. Following this, channel end and device end signals are transmitted to the data processing system to indicate that the execution of the control set up command has been completed.

The data processing system next issues a write command followed by a record block of halftone plot data to common control 1000 of the scanner/plotter control unit. Common control 1000 decodes the command and produces a series of write signals to the buffer and bus control 1100 each of which initiates a buffer cycle of operation to load a byte of halftone plot data via the data in bus to buffer 1200. After buffer 1200 is loaded with the record block of halftone plot data common control 1000 applies a channel end signal to the data processing system to indicate that the first band or record block of halftone plot data has been loaded in the buffer 1200. If the head assembly is stopped, as it will be initially, common control 1000 issues a start scan/plot signal to mode control 400 and to scan/plot common control 500. At mode control 400, start scan/plot signal is effective to cause a plot signal to be produced indicating that the scanner/plotter is in the plot mode of operation. The plot signal from mode control 400 is applied to condition drum control 300 in preparation for receiving an index pulse. At scan/plot common control 500, the start scan/plot signal is effective to load the X skip value from the register in which it is stored to the skip counter and to also load the plot count value from the register in which it is stored to the scan/plot byte counter.

When the index pulse is received by drum control 300 a gated index pulse is produced and then a series of gated drum pulses. As the drum rotates the gated drum pulses are applied to scan/plot common control 500 to decrement the skip counter until the skip counter equals zero indicating the first plot position has been reached. The skip counter equals zero signal is applied to condition plot control 900 for a plot operation. Plot control 900, in being conditioned for a plot operation, applies a data fetch signal to the buffer and bus control 1100 to initiate a buffer cycle to read the first byte of halftone plot data from the buffer 1200. The byte of halftone plot data read out of the buffer 1200 is transferred via data out bus to buffer and bus control 1100 where it is passed in normal or mirror form, depending upon the setting of the mirror/normal switch at the operator panel, and where it is applied via the S/P in bus to plot data control 200 where the halftone plot data is complemented or not depending upon the setting of the POS/NEG switch at the Operator panel. The next occuring gated drum pulse, after that which caused the skip counter to decrement to zero, is applied to the conditioned plot control 900 causing a signal to be applied on the sample data line to the plot data control 200 to gate the byte of halftone plot data on the S/P in bus via the plot out bus to the head assembly where it is caused to be plotted on the document. Following this, plot control 900 applies a signal to decrement the S/P byte counter in scan/plot common control 500 to indicate that the first byte of halftone plot data has been plotted on the document. At the same time, plot control 900 becomes deconditioned in preparation for receiving the next gated drum pulse. When the next gated drum pulse occurs, it again conditions plot control 900 and produces a data fetch signal to the buffer and bus control 1100 to initiate another buffer cycle to read the next byte of halftone plot data from the buffer 1200 and apply it via the data out bus to buffer and bus control 1100 and then via S/P in bus to plot data control 200. Plot control 900 again being conditioned for plotting responds to the next succeeding gated drum pulse to again produce a signal on the sample data line to the plot data control 200 to gate the second byte of halftone plot data via the plot out bus to the head assembly where it is caused to be plotted on the document. Following this, plot control 900 again applies a signal to decrement the S/P byte counter in scan/plot common control 500 to indicate that the second byte of halftone plot data has been plotted on the document and plot control 900 again becomes deconditioned in preparation for receiving the next gated drum pulse. In a similar manner, each alternate gated drum pulse conditions plot control 900 for a plot cycle, signals the buffer and bus control 1100 to initiate a buffer cycle to read the next byte of halftone plot data to the plot data control 200 and each next succeeding alternate gated drum pulse produces the sample data signal to permit the byte of halftone plot data to be plotted on the document and to decondition the plot control 900 as well as decrement S/P byte counter in scan/plot common control 500. It should be noted that the drum moves in the X dimension at the rate of 1.1 mils per drum pulse and since it requires two drum pulses per plot of data, then it should be apparent that a byte of plot data is plotted every 2.2 mils on the document. This plot process continues until the S/P byte count in scan/plot common control 500 is decremented to zero. At that time, scan/plot common control 500 applies a signal on the byte counter equals zero line to decondition further plot cycles of operation of plot control 900. The byte counter equals zero signal is also applied to mode control 400 which, in turn, produces an end S/P signal which signals drum control 300 to terminate further production of gated pulses, terminates the plot signal and is also applied to signal common control 1000 of the end of the plot mode of operation.

At common control 1000, the end S/P signal is effective to cause a device end signal to be transmitted to the data processing system to indicate that the execution of write command has been completed. At the same time, common control 1000 applies a status reset device end signal to Y control 800.

At Y control 800, previously conditioned for Y fixed stepping by the plot mode switch being turned on, the status reset device end signal is effective to load the high order stage of the Y counter in preparation for stepping the head assembly axially in the Y direction in accordance with a fixed count (32) set in the Y counter prior to the next revolution of the drum 2 when the next band of plot data is to be plotted on the document. Since a byte of plot data occupies 17.6 mils (8 bits × 2.2 mils/bit) it is necessary to step the head assembly a distance of 17.6 mils in preparation for plotting the next band of plot data. It should be apparent that since each Y increment moves the head assembly 0.55 mils, it will be necessary to provide 32Y increments in order to move the head assembly the 17.6 mil distance. At the same time, the status reset device end signal is effective to cause Y control 800 to apply a start step signal to the Y stepping motor 18 to initiate movement of the head assembly in the Y direction. Two steps are taken for each Y increment providing two head step signals back to Y control 800 after which the Y counter in Y control 800 is decremented by 1 to indicate a 0.55 mil Y increment by the head assembly. When the Y counter in Y control 800 reaches a count of 1, Y control 800 is conditioned to terminate the start step signal after the next two head step signals are received from the Y stepping motor control to stop the axial movement of the Y motor 18. As the head assembly movement stops, Y control 800 applies a head stopped signal to common control 1000 to indicate this condition.

At the end of the execution of the first write command and while the head assembly is moving in the Y direction, the data processing system transmits a second write command followed by another record block of halftone plot data to common control 1000 of the scanner/plotter control unit. Common control 1000 again decodes the command and produces a series of write signals to the buffer and bus control 1100 each of which initiates a buffer cycle of operation to load a byte of halftone plot data in the buffer 1200. After buffer 1200 is loaded with the record block of halftone plot data, common control 1000 applies a channel end signal to the data processing system to indicate that the second band or record block of halftone plot data has been loaded in the buffer 1200. If the head assembly is still moving in an axial direction, the execution of the write command does not proceed until such time as a head stopped signal is received from Y control 800, in a similar manner as previously described in the case of the load scan buffer command. When the head stopped signal is received or if it has already been received, execution of the write command is performed to plot the next band of halftone plot data on the document in the same manner as previously described with respect to the first write command. In a similar manner, by successive write commands each followed by a fixed Y increment of 17.6 mils of the head assembly, the entire halftone reproduction is plotted on the plot document.

When the data processing system determines that the number of plot bands required to be plotted has been completed, a control drum stop command is issued to the scanner/plotter control unit in order to stop the operation of the drum 2. The execution of the control drum stop command is the same as that described for stopping drum 2 after completing the scan operation and effectively ends the plot operation.

DETAILED DESCRIPTION OF THE SCAN OPERATION Initial Set Up Operation

Referring to FIG. 1, before the start of the scan operation, the carrier sheet with the document to be scanned is mounted on drum 2 and by a combination of the operation of the single/continuous and right/left switches at the operator panel the head assembly is moved into position adjacent an edge of the document. At the head assembly, the scan/plot lever 44 is moved to the scan position and switch 20 is switched to the scan position to apply a ground signal on the scan SW line. The signal on the scan SW line is applied to condition the drum motor control for the higher speed operation. Referring now to FIG. 23A, the ground signal on the scan SW line is applied to signal lamp control 205 to turn on the scan lamp, to signal the drum motor to control the faster operation and is also applied to inverter 401 in FIG. 23D where it is inverted to a positive signal to condition the scan flip flop 402 for being turned on. The operator then presses the start drum push button in FIG. 23A to apply a signal to turn on the start drum flip flop 319 which in being turned on applies a positive signal to the drum motor control to initiate movement of the drum motor. When the drum motor reaches operating speed a positive pulse is applied from the drum motor control via the drum up to speed line to condition the AND circuit 320. When the synchronization point i.e. index pulse, is detected by the light sensor 8 a positive pulse is generated by the pulse amplifier 10 and applied to render the AND circuit 320 effective to apply a negative pulse to turn on the drum ready flip flop 322. The drum ready flip flop 322 in being turned on applies a signal via the common control bus to common control 1000 which, in turn, signals the data processing system that the drum is ready to perform the scan operation. It should be noted that the AND circuits used in this system are AND invert circuits unless otherwise indicated so that the AND circuit is rendered effective by a combination of positive signals at all inputs thereof to produce a negative signal otherwise a positive signal is maintained at the output thereof. Similarly, all OR circuits are negative OR circuits unless otherwise indicated so that the OR circuit is rendered effective by a negative signal at any input thereof to produce a positive signal otherwise a negative signal is maintained at the output thereof.

Control Set Up Command Operation

Figure 23B:
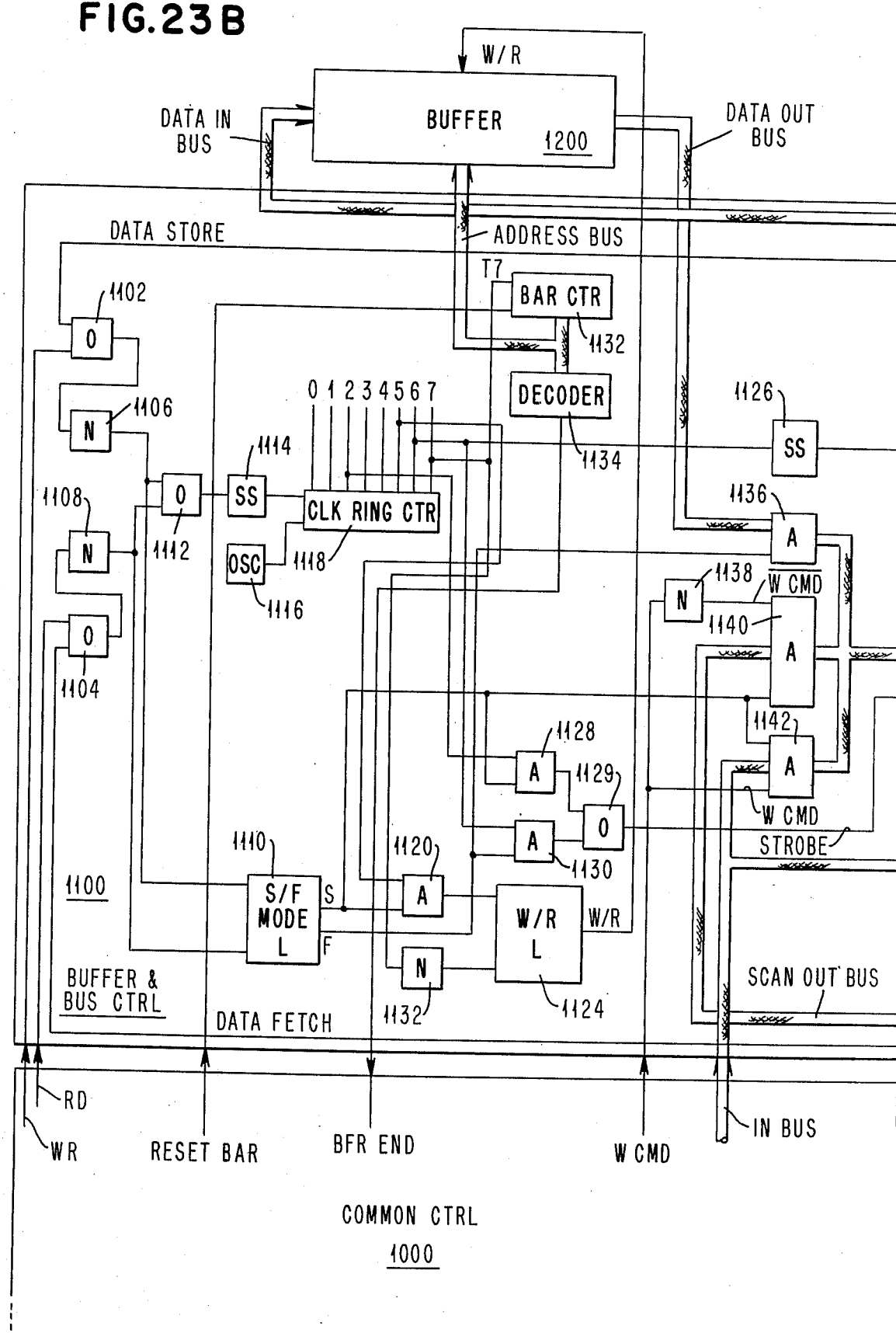
FIG. 23 is a diagram of how FIGS. 23A through 23O may be placed to form a composite block diagram.
FIGS. 23A through 23O, taken together, comprise a detailed schematic diagram of the scanner/plotter control unit of the present invention.
Figure 23C:
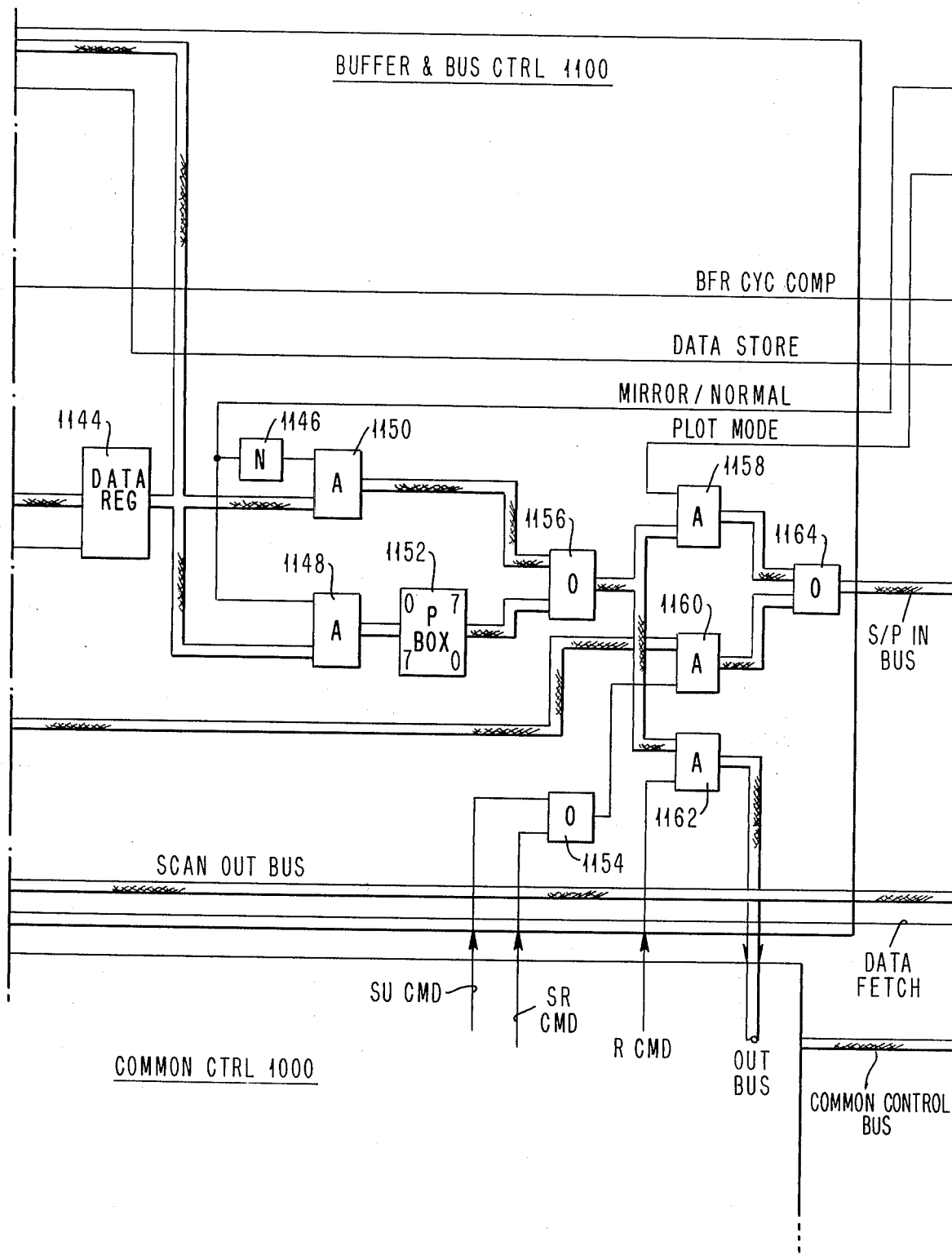
Figure 23D:
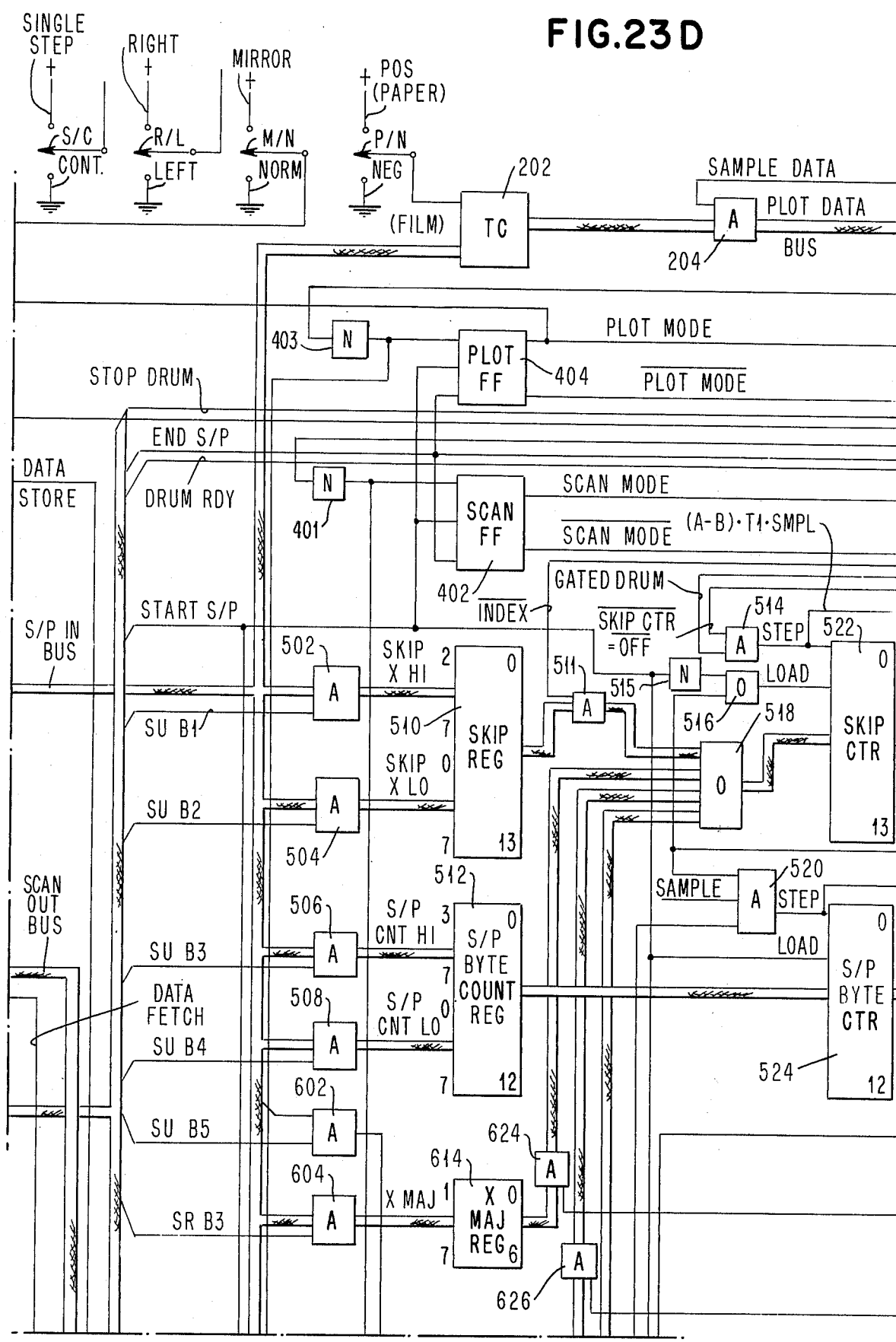

As previously described in connection with the general description of FIG. 1 and the description of FIG. 17 to FIG. 21, the scan operation is performed by executing the following sequence of commands; control setup, control set repro, load scan buffer, read buffer, load scan buffer, read buffer . . . control drum stop. Accordingly, in response to the drum ready device end signal from common control 1000 the data processing system transmits the control setup command to the scanner/plotter control unit followed by the series of control bytes shown in FIG. 17. Referring now to FIGS. 23B, 23C and 23D, the control setup command is decoded at common control 1000 and a negative signal is applied via the SU CMD line to the OR circuit 1154 which in turn applies a positive signal to condition the AND circuits 1160 so that as each succeeding control byte is received it is passed via the in bus and the now conditioned AND circuits 1160 and OR circuits 1164 to the S/P IN BUS. As the first control byte, representing the high order portion of the skip X value, is applied to the S/P IN BUS, common control 1000 applies a positive control pulse via the common control bus and the SU B1 control line to gate the first control byte into the high order portion of the skip register 510. In a similar manner, succeeding ones of the control bytes are applied to the S/P IN BUS and succeeding positive control pulses are applied via the common control bus and SU B2, SU B3, SU B4, and SU B5 control lines to render the AND circuits 504, 506, 508 and 602 effective in succession to load the low order portion of the skip X value in skip register 510, to load the high order portion of the scan count in the S/P byte count register 512 and to load the low order portion of the scan count in the register 512, respectively. The output of the AND circuit 602 is used during a PLOT operation which will be described in greater detail hereafter. Following this, common control 1000 signals the data processing system that execution of the control setup command has been completed and may proceed to the Control Set Repro Command.

Control Set Repro Command Operation

The data processor issues the control set repro command followed by the incremental control parameter bytes shown in FIG. 18 which are applied to common control 1000 of the scanner/plotter control unit. The control set repro command is decoded by common control 1000 and a negative signal is applied via the SR CMD line in FIG. 23C to OR circuit 1154 which in turn applies a positive conditioning signal to AND circuits 1160. Common control 1000 then applies a positive pulse via the common control bus to the SR A line in FIG. 23K. The negative trailing edge of this pulse is effective to reset the Y maj/min flip flop 818 which in being reset applies a positive signal to condition flip flop 818 for being turned on. Following this, the succeeding incremental control parameter bytes are passed via the now conditioned AND circuits 1160 and OR circuits 1164 to the S/P IN BUS and succeeding positive control pulses are applied via the common control bus to the SR B1 and SR B2 control lines in FIG. 23K, SR B3 control line in FIG. 23D and SR B4, SR B5, SR B6 and SR B7 control lines in FIG. 23F to render the AND circuits 802 and 804 in FIG. 23K effective to load the Y major and Y minor values in the Y MAJ register 806 and Y MIN register 808, respectively, the AND circuits 604 in FIG. 23D and 606 in FIG. 23F effective to load the X MAJ and X MIN values in the X MAJ register 614 and X MIN register 616, respectively, the AND circuits 608, 610 and 612 effective to load the X SLIP, K FCT and APT values in the SLIP register 618, K FCT register 620 and APT register 622, respectively. It should be noted that the control pulse on the SR B4 control line in addition to conditioning the AND circuit 606 is applied to reset the sequence counter 640. Referring now to FIG. 18 it will be observed that the five low order bits of the fifth incremental control parameter byte contains the X SLIP value while the two high order bits contain sequence counter values. The sequence counter bits may have values 00, 01, 10 or 11 depending on the function to be performed but normally in the scan operation the values 00 will be contained in these bit positions so that when the control pulse is applied to the SR B5 control line to condition the AND circuit 608, the X SLIP value is loaded in the SLIP register 618 while the sequence count bits 00 are loaded into the sequence counter 640 such that the sequence counter 640 will initially be in a sequence 0 state. This condition is decoded by decoder 650 which applies a positive signal on the Seq. 0 or 3 line to condition the AND circuit 656.

Referring now to FIG. 23A, an aperture position signal from the aperture position switch 50 on the head assembly is applied via the aperture position bus to the compare circuit 632 in FIG. 23F. At the same time the aperture set number value in the aperture register 622, decoded by decoder 643, is compared with the value of the present setting of the aperture position switch. If the two values do not compare then the compare circuit applies a negative signal to decondition the aperture flip flop 636 whereas if the two values compare then a positive signal is applied to condition the aperture flip flop 636 for being turned on. Following the application of a control pulse on the SR B7 control line, common control 1000 applies a negative pulse on the SET APR line which is applied to reset the aperture flip flop 636 and to condition the single shot 634. The aperture flip flop 636 in being turned off applies a positive signal from the lower output thereof to condition the AND circuit 646 and to fire the now conditioned single shot 634 which, in being fired, produces a negative pulse having a 110ms time period. The positive trailing edge of the negative pulse is applied to attempt to turn on the aperture flip flop 636 which is conditioned for being turned on or not according to the output of the compare circuit 632. If the position of the aperture switch does compare with the aperture position number in the aperture register 622, compare circuit 632 maintains a deconditioning signal to the aperture flip flop 636 which, in turn, remains off and conditions the AND circuits 646. At the same time that the aperture flip flop 636 is being sampled the single shot 638 is fired to apply a positive 40ms pulse to render the AND circuit 646 effective to apply a signal to the aperture stepping motor control 647 which in turn signals the aperture stepping motor 48 in FIG. 23A to move the aperture position switch to the next position. At the negative trailing edge of the 40ms pulse the single shot 634 is again fired to produce another 110ms negative pulse, the period of the two single shots allowing for the electro mechanical movement of the aperture position switch 50. Assuming at this time that the new aperture switch position compares with the aperture position number stored in the aperture register 622, the compare circuit 632 applies a positive conditioning signal to the aperture flip flop conditioning it for being turned on. Accordingly, the positive trailing edge of the negative 110ms pulse from the single shot 634 is effective to turn on the aperture flip flop 636 which, in being turned on, applies a positive conditioning signal to the AND circuit 648 and a negative deconditioning signal to the AND circuit 646 and the single shot 634. Therefore, when the single shot 638 is fired, the positive 40ms pulse is applied to render the AND circuit 648 effective to apply a signal on the APR POS line which is passed via the common control bus to signal the common control 1000 that the aperture switch and in turn the aperture disks 52 and 54 have been properly positioned in accordance with the aperture position number value set in the aperture register 622. Additionally, since the single shot 634 is deconditioned by the negative output from the aperture flip flop 636, then the trailing edge of the positive 40ms pulse from single shot 638 is ineffective to fire the single shot 634 and prevent the further recycling of these two single shots. It should be apparent that the aperture stepping motor will continue to be stepped successively so long as the position of the aperture switch and the aperture number value set in the aperture register 622 do not compare but that when a compare is obtained further stepping of the aperture motor is inhibited and the aperture disks are properly position in accordance with the predetermined reproduction ratio selected. Referring to FIG. 23A, it will also be noted that when the aperture position switch 50 reaches the selected position, the signal applied to the aperture bus is also applied to lamp control 205 to adjust the brightness of the lamp in accordance with the size of the selected holes in the positioned aperture disks to maintain the illumination constant. In response to the signal on the APR POS line, common control 1000 signals the data processing system to indicate that the execution of the control set repro command has been completed.

Load Scan Buffer Command Operation — Sequence 0

Next, the data processor transmits a load scan buffer command to the scanner/plotter control unit. Common control 1000 decodes the command and since the head assembly is not moving, common control 1000 issues a positive pulse via the common control bus to the start S/P control line in FIG. 23D. The operation of the scanner/plotter control unit can now be followed in conjunction with the timing diagram shown in FIG. 25 which illustrates a representative example of the scan operation during Seq. 0 where the reproduction parameters have the following representative values;

Skip = 2, X Maj = 7, Min = 3, Slip = 4 and Byte Count = 4.

Figure 23G:
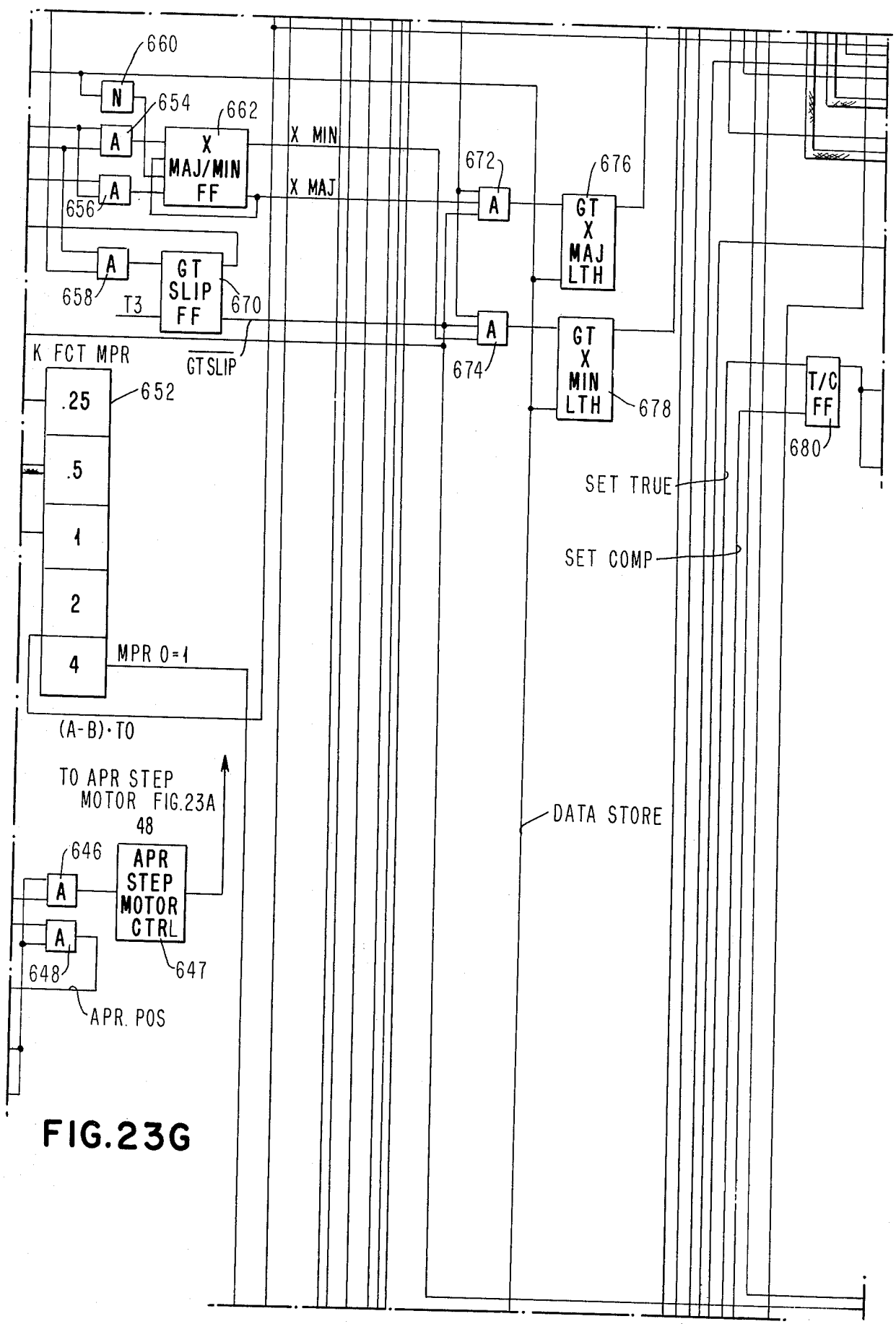

The positive control pulse on the start S/P control line is applied to the scan flip flop 402 which was previously conditioned when the mode switch 20 in FIG. 23A was positioned for the scan mode operation. Accordingly, the scan flip flop 402 is turned on to apply a positive signal to the scan mode line and a negative signal to the not scan mode line. The positive signal on the scan mode line is applied to condition the AND circuit 302 in FIG. 23A in preparation for receiving the index pulse while the negative signal on the not scan mode line is applied to OR circuit 418 in FIG. 23E which, in turn, applies a positive signal via the ANY OP line to condition the single shot 422. Referring now to FIG. 23G, the gate flip flop 670, gate X MAJ latch 676 and gate X MIN latch 678 are all initially in the reset state and, consequently, apply negative signals from the upper outputs thereof to decondition the AND circuits 628 in FIG. 23F and the AND circuits 624 and 626 in FIG. 23D, respectively, to block the outputs of the X MAJ register 614, X MIN register 616 and X SLIP register 618 from being transferred to the skip counter 522. However, referring to FIG. 23A the Index flip flop 310 in being initially in a reset state applies a positive signal on the not Index line in FIG. 23D to render the AND circuits 511 effective to pass the X skip value in register 510 via the OR circuits 518 to the skip counter 522. Accordingly, the positive pulse on the start S/P control line is applied to the inverter 515 where it is inverted to a negative pulse and applied to the OR circuit 516 which, in turn, applies a positive load signal to the skip counter 522 to effectively load the X Skip value from skip register 510 into Skip counter 522. As a result of loading the X Skip value in the Skip counter 522, decoder 526 in FIG. 23E decodes the fact that a zero value is no longer contained in the Skip counter and a negative signal will be applied and maintained on the SKIP CTR=0 line until the Skip counter 522 is decremented to 0. It will be apparent that if the Skip value = 0, then there will be no change made in the content of the Skip counter 522 and a positive signal will be maintained on the SKIP CTR=0 line since the scan sampling in that case will start from the index point.

Referring again to FIG. 23D, the positive pulse on start S/P line is applied as a load signal to load the content of the S/P byte count register 512 into the S/P byte counter 524. Decoder 528 in FIG. 23E decodes the fact that a 0 value is no longer stored in the byte counter 524 and, therefore, applies and maintains a negative signal on the BYTE CNT=0 line until such time as the byte counter 524 is decremented at 0. The positive pulse on start S/P line is also applied to the AND circuit 656 in FIG. 23G which is conditioned by the positive signal on the Seq. 0 or 3 line from decoder 650. Accordingly, the AND circuit 656 is rendered effective to apply a negative pulse to reset the X MAJ/MIN flip flop 662 which, in being reset, applies a positive signal from the lower output thereof to one input of the AND circuit 672 and to condition the flip flop 662 for being turned on. The gate flip flop 670 being initially in the reset state applies a positive signal to a second input of the AND circuit 672 conditioning the AND circuit in preparation for gating an X major value from the X MAJ register 614 to the Skip counter 522 in FIG. 23D. Referring now to FIG. 23K, the Y MAJ/MIN flip flop 818 is initially in a reset state with a positive signal from the lower output conditioning the flip flop to be turned on. Accordingly, the positive pulse on the start S/P control line is applied to turn on the Y MAJ/MIN flip flop 818 which in being turned on applies a positive signal to condition the AND circuits 816 for passing the Y Minor value in Y MIN register 808 to the Y counter 820.

Referring to FIG. 23A, when the index line is next sensed a positive pulse is produced on the index pulse line and applied to the AND circuit 302 which is now conditioned by a positive signal on the Scan Mode line and is rendered effective to apply a negative pulse to the OR circuit 306 which in turn applies a positive pulse to the inverter 308 where it is inverted to a negative pulse to turn on the Index flip flop 310. The Index flip flop 310 in being turned on applies a positive signal which in combination with the positive Index pulse renders the AND circuit 311 effective to apply a negative pulse to the inverter 313 where it is inverted to a positive pulse on the gated Index pulse line. Following this, the first drum line is sensed and a positive pulse is produced on the drum pulse line and applied to the AND circuit 312 which is conditioned by a positive signal from the Index flip flop 310. The AND circuit 312 is rendered effective to apply a negative pulse to step the counter 314, this counter being provided to keep track of the drum pulses received from the drum. The negative pulse from the AND circuit 312 is also applied to the inverter 326 where it is inverted to a positive pulse on the gated drum pulses line to the AND circuit 514 in FIG. 23D. Referring to FIG. 23E the SKIP CTR=0 flip flop 532 is initially in a reset state causing a positive signal to be applied from its lower output to condition the AND circuit 514 in FIG. 23D so that when the gated drum pulse is received, the AND circuit 514 is rendered effective to apply a negative pulse via the step line to decrement the Skip counter 522 by 1. In a similar fashion, each succeeding gated drum pulse is applied to decrement the skip counter 522 by 1 until such time as the Skip counter reaches a count of zero. At that time, decoder 526 in FIG. 23E decodes this condition and applies a positive signal via the SKIP CTR=0 line to the AND circuit 530 which in combination with the gated drum pulse that caused the Skip counter to step to 0 renders the AND circuit 530 effective to apply a negative pulse to the OR circuit 531 which, in turn, applies a positive pulse to the SKIP CTR=0 flip flop 532. The negative trailing edge of the positive pulse is effective to turn on the SKIP CTR=0 flip flop which, in being turned on, applies a positive signal to one input of the AND circuit 534. Since the Byte count in Byte counter 524 in FIG. 23D is at a value other than zero, decoder 528 in FIG. 23E maintains a negative signal on the BYTE CNT=0 line which is applied to the inverter 533 where it is inverted to a positive signal and applied to a second input of the AND circuit 534. Additionally, the positive signal maintained on the Scan mode line is applied to a third input of the AND circuit 534 thereby conditioning the AND circuit so that at the next occurring gated drum pulse the AND circuit 534 is rendered effective to apply a negative pulse to the inverter 535 where it is inverted to a positive pulse and applied to the Start Convert line. The positive pulse on the Start Convert line is applied to the AND circuit 672 in FIG. 23G which is presently conditioned by positive signals from the lower output of the X MAJ/MIN flip flop 662 and the lower output of the GT Slip flip flop 670. Accordingly, the AND circuit 672 is rendered effective to apply a negative pulse to turn on the GT X MAJ latch 676 which in being turned on applies a positive signal to condition the AND circuits 624 in FIG. 23D for transferring the X Major value from the X MAJ register 614 to the Skip counter 522. Referring now to FIG. 23A, the positive pulse on the Start Convert line is applied to the A/D converters 106 and 112. It should be noted that as the drum moves the X Skip distance from the index point, sharp and unsharp signals are continuously produced by the sensors 58 and 56, amplified by the amplifiers 102 and 104 and 108 and 110, respectively, and presented to the A/D converters 106 and 112. However, no conversion of these signals are provided until the drum moves the designated X Skip distance to the first scan sample point at which point the A/D converters 106 and 112 are rendered effective by the Start Convert signal to generate an 8 bit digital byte representing the sharp value A and another 8 bit digital byte representing the unsharp value B corresponding to the quadrant sample point presently being scanned. At the end of the A/D conversion, the converters 106 and 112 apply a negative signal to the END CVT line which is applied to the inverter 675 in FIG. 23H where it is inverted to a positive signal and applied to the Data Available flip flop in FIG. 23I. The CLK RUN latch 683 is initially in a reset state causing a positive signal from the lower output thereof to be applied to condition the Data Enable flip flop for being turned on so that the positive signal from the inverter 675 is effective to turn on the Data Available flip flop 681. The Data Available flip flop 681 in being turned on applies a negative signal from the lower output thereof to turn on the A−B mode flip flop 716 and to turn on the CLK RUN latch 683. The CLK RUN latch 683 in being turned on applies a positive signal to fire the single shot 685 which, in turn, applies a negative pulse to the inverter 687 where it is inverted to a positive pulse and applied to the CLK flip flop 689 and to the AND circuits 691 and 693. The CLK flip flop 689 is initially in a reset state causing a positive signal from the lower output thereof to condition the AND circuit 693 and to apply a negative signal from the upper output thereof to decondition the AND circuit 691. Accordingly, the positive pulse on the CLK line renders the AND circuit 693 effective to step the counter 695 and bring up the first clock pulse T0. The positive pulse on the CLK line is also applied via delay circuit 697 of short duration back to the single shot 685. At the negative trailing edge of the positive pulse on the CLK line, the CLK flip flop 689 is turned on, which in being turned on, applies a positive signal from the upper output thereof to condition the AND circuit 691 and a negative signal from the lower output thereof to the delay circuit 693. The delayed negative trailing edge of the positive pulse from the delay circuit 697 is then applied to fire the single shot 685 since it is conditioned by a positive signal from the upper output of the CLK RUN latch 683. The single shot 685 produces a second negative pulse which is applied to the inverter 678 where it is inverted to a positive pulse to render the now conditioned AND circuit 691 effective to apply a negative pulse to the inverter 692 where it is inverted to a positive pulse on the Sample line. The second positive pulse on the CLK line is again applied via delay circuit 697 back to the single shot 685. At the end of the second positive pulse on the CLK line, the negative trailing edge thereof is applied to the CLK flip flop 689 which is already on and therefore has no effect thereon. Following this, the delayed negative signal from delay circuit 693 is applied to reset the CLK flip flop 689 which in being reset applies a positive signal from the lower output thereof to condition the AND circuit 693 and the negative signal from the upper output thereof to decondition the AND circuit 691. The single shot 685 and inverter 686 are effective to apply a third positive pulse on the CLK line which renders the AND circuit 693 effective to step the counter 695 and terminate the T0 clock pulse and initiate the T1 clock pulse. With this arrangement it will be apparent that alternate odd positive pulses on the CLK line will be effective to step the counter 695 and alternate even positive pulses on the CLK line will be effective to produce sample pulses which will occur at the mid point of each clock pulse. The sequence of clock pulses will continue to be produced so long as the CLK RUN latch 683 is maintained on to condition the single shot 685.

Arithmetic Operation: A−B Mode

At T0 time, the AND circuit 728 conditioned by the positive signal from the upper output of the A−B mode flip flop 716 is rendered effective by the T0 clock pulse to apply a negative pulse on the (A−B)−T0 line. The negative pulse on the (A−B)−T0 line is applied to reset the RES1=0 flip flop 736 and the RES1 POS flip flop 729. Referring now to FIGS. 23D and 23E, the negative pulse on the (A−B)−T0 line is also applied to the OR circuits 516 and 525. OR circuit 516 applies a positive signal to the LOAD line to load the X Major value from register 614 via the conditioned AND circuits 624 and OR circuits 518 into the Skip counter 522 in preparation for allowing the drum to rotate the X major distance before the next scan sample point is reached. OR circuit 525 applies a positive pulse to inverter 529 where it is inverted to a negative pulse to reset the SKIP CTR=0 flip flop 532 which in being turned off applies a negative signal from the upper output thereof to decondition the AND circuit 534 to inhibit production of another Start Convert pulse until such time as the Skip counter which is presently loaded with the X major value is decremented to zero. The negative pulse on the (A−B)−T0 line is also applied in FIG. 23G to reset the K FCT MPR register 652. The AND circuit 781 in FIG. 24C conditioned by the positive signal on the A−B line is rendered effective by the T0 clock pulse to apply a negative pulse to the OR circuit 788 which, in turn, applies a positive pulse to the inverter 788A where it is inverted to a negative pulse and applied via the SET COMP line to reset the true/complement flip flop 680 in FIG. 23G. The T/C flip flop 680 in being reset applies a negative signal from the output thereof to set the true/complement circuits 684 and 694 in the complement condition. Referring now to FIG. 23D, at T0/Sample time, the combination of positive pulses on the (A−B)−T0 and SAMPLE lines and the positive signal from the lower output of the initially reset GT slip flip flop 670 in FIG. 23F render the AND circuit 520 effective to apply a negative pulse via the step line to decrement by 1 the S/P BYTE COUNTER 524 thereby indicating that one scan sample has been completed.

Figure 23H:
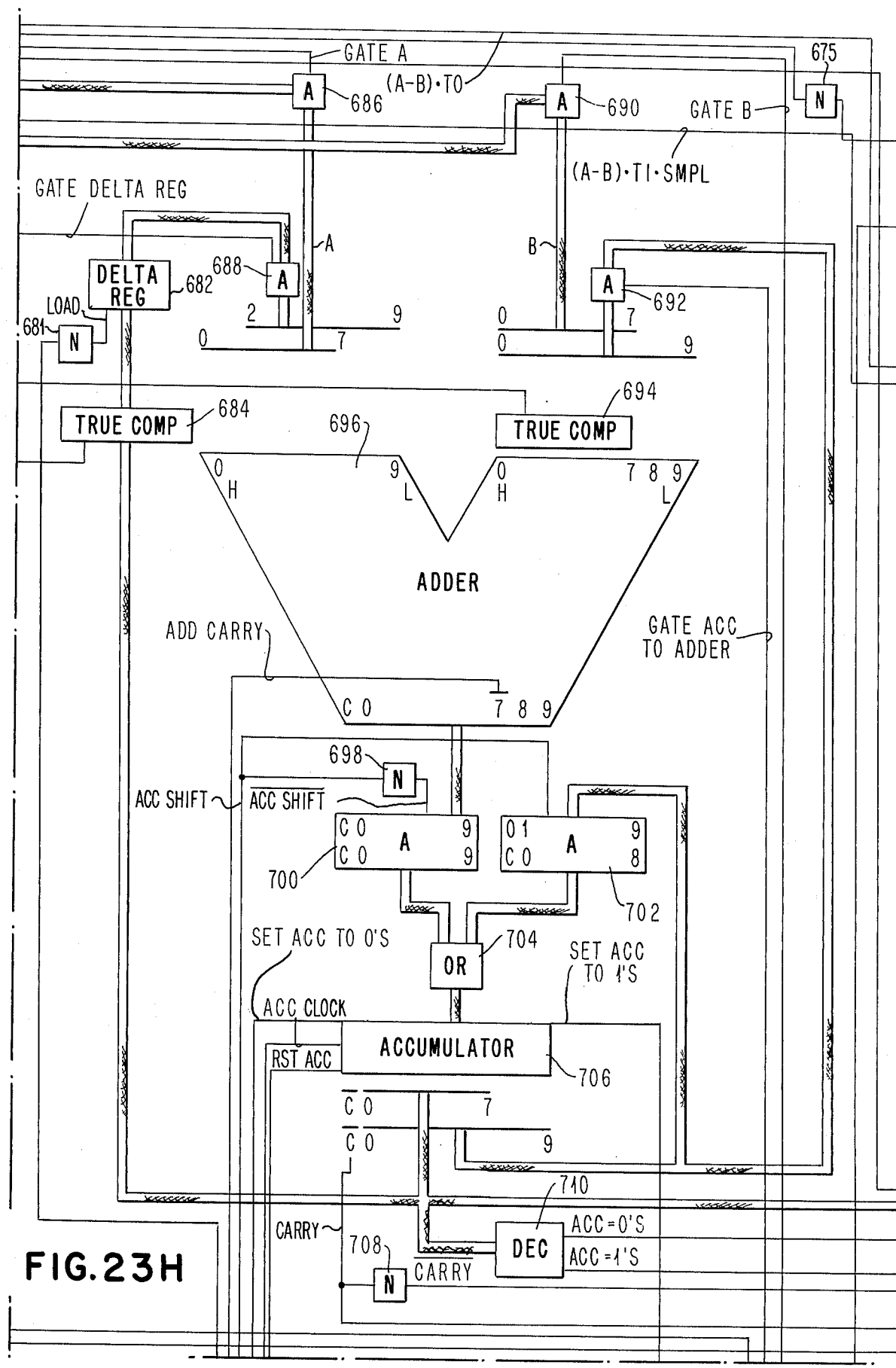

At T1 time, the T1 clock pulse is applied to reset the Data Available flip flop 681 in FIG. 23I. Referring now to FIG. 24A, the positive signal on the A−B line and the T1 clock pulse are effective to render the AND circuits 747 and 748 effective to apply negative pulses to the inverter 747A and the OR circuit 759, respectively, which in turn, apply positive pulses to the GATE B and GATE A lines. The positive pulses on the GATE A and GATE B lines are applied in FIG. 23H to render the AND circuits 686 and 690 effective, respectively, to gate the Sharp value A byte in true form to the A side of the adder 696 and the Unsharp value B byte via the true/complement circuit 694, presently in the complement condition, in complement form to the B side of the adder 696. Adder 696 performs the A−B subtraction by 1's complement addition in which the value A is the minuend and the value B is the subtrahend. Accordingly, in the 1's complement method, the complement of the subtrahend is added to the minuend with the result being the difference in complement form unless there is a carry out of the highest position of the difference, in which case, an end around carry is performed with the result being in true form.

Figure 23J:
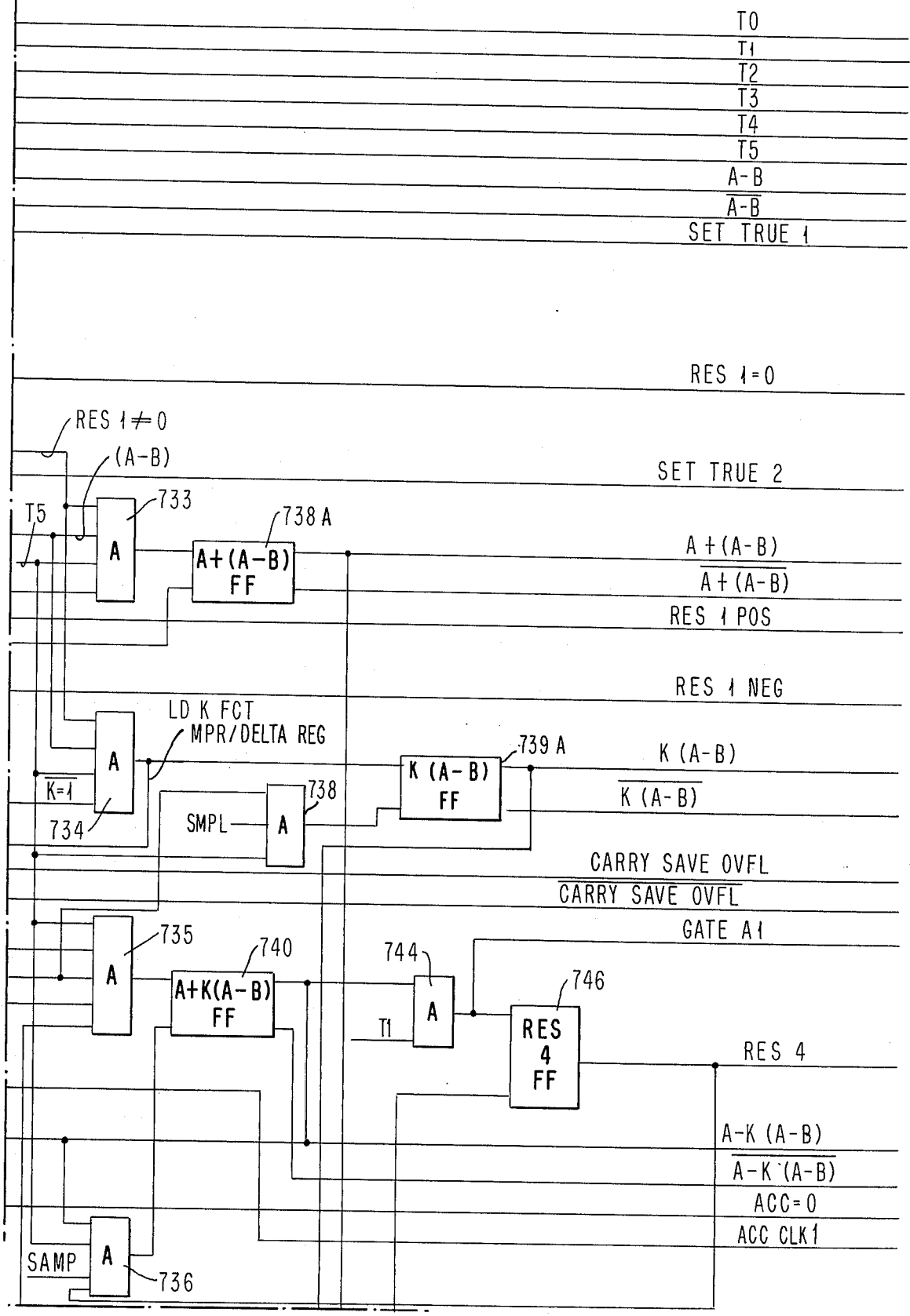
Figure 23L:
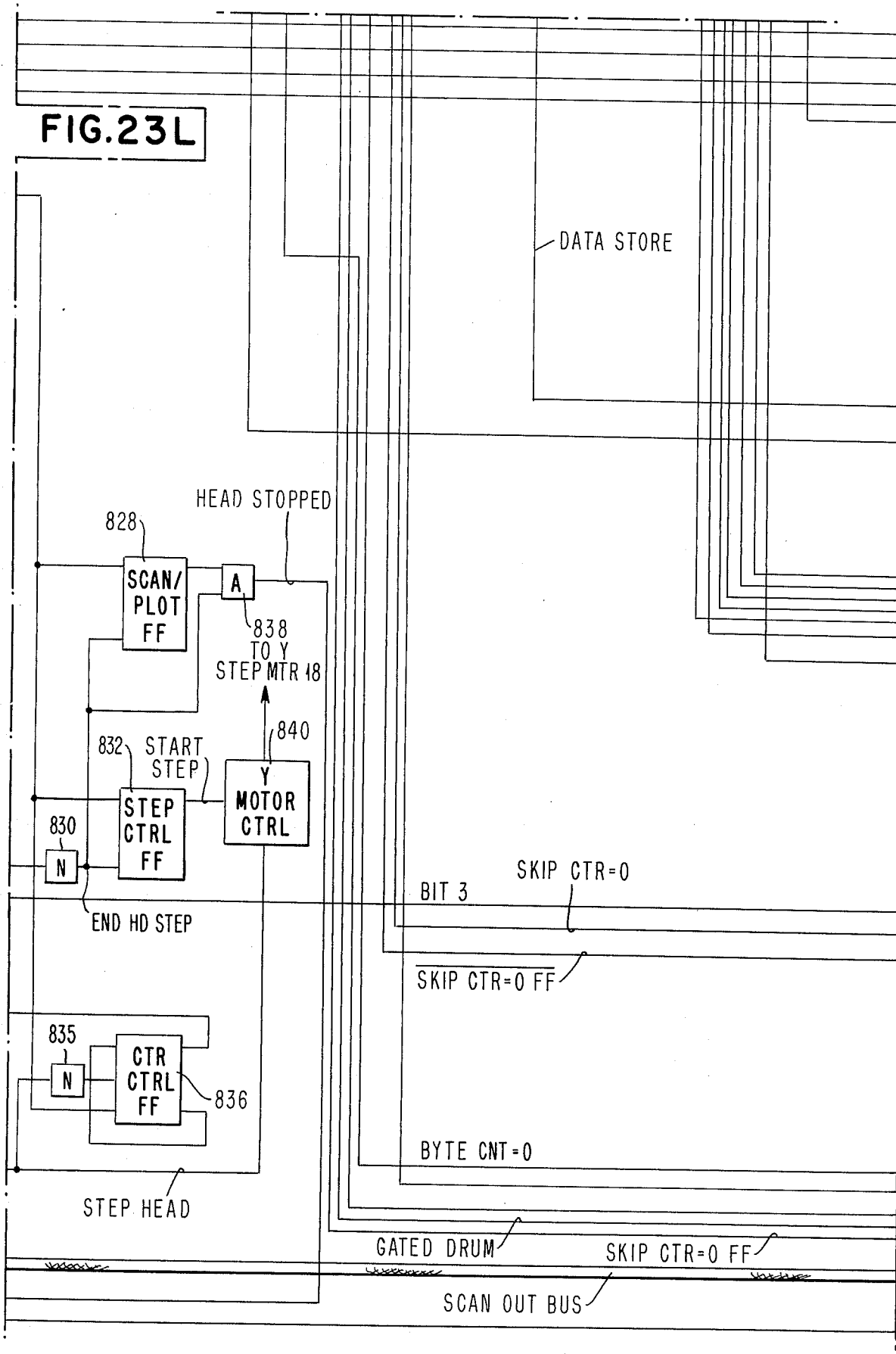
Figure 24D:
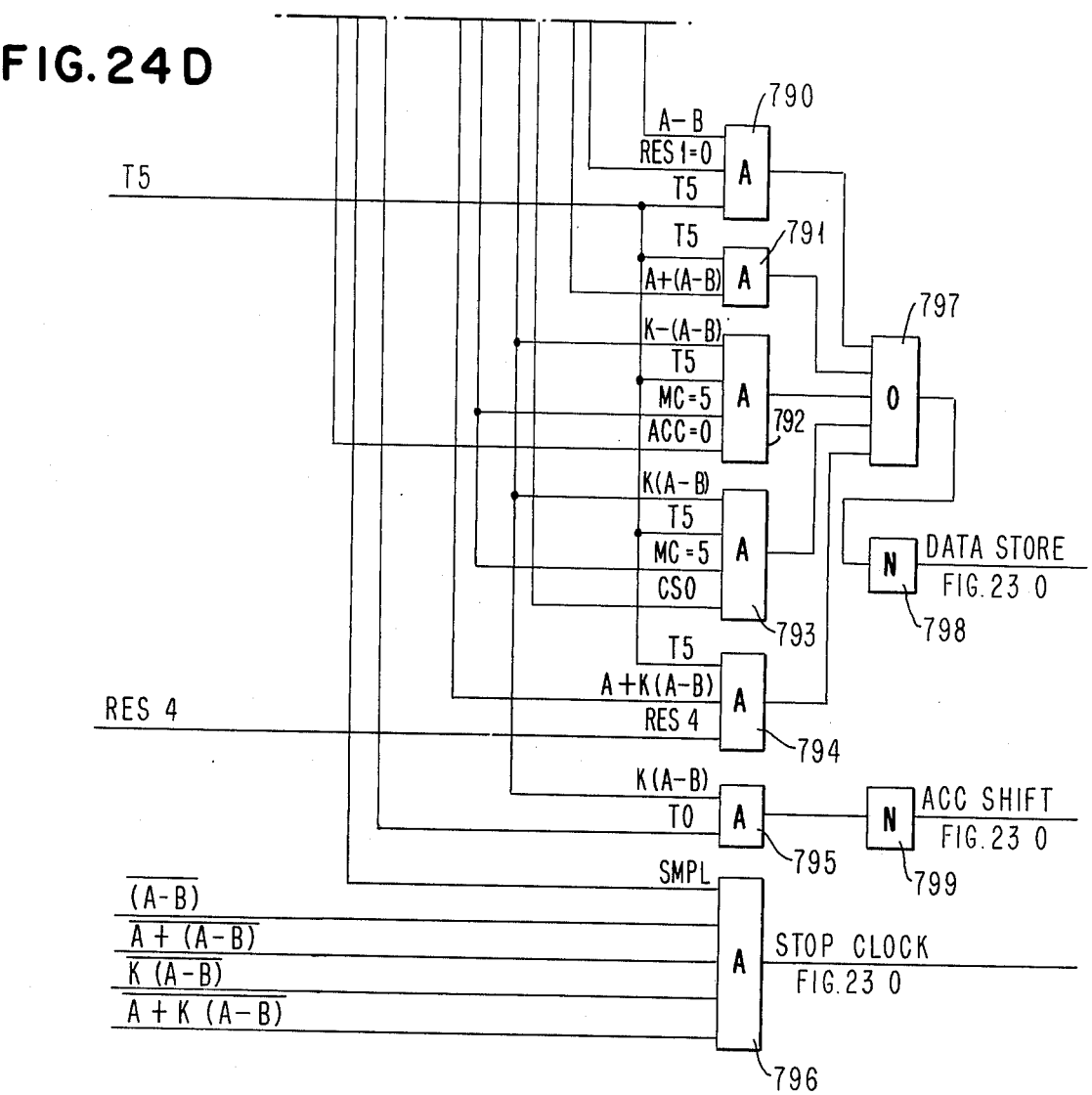
FIGS. 24A through 24D, taken together, comprise a detailed schematic diagram of logic for producing control signals used in computing the RGL value.
Figure 24:
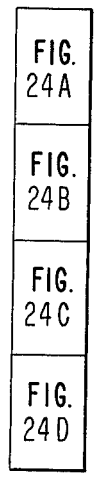
FIG. 24 is a diagram of how FIGS. 24A through 24D may be placed to form a composite block diagram.
Figure 24A:
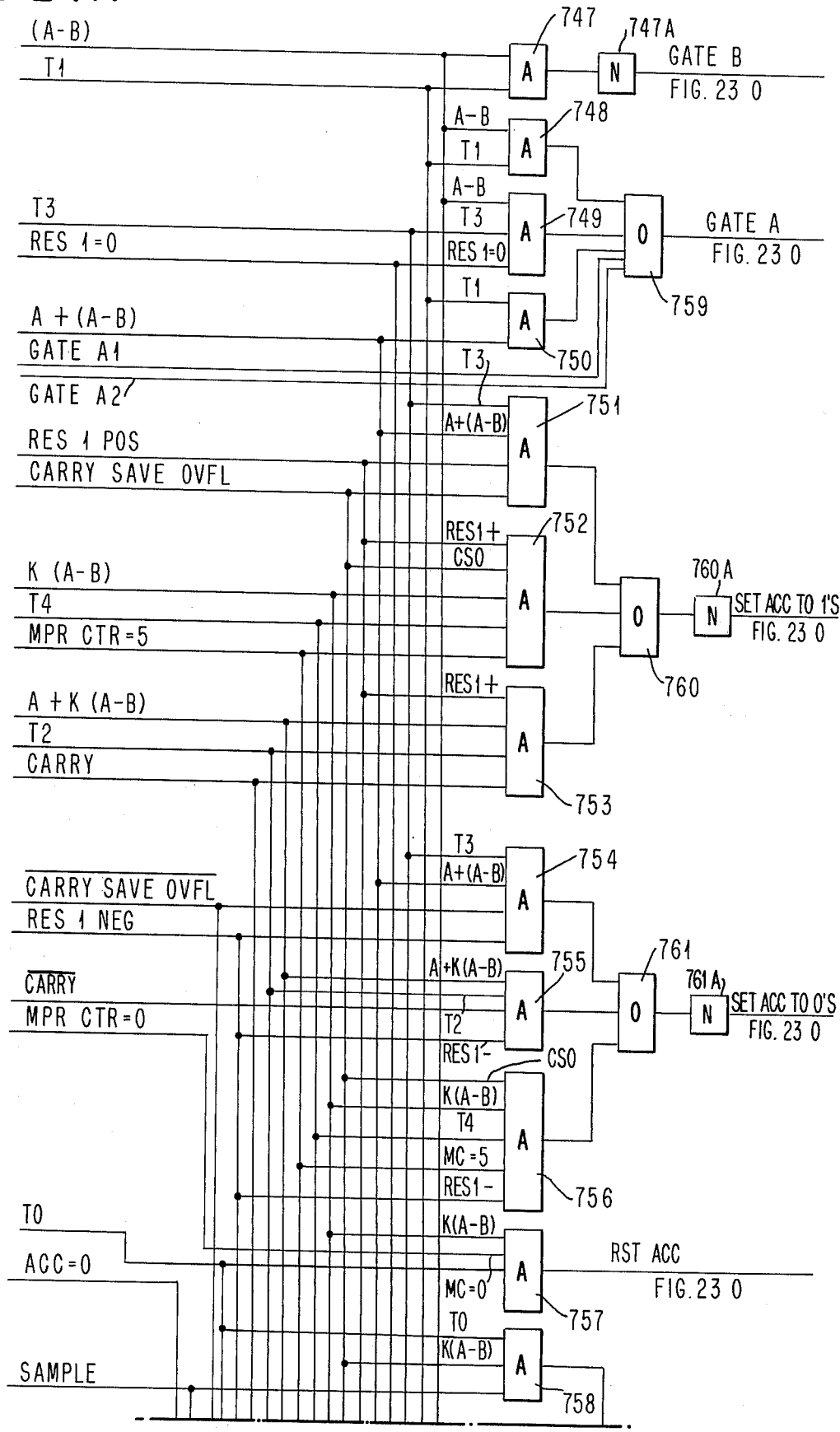

Referring to FIG. 24D, since the operation is presently in the A−B mode, a negative signal is maintained on K(A−B) line to decondition the AND circuit 795 which in turn applies a positive signal to the inverter 799 where it is inverted to a negative signal on the ACC SHIFT line. The negative signal on the ACC SHIFT line is applied in FIG. 23H to decondition the AND circuits 702 and to the inverter 698 where it is inverted to a positive signal on the not ACC SHIFT line to condition the AND circuits 700 so that the A−B result from the adder 696 is passed via the conditioned AND circuits 700 and the OR circuits 704 for loading into the accumulator 706. Referring now to FIG. 23I, at T1/sample time positive signals on the A−B and T1 lines in combination with the Sample pulse renders the AND circuit 734A effective to apply a negative pulse via OR circuit 716 and inverter 717 to reset the CARRY SAVE OVFL flip flop 731, to reset the MPR counter 742 in FIG. 23O, to decrement by 1 the Skip counter 522 in FIG. 23D and via the ACC CLK 1 line in FIG. 23J to the OR circuit 773 in FIG. 24B. OR circuit 773, in turn, applies a positive pulse via the ACC CLOCK line to load the A−B value into the accumulator 706 in FIG. 23H.

A−B Mode; K=0

Figure 24B:
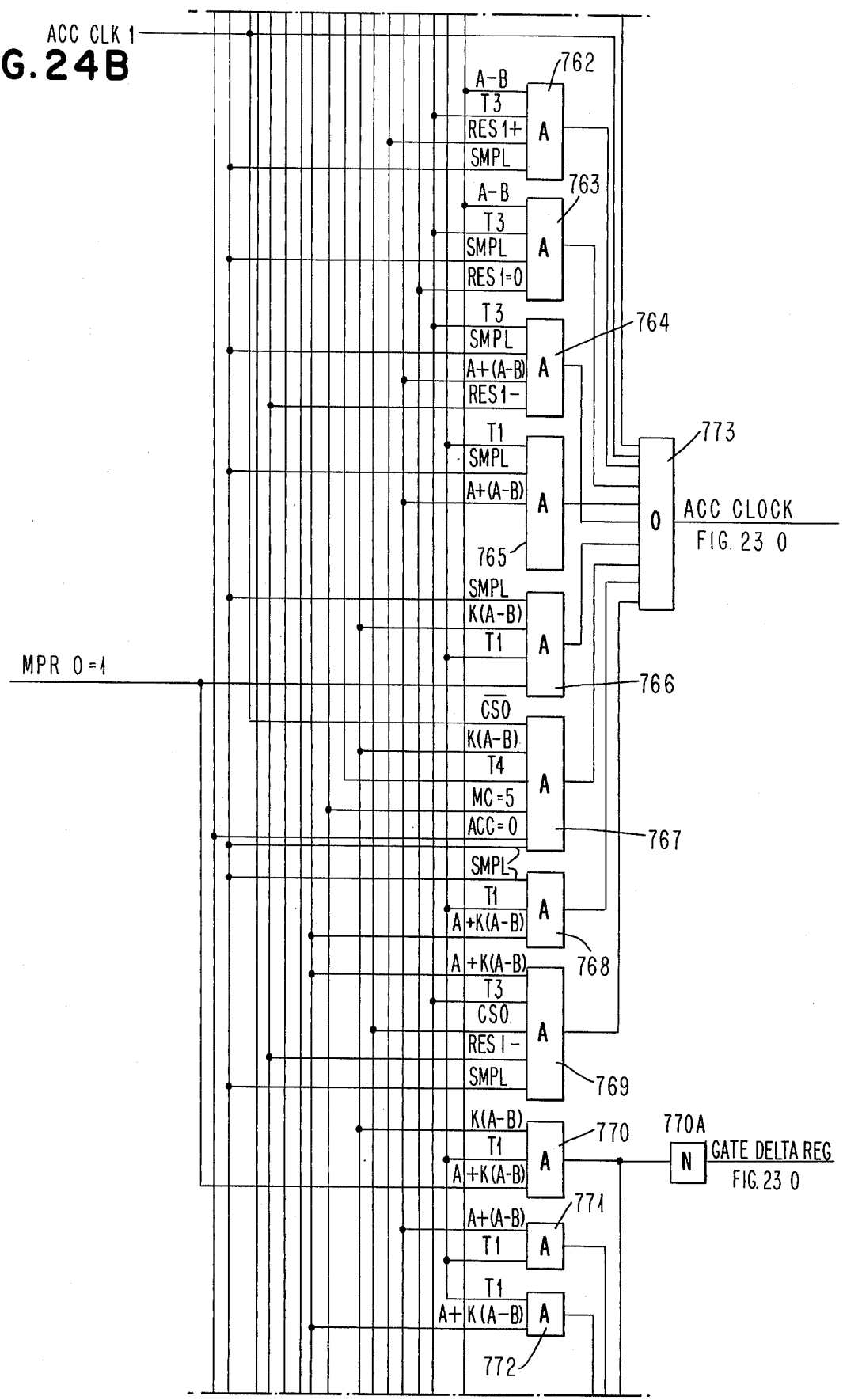

Referring to FIG. 23F, if the K Factor stored in register 620 has a value equal to 0, this condition is decoded by decoder 630 to apply a positive signal to the K=0 line. Additionally, GT SLIP flip flop 670 in FIG. 23G initially in a reset state applies a positive signal to the not GT SLIP line. Referring now to FIG. 23I, at T2 time, positive signals on the A−B, not GT SLIP and K=0 lines in combination with the T2 clock pulse is effective to render the AND circuit 723 effective to apply a negative pulse to the OR circuit 727 which, in turn, applies a positive pulse to the inverter 741 where it is inverted to a negative pulse to the SET TRUE 1 line and to turn on the RES 1=0 flip flop 736. The negative pulse on the SET TRUE 1 line is applied to the OR circuit 787 in FIG. 24C which, in turn, applies a positive pulse to the inverter 787A where it is inverted to a negative pulse and applied to the SET TRUE line. The negative pulse on the SET TRUE line is applied to turn on the T/C flip flop 680 in FIG. 23G which, in being turned on, applies a positive signal to set the true complement circuits 684 and 694 in FIG. 23H to the true condition. Referring now to FIG. 24A, at T3 time positive signals on the A−B and RES 1=0 lines in combination with the T3 clock pulse renders the AND circuit 749 effective to apply a negative pulse to the OR circuit 759, which, in turn, applies a positive pulse to the GATE A line. The positive pulse on the GATE A line is applied in FIG. 23H to render the AND circuits 686 effective to gate the sharp value A byte to the A side of the adder 696. Since no positive signal is applied to the GATE B line at this time the AND circuit 690 is deconditioned to block the unsharp B byte from being applied to the adder. This has the effect of applying 0's to the B side of the adder 696. Accordingly, the adder 696 adds the sharp value A byte to 0's to produce the sharp value A byte at the output of the adder 696 which passes via the conditioned AND circuits 700 and OR circuits 704 for loading into the accumulator 706. Referring now to FIG. 24B, at T3/Sample time, positive signals on the (A−B), RES 1=0 and T0 lines in combination with positive pulse on the SAMPLE line is applied to render the AND circuit 763 effective to apply a negative pulse to the OR circuit 773 which, in turn, applies a positive pulse via the ACC CLOCK line to load the sharp value A byte into the accumulator 706 in FIG. 23H. The output of the accumulator is applied to the AND circuit 714 in FIG. 23I, presently conditioned by the positive signal on the SCAN MODE line to pass the sharp value A byte via the SCAN OUT BUS to the Buffer and Bus Control Unit 1100. Referring now to FIG. 24D, at T5 time, positive signals on the A−B and RES 1=0 lines in combination with the T5 clock pulse renders the AND circuit 790 effective to apply negative pulse to the OR circuit 797 which, in turn, applies a positive pulse to the inverter 798 where it is inverted to a negative pulse on the DATA STORE line. The negative pulse on the DATA STORE line is applied to the Buffer and Bus Control Unit 1100 to initiate a cycle of operation of the Buffer 1200 for loading the sharp value A byte into the buffer as will be described in greater detail hereafter. Referring now to FIG. 23I, at T5/Sample time, positive signals on the (A−B) and T5 lines in combination with the positive SAMPLE pulse renders the AND circuit 712 effective to apply a negative pulse to reset the A−B flip flop 716 to terminate the A−B mode of operation.

A−B Mode: A−B=0; K≠0

If the sharp value A is equal to the unsharp value B, then the computation of A−B will produce a result of all 1's with no carry in the accumulator 706 in FIG. 23H. The all 1's condition will be decoded by the decoder 710 to apply a positive signal to the ACC = 1's line and the no carry condition will produce a negative signal on the not CARRY line. Referring now to FIG. 23I, at T2 time, with the assumed condition of K≠0, a negative signal is applied on the K=0 line to inverter 713 where it is inverted to a positive signal and applied to the K≠0 line. Consequently, positive signals on the A−B, K≠0, not CARRY and ACC=1's lines in combination with the T2 clock pulse are applied to render the AND circuit 722 effective to apply a negative pulse to the OR circuit 727 which, in turn, applies a positive pulse to the inverter 741 where it is inverted to a negative pulse which is applied to the SET TRUE 1 line and to turn on the RES 1=0 flip flop 736. The remainder of the cycle is identical to that described above in connection with the K=0 operation to transfer the sharp A byte to the Buffer and Bus Control Unit 1100.

A−B Mode: A−B=+; K=1

Figure 24C:
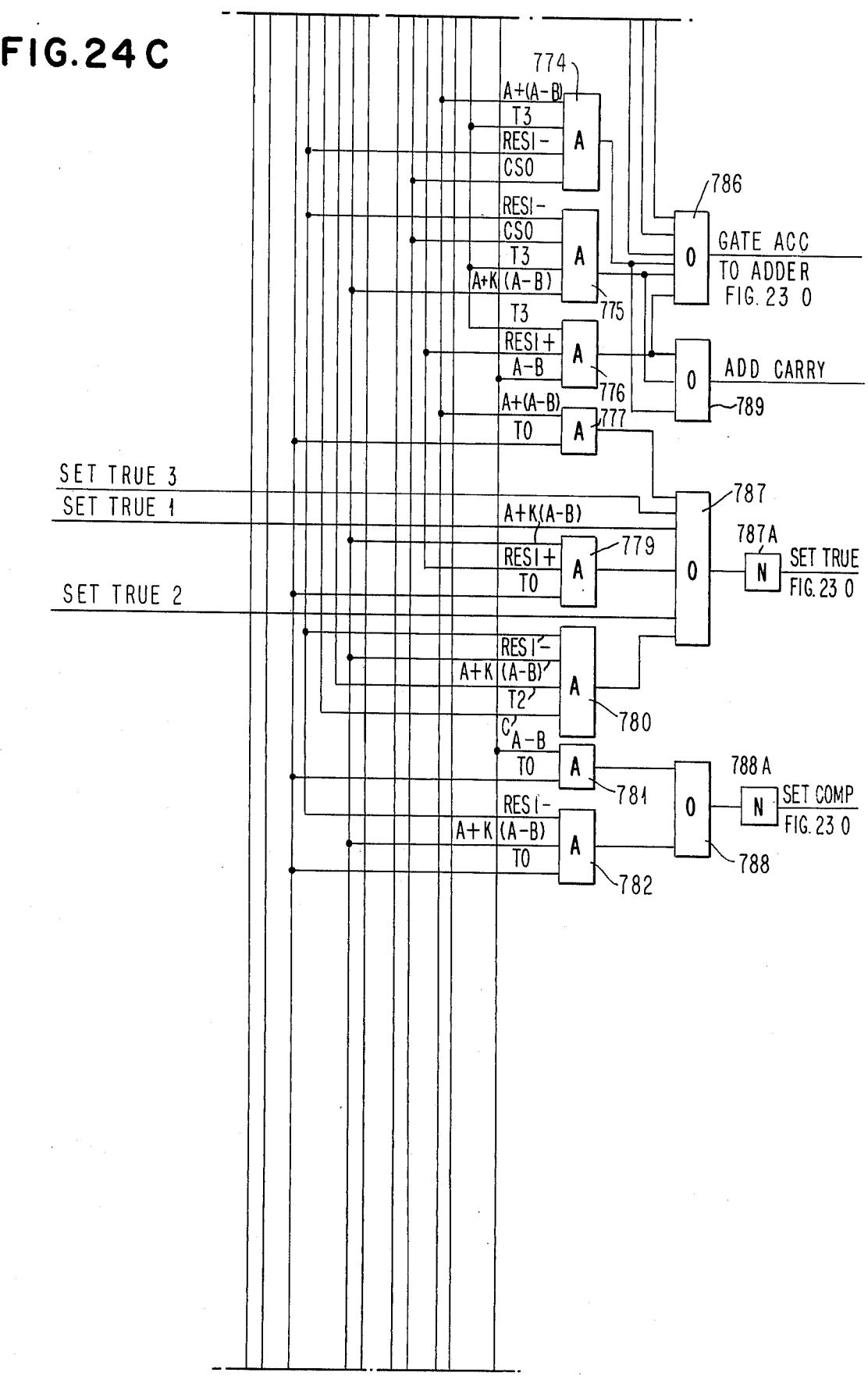

If the sharp value A is larger than the unsharp value B, then the result of the computation of A−B will produce a true number in the accumulator with a carry. Referring to FIGS. 23I and 23J, at T2 time, positive signals on the A−B, K≠0 and CARRY lines in combination with the T2 clock pulse renders the AND circuit 724 effective to apply a negative pulse to the SET TRUE 2 line and to turn on the RES 1 POS flip flop 729 indicating the result of the A−B computation is positive. The negative pulse on the SET TRUE 2 line is applied to the OR circuit 787 in FIG. 24C which, in turn, applies a positive pulse to the inverter 787A where it is inverted to a negative pulse and applied via the SET TRUE line to turn on the T/C flip flop 680 in FIG. 23G. The T/C flip flop 680 in being turned on applies a positive signal to set the true complement circuits 684 and 694 to the true condition. Referring now to FIG. 24C, at T3 time, positive signals on the RES 1 POS and A−B lines in combination with the T3 clock pulse are applied to render the AND circuit 775 effective to apply a negative pulse to the OR circuits 786 and 789 which, in turn, apply positive pulses to the GATE ACC TO ADDER and ADD CARRY lines respectively. The positive pulse on the GATE ACC TO ADDER line is applied to render the AND circuit 692 in FIG. 23H effective to pass the present contents of the accumulator 706 via the true complement circuit 694, presently in the true condition, to the B side of the adder 696. The A−B value in combination with the ADD CARRY pulse, applied to the 7th stage of the adder 696 which contains the lowest order bit of the A−B computation, permits a carry 1 operation to be performed in the adder 696 for obtaining the true result of the A−B computation. Referring now to FIG. 24B, at T3/Sample time, positive signals on the A−B, RES 1 POS and T3 lines in combination with the SAMPLE pulse are applied to render the AND circuit 762 effective to apply a negative pulse to the OR circuit 773 which, in turn, applies a positive pulse via the ACC CLOCK line to load the true result of the A−B computation via the conditioned AND circuits 700 and OR circuits 704 into the accumulator 706. Referring to FIG. 23J, at T5 time, positive signals on the RES 1≠0, A−B and K=1 lines in combination with the T5 clock pulse renders the AND circuit 733 effective to apply a negative pulse to turn on the A+(A−B) flip flop 738A. Referring to FIG. 23I, at T5/sample time, positive signals on the (A−B) and T5 lines in combination with the SAMPLE pulse are applied to render the AND circuit 712 effective to apply a negative pulse to turn off the A−B flip flop 716 to end the A−B mode of operation and initiate the A+(A−B) mode of operation.

A−B Mode; A−B=+; K≠1

The operations during T2, T3 and T3/Sample times are identical to that described above for the A−B=+; K=1 operation. However, at T5 time, positive signals on A−B, RES 1≠0 and K≠1 lines in combination with the T5 clock pulse renders the AND circuit 734 effective to apply a negative pulse to turn on the K(A−B) flip flop 739A. The negative pulse from the AND circuit 734 is also applied via the LD K FCT MPR/DELTA REG line to the inverter 644 in FIG. 23F where it is inverted to a positive pulse to load the K Factor from the K FCT register 620 into the K FCT MPR register 652. The negative pulse on the LD K FCT MPR/DELTA REG line is also applied to the inverter 681 in FIG. 23H where it is inverted to a positive pulse to load the contents of the accumulator 706, which presently stores the A−B computation in true form via the true complement circuit 684, presently in the true condition, into the Delta register 682. Referring to FIG. 23I, at T5/sample time, positive signals on the A−B and T5 lines in combination with the SAMPLE pulse are applied to render the AND circuit 712 effective to apply a negative pulse to reset the A−B flip flop 716 to end the A−B mode of operation and initiate the K(A−B) mode of operation.

A−B Mode; A−B=−; K=1

If the sharp value A is smaller than the unsharp value B, then the result of the A−B computation is a negative value and is stored in complement form in the accumulator. Accordingly, referring to FIG. 23I and 23J, after the computation and at T5 time, positive signals on the A−B, RES 1≠0 and K=1 lines in combination with the T5 clock pulse renders the AND circuit 733 effective to apply a negative pulse to turn on the A+(A−B) flip flop 738A. At T5/sample time, positive signals on A−B and T5 lines in combination with the SAMPLE pulse are applied to render the AND circuit 712 effective to apply a negative pulse to turn off the A−B flip flop 716 to end the A−B mode of operation and initiate the A+(A−B) mode of operation.

A−B Mode; A−B=−; K≠1

With the assumed condition of the A−B computation resulting in a negative value, the A−B result is stored in complement form in the accumulator and with the condition of K≠1, the operation, at T5 time, is similar to that described above for the A−B=+; K≠1 operation. Therefore, at T5 time, the operation is effective to step to the K(A−B) mode of operation, to transfer the K Factor value from the K Factor register to the K Factor multiplier register and to transfer the content of the accumulator to the Delta register per the condition of the true complement circuit 684, which in this case was set in the complement condition at T0 time, to recomplement the A−B complement value to a true value before loading in the Delta register. Similarly, at T5/sample time, the operation is identical as that described above in connection with the A−B=+; K≠1 operation to end the A−B mode of operation and to initiate the K(A−B) mode of operation.

A+(A−B) Mode of Operation

It will be noted from the above description that if A−B=± and K=1 that at the end of the A−B mode of operation, the computation then proceeds to the A+(A−B) mode of operation. Therefore, referring to FIG. 24C, at T0 time of the A+(A−B) mode, the positive signal on the A+(A−B) line in combination with the T0 clock pulse are applied to render the AND circuit 777 effective to apply a negative pulse to the OR circuit 787 which, in turn, applies a positive pulse to the inverter 787A where it is inverted to a negative pulse and applied to the SET TRUE line. The negative pulse on the SET TRUE line is applied in FIG. 23G to turn on the T/C flip flop 680 which, in being turned on, applies a positive signal to set the true complement circuits 684 and 694 in FIG. 23H to the true condition. Referring now to FIG. 24A, at T1 time of the A+λ (A−B) mode, the positive signal on the A+(A−B) line in combination with the T1 clock pulse are applied to render the AND circuit 750 effective to apply a negative pulse to the OR circuit 759 which, in turn, applies a positive pulse to the GATE A line. The positive pulse on the GATE A line is applied in FIG. 23H to render the AND circuits 686 effective to pass the sharp value A to the A side of the adder 696. At the same time, referring to FIGS. 24B and 24C, the positive signal on the A+(A−B) line in combination with the T1 clock pulse are applied to render the AND circuit 771 effective to apply a negative pulse to the OR circuit 786 which, in turn, applies a positive pulse to the GATE ACC TO ADDER line. The positive pulse on the GATE ACC TO ADDER line is applied in FIG. 23H to render the AND circuits 692 effective to pass the content of the accumulator 706, presently storing the A−B value, via the true complement circuit 694, presently in the true condition, to the B side of the adder 696 where it is added to the sharp A value byte to produce the A+(A−B) value at the output of the adder and with a carry or not in the carry bit position in accordance with the magnitude of the values added in the adder 696. Referring now to FIG. 24B, at T1/sample time, positive signals on the A+(A−B) and T1 lines in combination with the SAMPLE pulse are applied to render the AND circuit 765 effective to apply a negative pulse to the OR circuit 773 which, in turn, applies a positive pulse via the ACC CLOCK line to load the A+(A−B) output of the adder 696 in FIG. 23H via the conditioned AND circuits 700 and OR circuits 704 into the accumulator 706.

A+(A−B) Mode; CARRY YES; RES 1 POS (A−B=+)

Referring now to FIG. 23I at T2 time of the A+λ (A−B) mode, if a carry had resulted from the A+λ (A−B) addition then positive signals on the CARRY and A+(A−B) lines in combination with the T2 clock pulse are applied to render the AND circuit 718 effective to apply a negative pulse to the OR circuit 725 which, in turn, applies a positive pulse to the inverter 725A where it is inverted to a negative pulse to turn on the CARRY SAVE OVFL flip flop 731. The fact that a carry has resulted from the addition of A and A−B indicates that the A+(A−B) result exceeds 255, the maximum permissible value. Accordingly, the content of the accumulator must be adjusted to indicate the maximum possible value and, therefore, must be set to all 1's. Consequently, referring now to FIG. 24A, at T3 time of the A+(A−B) mode, positive signals on the A+(A−B), RES 1 POS and CARRY SAVE OVFL lines in combination with the T3 clock pulse are applied to render the AND circuit 751 effective to apply a negative pulse to the OR circuit 760 which in turn applies a positive pulse to the inverter 760A where it is inverted to a negative pulse and applied via the SET ACC to 1's line to set all stages of the accumulator 706 in FIG. 23H to 1's indicating the maximum value of 255.

A+(A−B) Mode; CARRY YES; RES 1 NEG (A−B=−)

If the A−B computation resulted in a negative value i.e. RES 1 NEG, it indicates that the A−B result is a complement value and when the A+(A−B) computation is performed and results in a carry it indicates that the result of the A+(A−B) addition is a true value and that an end around carry must be performed to obtain the final true value of the A+(A−B) addition. Accordingly, referring to FIG. 24C, at T3 time of the A+λ (A−B) mode, positive signals on the A+(A−B), RES 1 NEG, CARRY SAVE OVFL lines in combination with the T3 clock pulse are applied to render the AND circuit 774 effective to apply a negative pulse to the OR circuits 786 and 789 which, in turn, apply positive signals to the GATE ACC TO ADDER and ADD CARRY lines, respectively. The positive pulse on the GATE ACC TO ADDER line is applied to render the AND circuit 692 in FIG. 23H effective to pass the present contents of the accumulator 706 via the true complement circuit 694, presently in the true condition, to the B side of the adder 696. The A+(A−B) value in combination with the ADD CARRY pulse applied to the low order bit 7 position of the adder 696 permits the end around carry addition to be performed to produce the true A+(A−B) result. Referring now to FIG. 24B, at T3/sample time of the A+(A−B) mode, positive signals on the T3, A+(A−B) and RES 1 NEG lines in combination with the SAMPLE pulse are applied to render the AND circuit 764 effective to apply a negative pulse to the OR circuit 753 which, in turn, applies a positive pulse via the ACC CLOCK line to the accumulator 706 in FIG. 23H to load the now true form of the A+(A−B) value via the conditioned AND circuits 700 and OR circuit 704 into the accumulator 706.

A+(A−B) mode; CARRY NO; RES 1 POS (A−B=+)

If the A−B computation results in a positive value i.e. RES 1 POS, it indicates that A−B result is a true number. Consequently, when it is added to the value A to produce the A+(A−B) value and no carry results, indicating that the A+(A−B) result does not exceed 255, then the A+(A−B) result is valid and no change is necessary to the value stored in the accumulator 706.

A+(A−B) Mode; CARRY NO; RES 1 NEG (A−B=−)

If the A−B computation results in a negative value i.e. RES 1 NEG it indicates that the (A−B) result is a complement value and when added to the value A to produce the value A+(A−B) and no carry results it indicates that the A+(A−B) result is a negative value. Since the valid range of values is between 0 and 255, all A+(A−B) additions which result in a negative value must be changed to a 0 value. Consequently, referring to FIG. 24A, at T3 time of the A+(A−B) mode, positive signals on the A+(A−B), not CARRY SAVE OVFL and RES 1 NEG lines in combination with the T3 clock pulse are applied to render the AND circuit 754 effective to apply a negative pulse to the OR circuit 761 which, in turn, applies a positive pulse to the inverter 761A where it is inverted to a negative pulse and applied via the SET ACC TO 0's line to set all stages of accumulator 706 in FIG. 23H to 0's.

A+(A−B) Mode; ALL CASES

Referring now to FIG. 24D, at T5 time of the A+ λ (A−B) mode, the positive signal on the A+(A−B) line in combination with the T5 clock pulse are applied to render the AND circuit 791 effective to apply a negative pulse to the OR circuit 797 which in turn applies a positive pulse to the inverter 798 where it is inverted to a negative pulse and applied via the DATA STORE line to the Buffer and Bus Control Unit 1100 to initiate a cycle of operation of the Buffer 1200 to load the content of the accumulator in the Buffer in a manner which will be described in greater detail hereafter. Referring now to FIG. 23I, at T5/sample time of the A+(A−B) mode, positive signals on the T5 and A+(A−B) lines in combination with the SAMPLE pulse are applied to render the AND circuit 715 effective to apply a negative pulse to reset the A+(A−B) flip flop 738A in FIG. 23J and thereby end the A+(A−B) mode of operation and is also applied to the OR circuit 716 which, in turn, applies a positive pulse to the inverter 717 where it is inverted to a negative pulse to reset the CARRY SAVE OVFL flip flop 731.

Arithmetic Operation: K(A−B) Mode

It will be remembered from the above description of the (A−B) mode of operation that if A−B=± and K≠1, then at T5 time of that mode, the K(A−B) flip flop 739A in FIG. 23J was turned on to step to the K(A−B) mode of operation, the K Factor value was transferred from the K FCT register 620 to the K FCT MPR register 652 in FIG. 23F and the content of the accumulator 706 in FIG. 23H was transferred via the true complement circuit 684, set to the true condition, to the Delta register 682. The multiplier counter 742 in FIG. 23O is initially in a 0 state which condition is decoded by decoder 743 to apply a positive signal on a MPR CTR = 0 line. Accordingly, referring to FIG. 24A, at T0 time of the K(A−B) mode, positive signals on the K(A−B) and MPR CTR = 0 lines in combination with the T0 clock pulse are applied to render the AND circuit 755 effective to apply a negative pulse via the RST ACC line to reset the accumulator 706 in FIG. 23H preparatory to performing a K(A−B) multiplication. Referring now to FIGS. 23I and 23N, at the same time, the positive signal on the K(A−B) line in combination with the T0 clock pulse are applied to render the AND circuit 719 effective to apply a negative pulse to reset the ACC = 0 flip flop 732. The negative pulse from the AND circuit 719 is also applied to the OR circuit 716 which, in turn, applies a positive pulse to the inverter 717 where it is inverted to a negative pulse to reset the CARRY SAVE OVFL flip flop 731. The negative pulse output of the AND circuit 719 is further applied to the inverter 742A in FIG. 23O where it is inverted to a positive pulse and in combination with the positive signal on the MPR CTR=0 line renders the AND circuit 743A effective to apply a negative pulse on the SET TRUE 3 line. The negative pulse on the SET TRUE 3 line is applied to the OR circuit 787 in FIG. 24C which, in turn, applies a positive pulse to the inverter 787A where it is inverted to a negative pulse and applied via the SET TRUE line to turn on the T/C flip flop 680 in FIG. 23G. The T/C flip flop 680 in being turned on applies a positive signal to set the true complement circuits 684 and 694 to the true condition. Referring now to FIG. 24D, the positive signal on the K(A−B) line in combination with the T0 clock pulse are applied to render the AND circuit 795 effective to apply a negative pulse to the inverter 799 where it is inverted to a positive pulse and applied via the ACC SHIFT line to condition the AND circuits 702 in FIG. 23H and via the inverter 698 where it is inverted to a negative pulse to decondition the AND circuits 700. Each output of the AND circuits 702 is connected to each OR circuit 704 associated with the next higher stage of the accumulator 706 so that as the contents of the accumulator 706 is passed via the now conditioned AND circuits 702 and OR circuits 704 back for reloading in the accumulator 706, the value is effectively shifted left by 1 bit position. Referring to FIG. 24A, at T0/sample time, positive signals on the K(A−B) and T0 lines in combination with the SAMPLE pulse are applied to render the AND circuit 758 effective to apply a negative pulse to the OR circuit 773 in FIG. 24B which in turn applies a positive pulse via the ACC CLOCK line to the accumulator 706 in FIG. 23H to cause the shifted value to be loaded back into the accumulator. It should be noted that the accumulator was reset at T0 time and accordingly the shifting operation at this time has no effect and merely reloads 0's back into the accumulator.

Referring now to FIG. 23G, the K FCT MPR register 652 is a five stage shifting register which presently contains the K Factor with each bit position, if a bit 1 is present, having the binary value indicated. As the K Factor value is shifted through the register 652, stage 0 will be monitored after each shift operation to determine whether a 1 bit is present in that position or not. If a 1 bit is present this indicates that the A−B value is to be multiplied by that factor. In binary multiplication, if a number is multiplied by the radix of the number system, this multiplication has the effect of shifting the number 1 place to the left with respect to the radix point. Accordingly, binary multiplication is accomplished by a series of add and shift operations. For this multiplication, the radix point will be considered to be between bit 7 and bit 8 position of the accumulator so that the 11 stages of the accumulator have the following values:

| C | 0 | 1 | 2 | 3 | 4 | 5 | 6 | 7 | 8 | 9 |
|---|---|---|---|---|---|---|---|---|---|---|
| 256 | 128 | 64 | 32 | 16 | 8 | 4 | 2 | 1 | .5 | .25 |

Essentially, stage 0 of the K FCT MPR register 652 is monitored for a 1 or 0 bit. If a 1 bit is present then the A−B value is added to the contents of the accumulator and the result is shifted to left 1 position whereas if a 0 bit is present the A−B value is not added to the accumulator but the content of the accumulator is shifted to the left by 1 position. The MPR counter 742 in FIG. 23O is stepped for each add and shift operation until a count of 5 is reached indicating that each value of the K Factor has been examined and that the multiplication process has been completed. Also, the carry stage of the accumulator 706 is monitored for a carry condition during the K(A−B) multiplication. If a carry condition is detected and the previous A-B computation resulted in a positive or negative value i.e. RES 1 POS or RES 1 NEG, this indicates that the K(A−B) result has exceeded the maximum value or that the K(A−B) result has a negative value, respectively, in which case, corrective action is necessary to set all stages of the accumulator to 1's or to 0's, respectively. If no carry condition is detected but the contents of the accumulator to the left of the radix point i.e., stages 0 to 7 contains all 0's this indicates that the K(A−B) result is a fractional value, in which case, corrective action is necessary to treat this result as a 0 value and to load the accumulator with the sharp A value. If no carry condition is detected and the contents of the accumulator ≠ 0, this indicates that the K(A−B) result in the accumulator is valid and the operation may then proceed to the A+K(A−B) mode of operation.

Referring now to FIG. 24B, at T1 time of the K(A−B) mode, if a 1 bit is detected in the 0 stage of the K FCT MPR register 652, then positive signals on the K(A−B) and MPR 0=1 lines in combination with the T1 clock pulse are applied to render the AND circuit 770 effective to apply a negative pulse to the inverter 770A and to the OR circuit 786 in FIG. 24C, respectively. The inverter 770A inverts the negative pulse to a positive pulse which is applied via the GATE DELTA REG line to render the AND circuits 688 in FIG. 23H effective to load the A−B value, presently in the Delta register 682, into the A side of the adder 696. At the same time, referring to FIG. 24C the OR circuit 786 applies a positive pulse via the GATE ACC TO ADDER line to render the AND circuit 692 in FIG. 23H effective to pass the content of the accumulator, presently storing a 0 value due to the resetting of the accumulator at T0 time, via the true complement circuit 694, presently in the true condition, to the B side of the adder 696 to thereby permit the A−B value to be added to the contents of the accumulator, the result of which is passed via the conditioned AND circuits 700 and the OR circuits 704 for loading to the accumulator 706. Referring now to FIG. 24B, at T1/sample time, the positive signals on the K(A−B), T1 and MPR 0=1 lines in combination with SAMPLE pulse are applied to render the AND circuit 766 effective to apply a negative pulse to the OR circuit 773 which, in turn, applies a positive pulse via the ACC CLOCK line to the accumulator 706 in FIG. 23H to load the A−B result into the accumulator. Referring now to FIG. 23O, at T2/sample time of the K(A−B) mode, positive signals on the K(A−B) and T2 lines in combination with the SAMPLE pulse are applied to render the AND circuit 737 effective to apply a negative pulse to step the MPR counter 742 to a count of 1 and to also set the RES 4 flip flop 746 in FIG. 23J. It should be apparent that if a 1 bit had not been detected in stage 0 of the K FCT MPR register 652, then the addition of the delta value (A−B) to the content of the accumulator would not be performed after the accumulator shift operation and the MPR counter would simply be stepped to the next count. Referring now to FIG. 23F and 23G, at T4 time of the K(A−B) mode, positive signals on the K(A−B) and not MPR CTR = 5 lines in combination with the T4 clock pulse are applied to render the AND circuit 642 effective to apply a shift pulse to shift the contents K FCT MPR register 652 to present the next bit of the K Factor to stage 0 of the register. Referring now to FIG. 24D, at T0 time of the next clock cycle, the positive signal on the K(A−B) line in combination with the T0 clock pulse are applied to render the AND circuit 795 effective to apply a negative pulse to the inverter 799 where it is inverted to a positive pulse and applied via the ACC SHIFT line to condition the AND circuits 702 and to the inverter 698 where it is inverted to a negative pulse to decondition the AND circuits 700. This again allows the contents of the accumulator to pass via the AND circuits 702, in a manner as previously described, and the OR circuits 704 shifted left by 1 position so that at T0/sample time of this next clock cycle the shifted result is reloaded into the accumulator 706 by the ACC CLOCK signal. This completes one add and shift left operation if a 1 bit had previously been detected in stage 0 of the register 652 or simply a shift left operation if a 0 bit had been previously detected in stage 0 of the register 652. In a similar manner, each bit of the K Factor is examined after a shift operation and the delta value (A−B) is added or not in accordance with the bit monitored at stage 0 of the register during that cycle of operation after which the MPR counter is stepped to the next count at T2/sample time, the K FCT MPR register is shifted at T4 time and the content of the accumulator is shifted left 1 position at the next T0/sample time. Referring now to FIG. 23I, it should be noted that at T1 time of each cycle the delta value (A−B) is added to the accumulator if stage 0 of the K Factor register 652 contains a 1 bit which addition may result in a carry. Accordingly, at T2 time of the K(A−B) mode, referring to FIG. 23I, if a carry occurs, then positive signals on the K(A−B) and CARRY lines in combination with the T2 clock pulse are applied to render the AND circuit 721 effective to apply a negative pulse via the OR circuit 725 and inverter 725A to turn on the CARRY SAVE OVFL flip flop 731 applying a positive signal to the CARRY SAVE OVFL line and a negative signal to the not CARRY SAVE OVFL line. Referring now to FIG. 23O, at T2/sample time of the 5th cycle of operation the MPR counter 742 is stepped to a count of 5 which condition is decoded by the decoder 743 to apply a positive signal on the MPR CPR = 5 line which is applied to inhibit the stepping circuitry of the K FCT MPR register 652 in FIG. 23F to prevent further stepping of the register.

K(A−B) Mode; MPR CTR=5; CARRY YES; RES 1 NEG

If the unsharp value B is larger than the sharp value A, then the A−B computation results in a negative value indicated by a positive signal on the RES 1 NEG line. Also, if the unsharp B value is large compared to the sharp A value such that the K(A−B) multiplication results in a value which exceeds the sharp A value, indicated by the fact that a carry has resulted from the multiplication, then it is apparent that −K(A−B) >A and that the RGL = A+K(A−B) result will be a negative value. Consequently, since the RGL value cannot be a negative value, it is necessary under this set of circumstances to set the accumulator to all 0's so that the RGL value will equal 0 rather than a negative value. Referring now to FIG. 24A, under the set of circumstances indicated above, at T4 time of the 5th cycle, positive signals on the CARRY SAVE OVFL, K(A−B), MPR CTR = 5 and RES 1 POS lines in combination with the T4 clock pulse are applied to render the AND circuit 756 effective to apply a negative pulse to the OR circuit 761 which, in turn, applies a positive pulse to the inverter 761A where it is inverted to a negative pulse and applied via the SET ACC TO 0's line to set the accumulator to all 0's.

K(A−B) Mode; MPR CTR=5; CARRY YES; RES 1 POS

If the sharp A value is larger than the unsharp B value, then the A−B computation results in a positive value indicated by a positive signal on the RES 1 POS line. Also, if the sharp A value is larger compared to the unsharp B value such that the K(A−B) multiplication results in a value which exceeds 255, indicated by the fact that a carry has resulted from the multiplication, then it is apparent that the A+K(A−B) value will also exceed the maximum value of 255. Consequently, since the RGL value cannot exceed 255, it is necessary to set the accumulator to all 1's which is the maximum RGL value. Referring now to FIG. 24A, at T4 time of the 5th cycle, under the set of conditions set forth above, positive signals are applied to the RES 1 POS, CARRY SAVE OVFL, K(A−B) and MPR CTR = 5 lines in combination with the T4 clock pulse are applied to render the AND circuit 752 effective to apply a negative pulse to the OR circuit 760 which, in turn, applies a positive pulse to the inverter 760A where it is inverted to a negative pulse and applied via the SET ACC TO 1 line to set the accumulator 706 in FIG. 23H to all 1's.

K(A−B) Mode; MPR CTR=5; CARRY NO: ACC=0

If the difference between the sharp A value and unsharp B value equals plus or minus 1 and the K Factor is equal to a value less than 1, then the K(A−B) multiplication results in a fractional value with no carry and all stages of the accumulator 706 in FIG. 23H to the left of the radix point will be all 0's. Accordingly, for this set of conditions, the K(A−B) value is treated as a 0 value and accordingly, the sharp A value may be loaded into the accumulator so that the RGL value will be equal to A. Therefore, referring to FIG. 23H, under this set of circumstances, at T3 time of the 5th clock cycle, decoder 710 detects the fact that all stages to the left of the radix point are 0 and produces a positive signal on the ACC = 0's line. Referring now to FIG. 23I, at T3 time of the 5th clock cycle, positive signals on the K(A−B), ACC = 0's and MPR CTR = 5 lines in combination with the T3 clock pulse are applied to render the AND circuit 726 effective to apply a negative pulse to turn on the ACC = 0 flip flop 732 which in being turned on applies a positive signal in FIG. 23J to the ACC = 0 line. Referring now to FIG. 23N, at T4 time of the 5th clock cycle, positive signals on the K(A−B), ACC = 0's, and MPR CTR = 5 lines in combination with the T4 clock pulse are applied to render the AND circuit 726A effective to apply a negative pulse to the GATE A2 line. The negative pulse on the GATE A2 line is applied in FIG. 24A to the OR circuit 759 which, in turn, applies a positive pulse via the GATE A line to render the AND circuits 686 in FIG. 23H effective to pass the sharp A value to the adder 696. Since positive signals are not presently applied to GATE B or GATE ACC TO ADDER lines, the B side of the adder is blocked and as a result the sharp A value is added to 0 and appears at the output of the adder 696. The sharp A value is passed via the AND circuits 700 conditioned by the positive signal on the not ACC SHIFT line and via the OR circuits 704 to the accumulator 706. Referring now to FIG. 24B, at T4/sample time of the 5th clock cycle, positive signals on the not CARRY SAVE OVFL, K(A−B), MPR CTR = 5 and ACC = 0's lines in combination with the T4 clock pulse are applied to render the AND circuit 767 effective to apply a negative pulse to the OR circuit 773 which, in turn, applies a positive pulse via the ACC CLOCK line to the accumulator 706 in FIG. 23H to load the sharp A value into the accumulator.

K(A−B) Mode; ABOVE 3 CONDITIONS

Referring now to FIG. 24D, at T5 time of the 5th clock cycle, positive signals on the K(A−B), MPR CTR = 5 and ACC = 0's lines in combination with the T5 clock pulse are applied to render the AND circuit 792 effective to apply a negative pulse to the OR circuit 797 which, in turn, applies a positive pulse to the inverter 798 where it is inverted to a negative pulse and applied via the DATA STORE line to signal the Buffer and Bus Control Unit 1100 to initiate a cycle of operation of the Buffer 1200 to load the present RGL value in the accumulator into the Buffer.

Referring now to FIG. 23J, at T5/sample time of the 5th clock cycle, positive signals on the MPR CTR = 5 and T5 lines in combination with the SAMPLE pulse are applied to render the AND circuit 739 effective to apply a negative pulse to reset the K(A−B) flip flop 739 and thereby end the K(A−B) mode of operation.

K(A−B) Mode; MPR CTR =5; CARRY NO; ACC≠0

If the result of the K(A−B) multiplication results in a value which does not cause the accumulator to be set to all 's or set to all 1's, as described above, and indicated by the fact that there is no carry and if the K(A−B) result is not a fractional value, indicated by the ACC ≠ 0, then the operation must step to the A+K(A−B) mode of operation so that the K(A−B) value may be added to the A value to obtain the correct RGL value. Accordingly, at T5 time of the 5th clock cycle, referring to FIGS. 23I and 23J, positive signals from the lower output of the CARRY SAVE OVFL flip flop 731, the lower output of the ACC = 0 flip flop 732, and on the MPR CTR = 5 and K(A−B) lines in combination with the T5 clock pulse are applied to render the AND circuit 735 effective to apply a negative pulse to turn on the A+K(A−B) flip flop 740. As previously described, at T5/sample time of the 5th clock cycle, the AND circuit 739 is rendered effective to apply a negative pulse to reset K(A−B) flip flop 739A to end this mode of operation.

Arithmetic Operation: A+K(A−B) Mode

If the A−B computation resulted in a positive value indicated by a positive signal on the RES 1 POS line, then the valid K(A−B) value presently in the accumulator is also a positive value and may be added to the sharp A value to produce the A+K(A−B) value. If the A+K(A−B) result is produced with no carry, it indicates that the A+K(A−B) value does not exceed 255 and the contents of the accumulator may be taken as the RGL value for the scan sample point. On the other hand, if the A−B computation resulted in a negative value, indicated by a positive signal on the RES 1 NEG line then the valid K(A−B) value presently in the accumulator is a negative value and must be complemented before being added to the sharp A value to produce the A+K(A−B) value. In this case, if the A+K(A−B) result is produced with no carry, then the A+K(A−B) value stored in the accumulator is a complement number indicating that the A+K(A−B) result is negative value. Consequently, since the RGL value cannot be less then 0, then this condition must be corrected by setting the accumulator to all 0's and the 0 value taken as the RGL value for the scan sample point. If the A−B computation resulted in a negative value and a carry results from the A+K(A−B) computation, it indicates that the result is a true number and an add carry operation must be performed to produce the final true A+B-(A-B) value which is then taken as the RGL value for the scan sample point. If the A-B computation resulted in a positive value and a carry resulted from the A+K-(A-B) computation, then this indicates that the A+K-(A-B) result is a value which exceeds 255. Consequently, since the RGL value cannot exceed 255, the contents of the accumulator must be corrected by setting the accumulator to all 1's indicating the maximum value of the RGL value for that scan sample point. Once the proper A+K(A-B) value has been loaded into the accumulator, a data store operation may be signaled to transfer the RGL value in the accumulator to the Buffer and the A+K(A-B) mode of operation may be terminated.

Referring now to FIG. 24C if the A-B computation resulted in a negative value, then, at T0 time of the A+K(A-B) mode, positive signals on the RES 1 NEG and A+K(A-B) lines in combination with the T0 clock pulse line are applied to render the AND circuit 782 effective to apply a negative pulse to the OR circuit 788 which, in turn, applies a positive pulse to the inverter 788A where it is inverted to a negative pulse and applied to the SET COMP line. The negative pulse on the SET COMP line is applied to reset the T/C flip flop 680 in FIG. 23G which, in being reset, applies a negative signal to set the true complement circuit 694 to the complement condition. On the other hand, if the A-B computation resulted in a positive value, then at T0 time of the A+K(A-B) mode, referring to FIG. 24C, positive signals on the A+K(A-B) and RES 1 POS lines in combination with the T0 clock pulse are applied to render the AND circuit 779 effective to apply a negative pulse to the OR circuit 787 which, in turn, applies a positive pulse to the inverter 787A where it is inverted to a negative pulse and applied to the SET TRUE line. The negative pulse on the SET TRUE line is applied to turn on the T/C flip flop 680 in FIG. 23G which, in being turned on, applies a positive signal to set the true complement circuit 694 in the true condition. Referring now to FIG. 23J, at T1 time of the A+K(A-B) mode, the positive signal on the A+K(A-B) line in combination with the T1 clock pulse are applied to render the AND circuit 744 effective to produce a negative pulse which is applied to turn on the RES 4 flip flop 746 and to the GATE A1 line. The negative pulse on the GATE A1 line is applied to the OR circuit 759 in FIG. 24A which, in turn, applies a positive pulse via the GATE A line to render the AND circuits 686 in FIG. 23H effective to pass the sharp A value to the A side of the adder 696. Referring now to FIGS. 24B and 24C, at the same time, the positive signal on the A+K(A-B) line in combination with the T1 clock pulse are applied to render the AND circuit 772 effective to apply a negative pulse to the OR circuit 786 which, in turn, applies a positive pulse via the GATE ACC TO ADDER line to render the AND circuits 692 in FIG. 23H effective to pass the content of the accumulator, presently storing the K(A-B) value via the true complement circuit 694, conditioned in accordance with the A-B computation result as described above, to the B side of the adder and produce at the output thereof the A+K(A-B) value. Since a positive signal is maintained on the not ACC SHIFT line, the A+K(A-B) result is passed via the AND circuits 700 and OR circuit 704 to the accumulator 706. Referring now to FIG. 24B, at T1/sample time of the A+K(A-B) mode, positive signals on the A+K(A-B) and T1 lines in combination with the SAMPLE pulse are applied to render the AND circuit 768 effective to apply a negative pulse to the OR circuit 773 which, in turn, applies a negative pulse via the ACC CLOCK line to the accumulator 706 in FIG. 23H to load the A+K(A-B) value into the accumulator. Referring now A+K(A-B) Mode; RES 1 NEG; CARRY NO In the case where the sharp A value is added to the complement of the K(A-B) value and no carry results, it indicates that the A+K(A-B) result is a negative value and since the RGL value cannot be less than 0 then the content of the accumulator must be corrected by setting the accumulator to all 0's. Accordingly, referring to FIG. 24A, at T2 time, positive signals on the A+K(A-B), not CARRY and RES 1 NEG lines in combination with the T2 clock pulse are applied to render the AND circuit 755 effective to apply a negative pulse to the OR circuit 761 which, in turn, applies a positive pulse to the inverter 761A where it is inverted to a negative pulse and applied via the SET ACC TO 0's line to set all stages of the accumulator 706 in FIG. 23H to 0's, which may then be taken as the RGL value for the scan sample point.

A+K(A-B) Mode; RES 1 NEG; CARRY YES

In the case where the sharp A value is added to the complement of the K(A-B) value and a carry results, it indicates that the A+K(A-B) result is a true number and that an end around carry must be performed to obtain the final true value of the A+K(A-B) computation. Accordingly, referring to FIG. 23I, at T2 time, positive signals on the RES 1 NEG, CARRY and A+K(A-B) lines in combination with the T2 clock pulse are applied to render the AND circuit 720 effective to apply a negative pulse to the OR circuit 725 which, in turn, applies a positive pulse to the inverter 725A where it is inverted to a negative pulse to turn on the CARRY SAVE OVFL flip flop 731 which, in being turned on, applies a positive signal to the CARRY SAVE OVFL line and a negative signal to the not CARRY SAVE OVFL line. Referring to FIG. 24C, at the same T2 time, positive signals on the RES 1 NEG, A+K(A-B) and CARRY lines in combination with the T2 clock pulse are applied to render the AND circuit 780 effective to apply a negative pulse to the OR circuit 787 which, in turn, applies a positive pulse to the inverter 787A where it is inverted to a negative pulse and applied to the SET TRUE line. The negative pulse on the SET TRUE line is applied to turn on the T/C flip flop 680 in FIG. 23G which, in being turned on, applies a positive signal to set the true complement circuit 694 to the true condition in preparation for carrying out the end around carry operation. Referring now to FIG. 24C, at T3 time, positive signals on the RES 1 NEG, CARRY SAVE OVFL and A+K(A-B) lines in combination with the T3 clock pulse are applied to render the AND circuit 784 effective to apply a negative pulse to the OR circuit 789 which, in turn, applies a positive pulse via the ADD CARRY line to the bit 7 position of the adder. Referring to FIG. 24C, at the same time, positive signals on the RES 1 NEG, CARRY SAVE OVFL and A+K(A-B) lines in combination with the positive clock pulse on the T3 line are applied to render the AND circuit 775 effective to apply a negative pulse to the OR circuits 786 and 789 which, in turn, apply positive pulses to the GATE ACC TO ADDER and ADD CARRY lines, respectively.

The positive pulse on the GATE ACC TO ADDER line is applied to render the AND circuits 692 in FIG. 23H effective to pass the A+K(A−B) contents of the accumulator 706 via the true complement circuit 694, presently in the true condition, to the B side of the adder 696. The A+K(A−B) value in combination with the ADD CARRY pulse, applied to the 7th stage of the adder 696 permits the end around carry operation to be performed in the adder 696 to obtain the true A+K-(A−B) result. The now true form of the A+K(A−B) value is passed via the AND circuits 700, conditioned by the positive signal on the not ACC SHIFT line and the OR circuits 704 to the accumulator 706. Referring now to FIG. 24B, at T3/sample time, positive signals on the A+K(A−B), T3, CARRY SAVE OVFL, RES 1 NEG lines in combination with the SAMPLE pulse are applied to render the AND circuit 769 effective to apply a negative pulse to the OR circuit 773 which, in turn, applies a positive pulse via the ACC CLOCK line to the accumulator 706 in FIG. 23H to load the true value of the A+K(A−B) value into the accumulator which may then be taken as the RGL value for the scan sample point.

A+K(A−B) Mode; RES 1 POS; CARRY YES

In the case where the sharp A value is added to the true form of the K(A−B) value and a carry results, it indicates that the A+K(A−B) result is greater than 255. Consequently, since the RGL value cannot exceed 255, the contents of the accumulator must be corrected to the maximum value by setting the accumulator to all 1's. Accordingly, referring to FIG. 24A, at T2 time, positive signals on the RES 1 POS, A+K(A−B) and CARRY lines in combination with the T2 clock pulse are applied to render the AND circuit 753 effective to apply a negative pulse to the OR circuit 760 which, in turn, applies a positive pulse to the inverter 760A where it is inverted to a negative pulse and applied via the SET ACC TO 1's line to set the accumulator 706 in FIG. 23H to all 1's which may then be taken as the RGL value for the scan sample point.

A+K(A−B) Mode; RES 1 POS; CARRY NO

In the case where the sharp A value is added to the true form of the K(A−B) value and no carry results, it indicates that the content of the accumulator is a valid result and may be taken as the RGL value for the scan sample point.

A+K(A−B) Mode; ALL CASES

Referring to FIG. 24D, at T5 time, positive signals on the A+K(A−B) and RES 4 lines in combination with the T5 clock pulse are applied to render the AND circuit 794 effective to apply a negative pulse to the OR circuit 797 which, in turn, applies a positive pulse to inverter 798 where it is inverted to a negative pulse and applied via the DATA STORE line to signal the Buffer and Bus Control Unit 1100 to initiate a cycle of operation of the buffer to transfer the A+K(A−B) contents of the accumulator to the Buffer as the RGL value of the scan sample point. Referring now to FIG. 23J, at T5/sample time, positive signals on the A+K(A−B), T5 and RES 4 lines in combination with the SAMPLE pulse are applied to render the AND circuit 736 effective to apply a negative pulse to reset the A+K(A−B) flip flop 740 thereby terminating the A+K(A−B) mode of operation. The A+K(A−B) flip flop 740 in being reset applies a positive signal via the not A+K-(A−B) line to the AND circuit 796 in FIG. 24D. Since all mode flip flops are in a reset condition at this time, then positive signals from the not output of the mode flip flops are applied to condition the AND circuit 796 so that the next SAMPLE pulse renders the AND circuit 796 effective to apply a negative pulse via the STOP CLOCK line to reset the CLK RUN latch 683 in FIG. 23I. The CLK RUN latch 683 in being reset applies a negative signal from the upper output thereof to decondition the single shot 685 from being fired to produce further clock pulses for the arithmetic unit. Referring now to FIG. 24D, it should be apparent that at the end of A−B mode of operation, if the arithmetic unit does not step to the A+(A−B) or K(A−B) mode of operation, the conditions to render the AND circuit 796 will be met to produce the STOP CLOCK signal to stop arithmetic unit clock. Likewise, at the end of the A+(A−B) mode of operation the conditions to render the AND circuit 796 will again be met to produce a STOP CLOCK signal to stop the arithmetic unit clock. Lastly, at the end of the K(A−B) mode of operation if the arithmetic unit does not step to the A+K(A−B) mode of operation the conditions to render the AND circuit 796 again be met to produce the STOP CLOCK signal and stop the arithmetic unit clock. Referring now to FIG. 23G, the negative pulse on the DATA STORE line is applied to reset the GT X MAJ latch 676 which was previously turned on to permit the X MAJ value in the X MAJ register 614 in FIG. 23D to be transferred to the Skip counter 522. The negative pulse on the DATA STORE line is also applied to the inverter 660 in FIG. 23G where it is inverted to a positive pulse to turn on the X MAJ/MIN flip flop 662. The X MAJ/MIN flip flop 662 in being turned on applies a positive signal from the upper output thereof and in combination with the positive signal on the not GT SLIP line conditions the AND circuit 674 in preparation for an X MIN step to the next scan sample point.

Buffer-Write Operation (Load Scan Buffer Command)

Referring now to FIGS. 23B and 23C, the negative pulse on DATA STORE line is applied to the OR circuit 1102 in the Buffer and Bus Control 1100 which, in turn, applies a positive pulse to the inverter 1106 where it is inverted to a negative pulse and applied to the OR circuit 1112 and to turn on the S/F Mode latch 1110. The OR circuit 1112 applies a positive pulse to fire the single shot 1114 which in turn applies a positive start clock signal to the clock ring counter 1118 which is driven by the oscillator 1116 to produce a series of 8 clock pulses T0 to T7 during the buffer cycle. The S/F mode latch 1110 in being turned on applies a positive signal on the store line to condition the AND circuits 1120 and 1128 and to render the AND circuits 1140 effective to pass the RGL value of the scan sample point, from the SCAN OUT BUS to the inputs of the data register 1144. At T2 time of the buffer clock cycle, the T2 clock pulse is applied to render the AND circuit 1128 effective to apply a negative pulse to the OR circuit 1129 which, in turn, applies a positive pulse on the STROBE line to load the first RGL value into the data register 1144. At T5 time of the buffer clock cycle, the T5 clock pulse is applied to render the AND circuit 1120, conditioned by the positive signal on the store line, effective to apply a negative pulse to turn on the W/R latch 1124 which, in being turned on, applies a positive write signal to the buffer 1200 to allow the RGL byte stored in the data register 1144 to be loaded via the DATA IN BUS into the Buffer 1200 at the location designated by the buffer address register counter 1132. At T6 time of the buffer clock cycle, the T6 clock pulse is applied to fire the single shot 1126 which, in turn, applies a positive pulse to the BFR CYC COMP line to signal the scanner/plotter control unit that the buffer cycle has been completed. At T7 time of the buffer clock cycle, the T7 clock pulse is applied to step the BAR CTR 1132 to the next address and is also applied to the inverter 1122 where it is inverted to a negative pulse to reset the W/R latch 1124. In a similar manner, after each RGL value is computed by the arithmetic unit of the scanner/plotter control unit, the negative pulse on the DATA STORE line is applied to the Buffer and Bus Control 1100 to initiate another cycle of operation to load each computed RGL value in the next location of the Buffer 1200.

Load Scan Buffer Command Operation - Sequence 0 Continued

Figure 25:
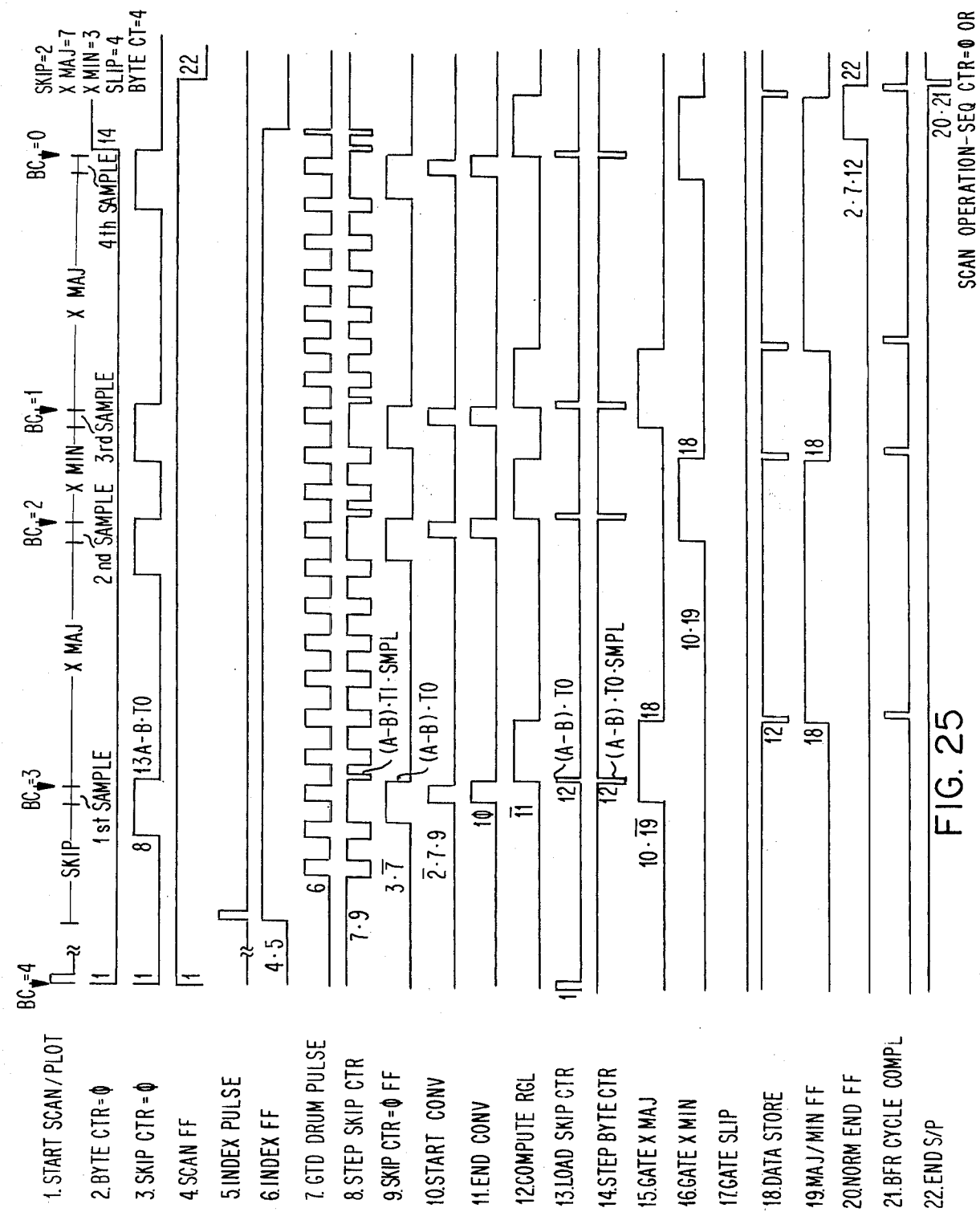
FIG. 25 comprises a timing diagram of a cycle of operation of the scanner/plotter control unit during sequence 0 or 3 of a scan operation.

Referring now to FIGS. 23D and 23E, and the timing diagram of FIG. 25, it will be remembered that at the start of the arithmetic computation of the RGL value i.e. at (A−B)−T0 time, the X major value was loaded into the Skip counter 522 and the Skip Counter=0 flip flop 532 was reset. The SKIP CTR=0 flip flop 532 in being reset applied a positive signal from the lower output thereof to condition the AND circuit 514. At (A−B)−T0−Sample time, the Skip counter 522 was stepped to decrement the X major value by 1 and the next following gated drum pulse and the succeeding gated drum pulses are applied to render the now conditioned AND circuit 514 effective to apply further negative step pulses to the Skip counter 522 to decrement the counter down to 0 as the drum continues to rotate in the X direction. When the Skip counter 522 decrements to a count of 0, decoder 526 decodes this condition and applies a positive signal on the SKIP CTR = 0 line, indicating that the drum has moved the X major distance and is at the second scan sample point. Another START CONVERT signal is produced, in a manner as previously described, to initiate a second conversion to generate a second sharp value signal A and unsharp value signal B. Referring now to FIG. 23G, the positive pulse on the START CONVERT line is applied to render the AND circuit 674, now conditioned by positive signals on the X MIN and not GT SLIP lines, effective to apply a negative pulse to turn on the GT X MIN latch 678. The GT X MIN latch 678 in being turned on applies a positive signal to render the AND circuits 626 in FIG. 23D effective to pass the X minor value in X MIN register 616 in FIG. 23F via the OR circuits 518 in FIG. 23D to the inputs of the Skip counter 522. At the end of the second conversion, the computation of the second RGL value is initiated by the arithmetic unit in a similar manner as that described above. At (A−B)−T0 time of the second arithmetic computation cycle the X minor value is loaded into the Skip counter 522. It will be apparent from the timing diagram in FIG. 25 that at the end of each computation of an RGL value the DATA STORE pulse is effective to switch the X MAJ/MIN flip flop 662 in FIG. 23F and alternately condition the AND circuits 672 and 674 for alternately initiating the gating of the X major value followed by the X minor value so that succeeding scan samples are taken at the proper points during the rotation of the drum. Referring now to FIG. 23D, and the timing diagram in FIG. 25, at the end of each A/D conversion and at the start of the computation of the RGL value i.e. at (A−B)−T0−Sample time, the AND circuit 520 is rendered effective to step the S/P byte counter 524 and decrement the byte count by 1. When the byte count is stepped to a count of 0, this condition is decoded by the decoder 528 in FIG. 23E to apply a positive signal via the BYTE CNT=0 line to the AND circuit 410 and the inverter 533 where it is inverted to a negative signal to decondition the AND circuit 534 and thereby inhibit production of any further pulses on the START CONVERT line. Referring now to FIG. 23A, the next occurring drum pulse renders the AND circuit 312 effective to apply a negative pulse to the OR circuit 408 in FIG. 23E which in turn applies a positive pulse to condition the AND circuits 410 and 414. The AND circuit 410 conditioned by the positive signal on the BYTE CNT=0 line is rendered effective to apply a negative pulse to the inverter 411 where it is inverted to a positive pulse and applied to the NORM END flip flop 412. Since the arithmetic unit is presently computing the last RGL value, in the example illustrated in the timing diagram of FIG. 25, a positive signal is maintained on the CLK RUN line to condition the flip flop 412 for being turned on so that when the positive pulse is applied from the inverter 411 the NORM END flip flop 412 is turned on. The NORM END flip flop 412 in being turned on applies a positive signal to the AND circuits 414 and 416. Accordingly, AND circuit 414 is rendered effective to apply a negative pulse to the OR circuit 323 in FIG. 23A which, in turn, applies a positive pulse to the inverter 325 where it is inverted to a negative pulse to turn off the INDEX flip flop 310. The INDEX flip flop in being turned off applies a negative signal from the upper output thereof to decondition the AND circuits 311 and 312 to prevent any further drum pulses or the index pulse from being gated. It should be noted that in the case where no drum pulse occurs after the byte count decrements to a count of 0 because the maximum number of drum pulses has been produced, this condition is detected by the decoder 316 which, in turn, applies a positive signal to the AND circuit 315 which in combination with the positive signal from the upper output of the INDEX flip flop 310 renders the AND circuit 315 effective to apply a negative pulse via the gated last pulse line to also initiate the turning on of the NORM END flip flop 412. Now, returning to the example in FIG. 25, the arithmetic unit continues to compute the last RGL value at the end of which the negative pulse on the DATA STORE line is effective to signal the Buffer and Bus Control 1100 to initiate the last cycle of operation of the Buffer 1200 to load the last RGL value in the Buffer 1200. At T6 time of the buffer clock cycle, a positive pulse on the BFR CYC COMP line is applied to render the AND circuit 416 effective to apply a negative pulse via the END S line to the OR circuit 420 which, in turn, applies a positive pulse to fire the single shot 422, previously conditioned by the positive signal on the ANY OP line which was produced by the negative signal on the not scan mode line at the start of the Scan operation and applied to the OR circuit 418 which applied the positive signal on the ANY OP line. The negative pulse on the END S/P line is applied to reset the NORM END flip flop 412, to step the sequence counter 640 in FIG. 23F to SEQ 1 and to reset the SCAN flip flop 402 in FIG. 23D to end the scan mode of operation and via the COMMON CONTROL BUS to signal COMMON CTRL 1000 of the end of the Seq. 0 scan operation. COMMON CTRL 1000, in response to the END S/P signal, is effective to transmit a device end signal to the data processor to indicate that the execution of the load scan buffer command has been completed. COMMON CTRL 1000 then applies a positive pulse via the COMMON CONTROL BUS and the STAT RES DE line to the Y control in FIG. 23K to initiate movement of the head assembly for the next scan line operation.

Y Control - Scan Operation

Referring now to FIG. 23K, it will be remembered that the Y MAJ/MIN flip flop 818 was turned on by the positive pulse on the start S/P line to apply a positive signal via the Y MIN line to render AND circuits 816 effective to pass the Y minor value from the Y MIN register 808 to the inputs of the Y counter 820. Accordingly, and in conjunction with the timing diagram in FIG. 32, the positive pulse on the STAT RES DE line is applied to the AND circuit 810 which is conditioned by positive signals on the SCAN MODE SW and LD SB lines. Accordingly, the AND circuit 810 is rendered effective to apply a negative pulse to the OR circuit 815 and to the inverter 811 where it is inverted to a positive pulse and applied to the load line of the Y CTR 820. As a result, the Y minor value is loaded into the Y CTR 820. At the same time, the OR circuit 815 produces a positive pulse, the negative trailing edge of which is applied to turn on the SCAN/PLOT flip flop 828, the STEP CTRL flip flop 832 and to reset the CTR CTRL flip flop 836. The STEP CTRL flip flop 832 in being turned on applies a positive signal via the START SET line to the Y MOTOR CONTROL 840 which in turn signals the Y step motor 18 to initiate movement of the head assembly in the Y direction. As previously described, the Y stepping motor-lead screw combination provides step increments of 0.275 mils per step in the Y direction with two steps being taken for each Y increment. Accordingly, for each Y increment Y MOTOR CTRL 840 applies two positive pulses to the STEP HEAD line, the first of which is applied via inverter 835 to the clock input of the CTR CTRL flip flop 836. Since the CTR CTRL flip flop 836 is initially in a reset state, a positive signal from the lower output thereof conditions the flip flop for being turned on so that at the occurrence of the first pulse on the STEP HEAD line, the positive trailing edge of the negative pulse from the inverter 835 is effective to turn on the CTR CTRL flip flop 836 and apply a positive signal from the upper output thereof to condition the AND circuit 824. The second positive pulse on the STEP HEAD line is applied to render the AND circuit 824 effective to apply a negative pulse to the inverter 825 where it is inverted to a positive pulse, the trailing edge of which is effective via the STEP Y CTR line to step the Y CTR 820 and thereby decrement the Y minor value by 1. The CTR CTRL flip flop 836, presently being on, applies a negative signal from the lower output thereof to condition the flip flop 836 for being turned off. Accordingly, at the end of the second positive pulse on the STEP HEAD line, the positive trailing edge of the negative pulse from the inverter 835 is effective to turn off the CTR CTRL flip flop 836. The CTR CTRL flip flop 836 in being turned off applies a negative signal from the upper output thereof to decondition the AND circuit 824. Therefore, it will be apparent that the CTR CTRL flip flop 836 is switched on and off at the end of every positive pulse on the STEP HEAD line and the AND circuit 824 is rendered effective by every second positive pulse applied to the STEP HEAD line to decrement the Y CTR 820. When the Y CTR 820 steps to a count equal to 1, decoder 822 detects this condition and applies a positive signal to the AND circuit 826. At the end of the next positive pulse applied to the STEP HEAD line, the CTR CTRL flip flop 836 is turned on, which in being turned on applies a positive signal to condition the AND circuit 824 and 826. Upon the occurrance of the last positive pulse on the STEP HEAD line, the AND circuit 826 is rendered effective to apply a negative pulse to the inverter 830 where it is inverted to a positive pulse on the END HD STEP line. The positive pulse on the END HD STEP line in combination with the positive signal from the output of the SCAN/PLOT flip flop 828 renders the AND circuit 838 effective to apply a negative pulse via the HEAD STOPPED line to signal COMMON CTRL 1000 via the COMMON CONTROL BUS. At the negative trailing edge of the positive pulse on the END HD STEP line, the SCAN/PLOT flip flop 828 and STEP CTRL flip flop 832 are reset. The STEP CTRL flip flop 832 in being rest applies a negative signal via the START STEP line to signal the Y MOTOR CTRL 840 to stop the Y STEP MOTOR 18. At the same time, the trailing edge of the positive pulse from the invention 825 produced by the last positive pulse on the STEP HEAD line via the conditioned AND circuit 824 is applied via the STEP Y CTR line to step the Y CTR 820 and decrement the Y minor value to a count of 0.

Read Buffer Command Operation

After the end of the execution of the load scan buffer command and while the head assembly is moving in the Y direction, the data processor transmits a read buffer command, as shown in FIG. 20, to the scanner/plotter control unit. Referring to FIGS. 23B and 23C, common control 1000 decodes the command and applies a positive signal on the R CMD line to condition the AND circuit 1162 in the Buffer and Bus Control 1100. Following this, common control 1000 applies a negative pulse via the RESET BAR line to reset the BAR CTR 1132 followed by a negative pulse on the RD line which is applied to the OR circuit 104 in the Buffer and Bus Control 1100 to initiate a cycle of operation of the Buffer 1200 to read out the first RGL value for transmission to the data processor.

Buffer-Read Operation (Read Buffer Command)

The W/R latch 1124 remains in a reset condition during the entire buffer cycle and, accordingly, maintains a negative signal on the W/R line to allow the contents of an addressed location to be maintained on the DATA OUT BUS. The OR circuit 1104 in response to the negative pulse on the RD line applies a positive pulse to the inverter 1108 where it is inverted to a negative pulse which is applied to the OR circuit 1112 which, in turn, applies a positive pulse, the negative trailing edge of which is effective, to fire the single shot 1114 to apply a positive start clock signal to the clock ring counter 1118 which is driven by the oscillator 1116 to produce the series of 8 clock pulses during the buffer cycle. The negative pulse from the inverter 1108 is also applied to reset the S/F mode latch 1110 which, in being reset, applies a positive signal on the fetch line to condition the AND circuit 1130 and to render the AND circuits 1136 effective to pass the contents of the 0 location of the buffer, i.e. the first RGL value byte, from the DATA OUT BUS to the input of the data register 1144.

At T6 time of the buffer clock cycle, the T6 clock pulse is applied to render the AND circuit 1130, conditioned by the positive signal on the fetch line, effective to apply a negative pulse to the OR circuit 1129 which, in turn, applies a positive pulse on the STROBE line to load the first RGL value into the data register 1144. The output of the data register 1144, i.e. the first RGL value byte, is passed via a normal path including AND circuits 1150 or a mirror path consisting of AND circuits 1148 and permutation box 1152, depending on the setting of the M/N switch in FIG. 23D, to the OR circuits 1156 and AND circuits 1162, conditioned by the positive signal on the RD CMD line, to the OUT BUS via Common Control 1000 to the Data Processor. At T7 time of the Buffer cycle, the T7 clock pulse is applied to step the BAR CTR to provide the address for the next location in the Buffer 1200 from which the next RGL value byte is to be read. The T7 clock pulse is also applied to inverter 1122 where it is inverted to a negative pulse to maintain the W/R latch 1124 in the read mode. In a similar manner, common control 1000 produces a series of negative pulses on the RD line to signal the Buffer and Bus Control 1100 to initiate a series of Buffer cycles to completely unload the Buffer 1200 and apply the record block of RGL bytes scanned during the first scan line via the DATA OUT BUS to the Buffer and Bus Control 1100 and via the OUT BUS to common control 1000 where it is then passed via the channel bus to the data processor. When the Buffer 1200 is completely unloaded, the buffer address register counter 1132 is standing at the maximum count of 7755 which condition is decoded by decoder 1134 to apply a positive signal via the BFR END line to common control 1000. At common control 1000 the buffer end signal is effective to cause the channel end and device end signals to be transmitted to the data processor to indicate that the execution of the read buffer command has been completed.

Load Scan Buffer Command Operation - Sequence 1

The data processor transmits a second load scan buffer command to the scanner/plotter control unit. Common control 1000 decodes the command, as before, and transmits a channel end signal to the data processor to indicate the initial selection sequence is completed. If the head assembly is still moving in an axial direction, the execution of the command does not proceed until such time as the head stopped signal is received from the Y control. When the head stopped signal is received, common control 1000 then proceeds to issue a positive pulse via the common control bus to the start S/P control line in FIG. 23D.

Figure 26:
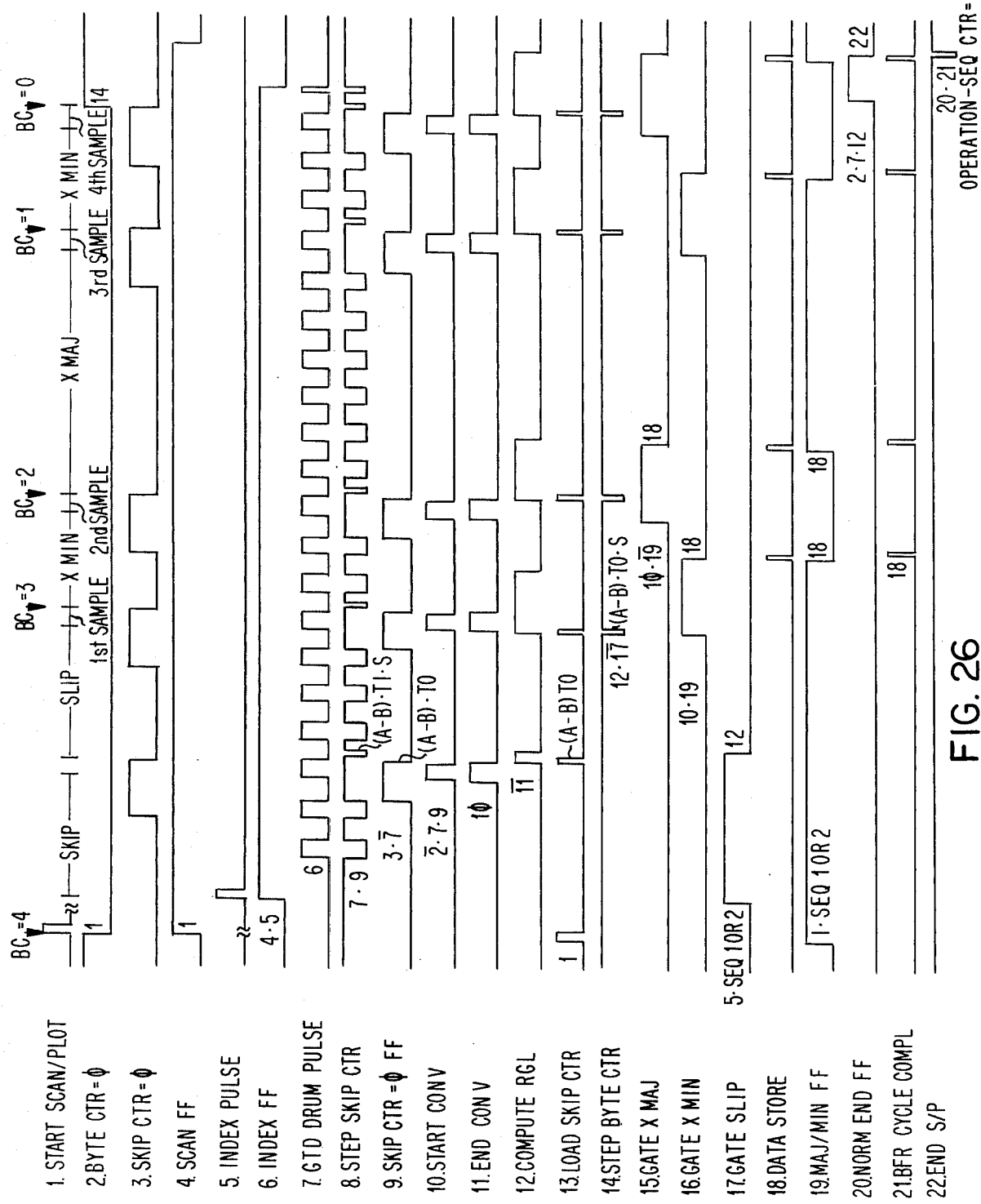
FIG. 26 comprises a timing diagram of a cycle of operation of the scanner/plotter control unit during sequence 1 or 2 of the scan operation.

The operation of the scanner/plotter control unit can now be followed in conjunction with the timing diagram shown in FIG. 26 which illustrates the example of the scan operation during SEQ 1 where the reproduction parameters again have the values: Skip=2, X MAJ=7, X MIN=3, Slip=4 and Byte Count=4. The positive control pulse on the S/P control line is applied to the scan flip flop 402 in FIG. 23D which is conditioned by the mode switch in FIG. 23 being positioned for the scan mode operation. Accordingly, the scan flip flop 402 is turned on to apply a positive signal to the scan mode line and a negative signal to the not scan mode line. The positive signal on the scan mode line is applied to condition the AND circuit 302 in FIG. 32A in preparation for receiving the INDEX pulse while the negative signal on the not scan mode line is applied to OR circuit 418 in FIG. 23E which, in turn, applies a positive signal on the ANY OP line to condition the END S/P single shot 422. Referring now to FIG. 23G, the GT SLIP flip flop 670, GT X MAJ latch 676 and GT X MIN latch 678 are all initially in the reset state, and consequently, apply negative signals from their upper outputs to decondition the AND circuits 628 in FIG. 23F and the AND circuits 624 and 626 in FIG. 23B, respectively, to block the output of the X MAJ register 614, X MIN register 616 and X SLIP register 618 from being transferred to the Skip counter 522. However, referring to FIG. 23A, the INDEX flip flop 310 in being initially in a reset state applies a positive signal on the not index line in FIG. 23D to render the AND circuits 511 effective to pass the X Skip value in register 510 via the OR circuits 518 to the inputs of the Skip counter 522. Accordingly, the positive pulse on the start S/P control line is applied to the inverter 515 where it is inverted to a negative pulse and applied to the OR circuit 516 which, in turn, applies a positive load signal to the Skip counter 522 to load the X Skip value from the skip register 510 into the Skip counter 522. As a result of loading the X Skip value in the Skip counter 522, decoder 526 in FIG. 23E decodes the fact that a 0 value is no longer contained in the Skip counter and a negative signal is applied and maintained on SKIP CTR=0 line until the Skip counter 522 is decremented to 0.

The operation of the scanner/plotter control unit during this sequence is identical to that in the previous sequence in so far as loading the X Skip value from the skip register 510 in FIG. 23D to the Skip counter 522 and for loading the byte count in the S/P byte count register 512 to the S/P byte counter 524 in response to the positive pulse on the start S/P line.

It will be remembered that at the end of the SEQ 0 operation, a positive pulse on the END S/P line was applied in FIG. 23F to step the SEQ counter 640 to a count of 1 which condition is decoded by decoder 650 to apply a positive signal via the Seq. 1 or 2 line to condition the AND circuits 654 and 658. Accordingly, the positive pulse on the start S/P line is also applied to render the AND circuit 654 effective to apply a negative pulse to turn on X MAJ/MIN flip flop 662 which in being turned on applies a positive signal via the X MIN line to one input of the AND circuit 674. The positive pulse on the start S/P line is also applied to render the AND circuit 658 effective to apply a negative pulse to turn on the GT SLIP flip flop 670 which in being turned on applies a positive signal via the GT SLIP line to condition the AND circuits 628 for passing the X SLIP value from register 618 via the OR circuit 518 in FIG. 23D to the inputs of the Skip counter 522. Referring now to FIG. 23K, the Y MAJ/MIN flip flop 818 was turned on during the SEQ 0 operation and, therefore, when the start S/P pulse is now produced it causes the flip flop 818 to be turned off which, in being turned off, applies a positive signal from the lower output thereof via the Y MAJ line to condition the AND circuits 812 for passing the Y major value in register 806 to the inputs of the Y counter 820.

Following this, the scanner/plotter control unit proceeds in the same manner as described in the SEQ 0 operation to sense the index pulse, turn on the index flip flop 310 in FIG. 23A and initiate production of the gated index pulse followed by the gated drum pulses. The positive pulse on the gated index pulse line is applied to render the AND circuit 658 in FIG. 23F effective to apply a negative pulse to turn on the GT SLIP flip flop 670 which in being turned on applies a positive signal to the GT SLIP line and a negative signal on the not GT SLIP line. The positive signal on the GT SLIP line is applied to render the AND circuits 628 effective for transferring the X slip value in register 618 via the OR circuits 518 in FIG. 23D to the inputs of the Skip counter 522. At the same time, the negative signal on the not GT SLIP line is applied to decondition the AND circuit and prevent the positive pulse produced on the START CONVERT line from rendering the AND circuit 674 effective to turn on the GT X MIN latch 678. Accordingly, a negative signal is maintained via the upper output of the GT X MIN latch 678 to decondition the AND circuits 626 in FIG. 23D from passing the X minor value from the register 616 to the Skip counter 522. Since the X skip value is presently in the Skip counter 522 the decoder 526 in FIG. 23E maintains a negative signal on the SKIP CTR=0 line. Accordingly, the SKIP CTR=0 flip flop 532 is maintained off and the AND circuit 514 in FIG. 23D is conditioned to pass the gated drum pulses to step the Skip counter 522 and decrement the X skip value by 1 for each step pulse. When the X Skip value in the Skip counter 522 is decremented to a count of 0, this condition is decoded by decoder 526 in FIG. 23E and the AND circuit 534 is rendered effective, in a manner previously described, to cause a positive pulse to be applied to START CONVERT line. The positive pulse on the START CONVERT line is applied to the A/D converters to initiate the generation of digital sharp value A and unsharp value B signals corresponding to the sample point presently being scanned. When the A/D conversion is complete, a positive pulse is again applied to the END CONVERT line to initiate operation of the arithmetic unit in a manner previously described. At (A−B)−T0 time of the computation cycle, a positive pulse is applied via the (A−B)−T0 line and the OR circuit 516 in FIG. 23D to load the X SLIP value from register 618 into the Skip counter 522. Referring now to FIG. 23I, at T2 time of the computation cycle, the negative signal on the not GT SLIP line is inverted by inverter 715A to a positive signal which in combination with the positive signal from the upper output of the A−B flip flop 716 and the T2 clock pulse renders the AND circuit 712A effective to apply a negative pulse via the OR circuit 713A and inverter 714A to reset the A−B flip flop 716 and thereby abort the computation cycle. The negative signal on the not GT SLIP line is also applied to decondition the AND circuit 723 so that the T2 clock pulse is ineffective to be passed to turn on the RES 1=0 flip flop 736 in the situation where the sharpness factor K=0.

Referring now to FIG. 23G, at T3 time, the T3 clock pulse is effective to reset the GT SLIP flip flop 670. The GT SLIP flip flop 670 in being reset applies a negative signal from the upper output thereof to decondition the AND circuit 628 in FIG. 23F to inhibit the transfer path of the X slip value from the SLIP register 618 to the Skip counter 522 in FIG. 23D. Additionally, the GT SLIP flip flop 670 in best reset applies a positive signal from the lower output thereof to condition the AND circuit 674 so that upon the occurrence of the next positive pulse on the START CONVERT line the GT X MIN latch 678 will be turned on to apply a positive signal to condition the AND circuits 626 to pass the X minor value from the X MIN register 616 via the OR circuit 518 to the inputs of the Skip counter 522.

Referring now to FIG. 23D, as the drum continues to rotate, the gated drum pulses are again applied via AND circuit 514 to step the Skip counter and thereby decrement the X SLIP value until the X SLIP is decremented to a 0 value to initiate production of the next positive pulse on the START CONVERT line, in a manner as previously described, this being the first scan sample position for the second scan line. It should be noted that this first scan sample position of scan line 2 is offset from the first scan sample position of scan line 1 by the X slip value as shown in FIG. 10.

From this point, the operation the scanner/plotter control unit is similar as that described in connection with SEQ 0 except that the first scan sample is taken at the end of the X slip distance followed by scan samples taken at X Minor, X Major, X Minor, X Major etc. distances along the document and can be followed by referring to the timing diagram in FIG. 26. At the end of the sequence 1 scan operation, a negative pulse is applied via the END S/P line to step the sequence counter 640 in FIG. 23F to SEQ 2 and via the common control bus to common control 1000 which, in turn, transmits a device end signal to the data processor to indicate that the execution of the second load scan buffer command has been completed. At the same time, common control 1000 applies a positive pulse via the common control bus to the STAT RES DE line in FIG. 23K.

It will be remembered that the positive pulse on the start S/P line, at the start of the load scan buffer command execution, was effective to turn off the X MAJ/MIN flip flop 818 which, in being turned off, applied a positive signal to condition the AND circuit 812 for passing the Y major value from the Y MAJ register 806 to the input of the Y counter 820. Accordingly, when the positive pulse is applied to the STAT RES DE line, it is effective via AND circuits 810 and inverter 811 to produce a load signal to load the Y major value into the Y counter 820 in preparation for stepping the head assembly axially in the Y direction in accordance with the Y major value prior to the next revolution of the drum when the third scan line of the document is to be sampled. The operation of the Y control in FIG. 23K is similar to that previously described in connection with the SEQ 0 operation except that the head assembly is now moved a Y major value rather than a Y minor value.

2nd Read Buffer Command Operations

At the end of the execution of the second load scan buffer command and while the head assembly is moving in the Y direction, the data processor transmits another read buffer command to the scanner/plotter control unit. This command is executed, in a manner as previously described, to unload the buffer 1200 and transmit the record block of RGL bytes scanned during the second scan line to the data processor.

Sequence 2 and 3 Operations

Referring now to FIG. 10, it can be seen that the third scan line, which is a SEQ 2 operation, is performed in the same manner as that in the SEQ 1 operation for the second scan line and that the fourth scan line, which is a SEQ 3 operation, is performed in the same manner as that for the first scan line. Thus, by successive load scan buffer and read buffer commands, successive scan line operations for the document are performed in which scan samples are taken along the scan lines with each successive record block of RGL values being loaded in the buffer of the scanner/plotter control unit and then read to the data processor while the head assembly is moving in an axial direction in preparation for the succeeding scan line. The scanning job, therefore, is performed by a series of successive groups of 4 scan lines corresponding to the 4 sequences and can be followed by referring to the timing diagrams in FIGS. 25 and 26.

Control Drum Stop Command Operation

When the number of scan lines required to scan the entire document is completed, the data processor transmits a control drum stop command, as shown in FIG. 21, to the scanner/plotter control unit in order to stop the operation of the drum. Common control 1000 decodes the command and transmits a channel end signal to the data processor to indicate that the initial selection sequence is completed. Common control 1000 then applies a positive pulse via the common control bus and the STOP DRUM line in FIGS. 23D and 23A to the inverter 317 where it is inverted to a negative pulse to reset the START DRUM flip flop 319. The START DRUM flip flop 319 in being reset applies a negative pulse to reset the DRUM RDY flip flop 322 and to signal the drum motor control to stop the drum. The DRUM RDY flip flop 322 in being reset applies a negative signal via the DRUM RDY line in FIGS. 23A, 23E and 23D and via the common control bus to signal common control 1000 to indicate that the drum is no longer in a ready condition. This effectively ends the scan operation.

Detailed Description of Scan Data Processing

Figure 27:
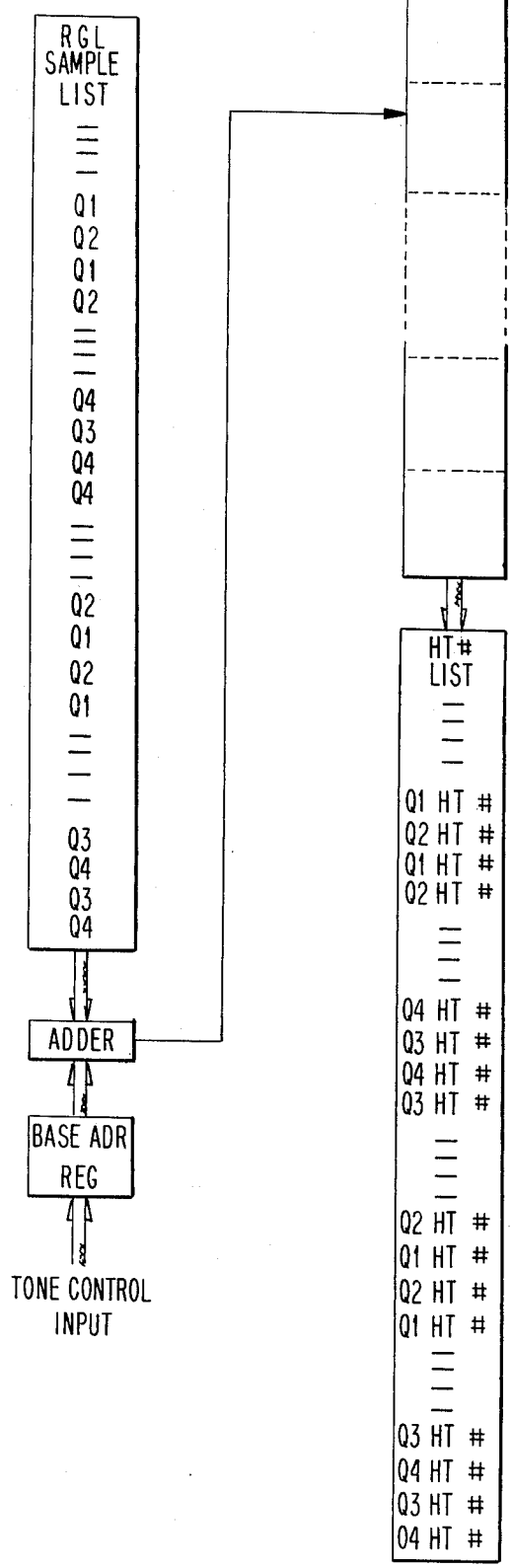
FIG. 27 illustrates a table lookup operation for translating RGL values to halftone number values.

At the data processing system, the resultant gray level values received from the scanner/plotter control unit are converted to halftone number values in accordance with a given scan document. FIG. 11 illustrates the relationship of the gray level values to halftone number values for different given scan documents. Referring to FIG. 27, this conversion may be accomplished by a straight forward table look up technique in which the halftone numbers for the given scan documents are stored in a series of tables. At initial set up time, the operator in examining a given scan document will determine which table produces the best output for the given document and enter an address number into the base address register corresponding to the base address of the desired table. The table look up operation then proceeds to combine the RGL sample list with the base address in the adder to read out halftone number values for the selected table and create a halftone number list corresponding to the RGL sample list. The halftone number list may be retained in the data processing storage or stored in an auxiliary storage such as a magnetic tape, disk etc. until such time as the structuring of halftone plot data is to be performed.

Figure 28H:
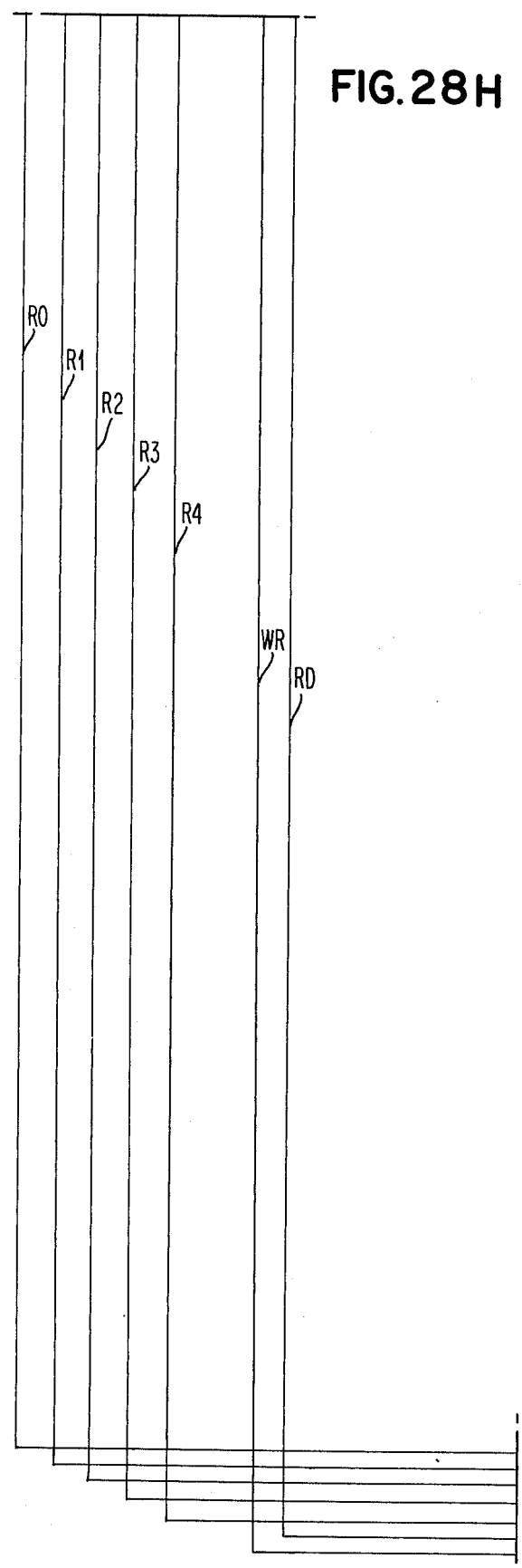
Figure 28B:
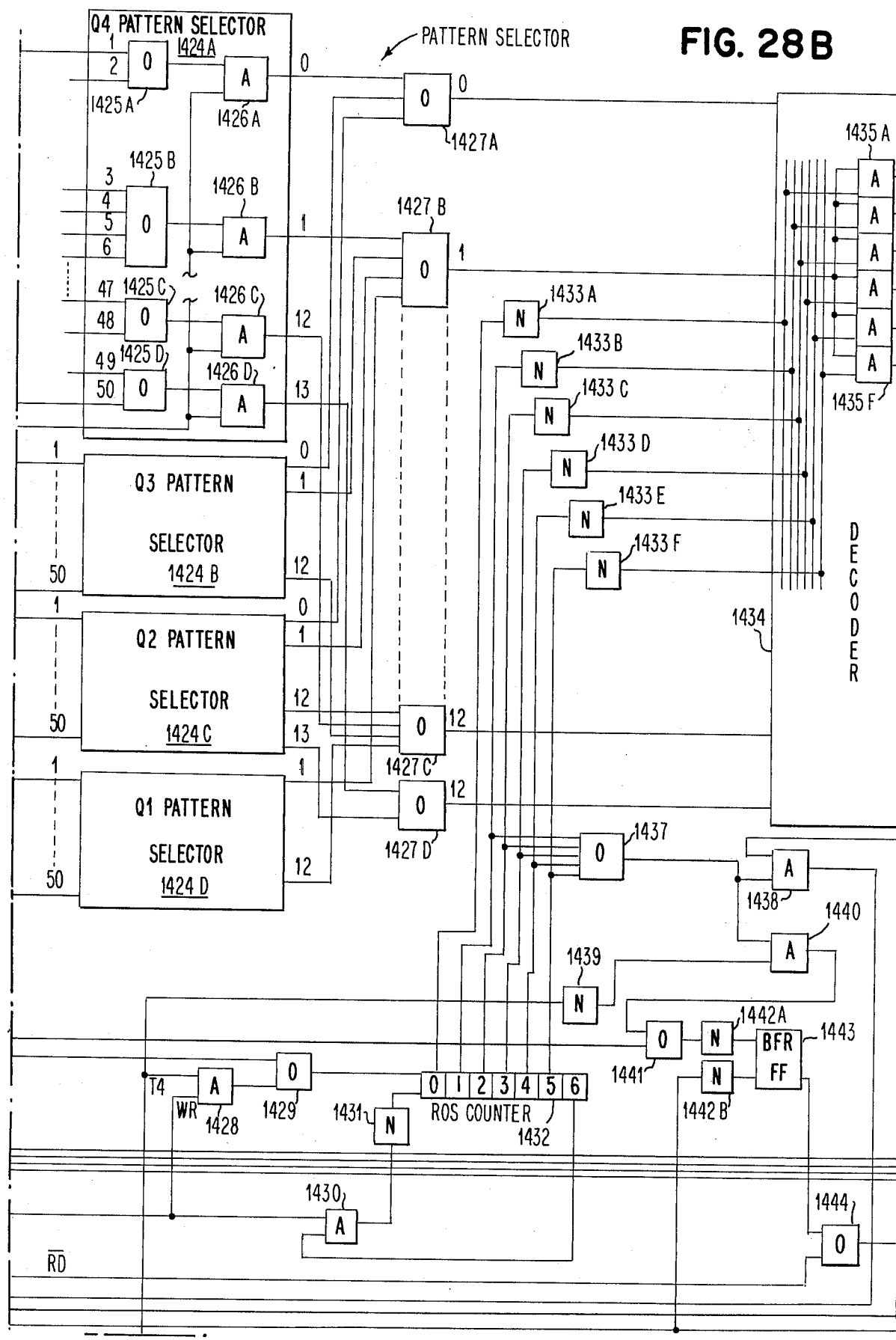
Figure 28C:
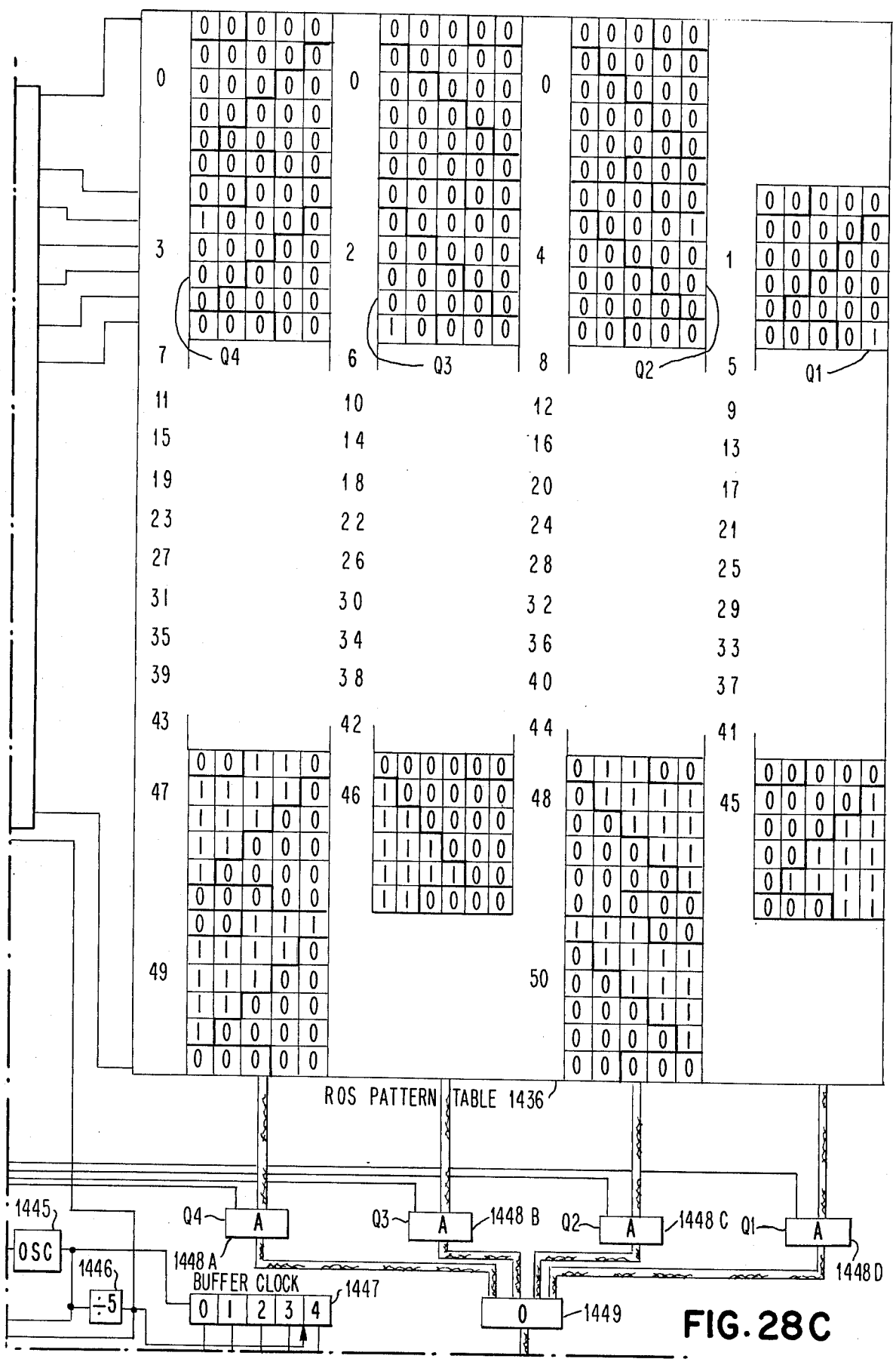
Figure 28D:
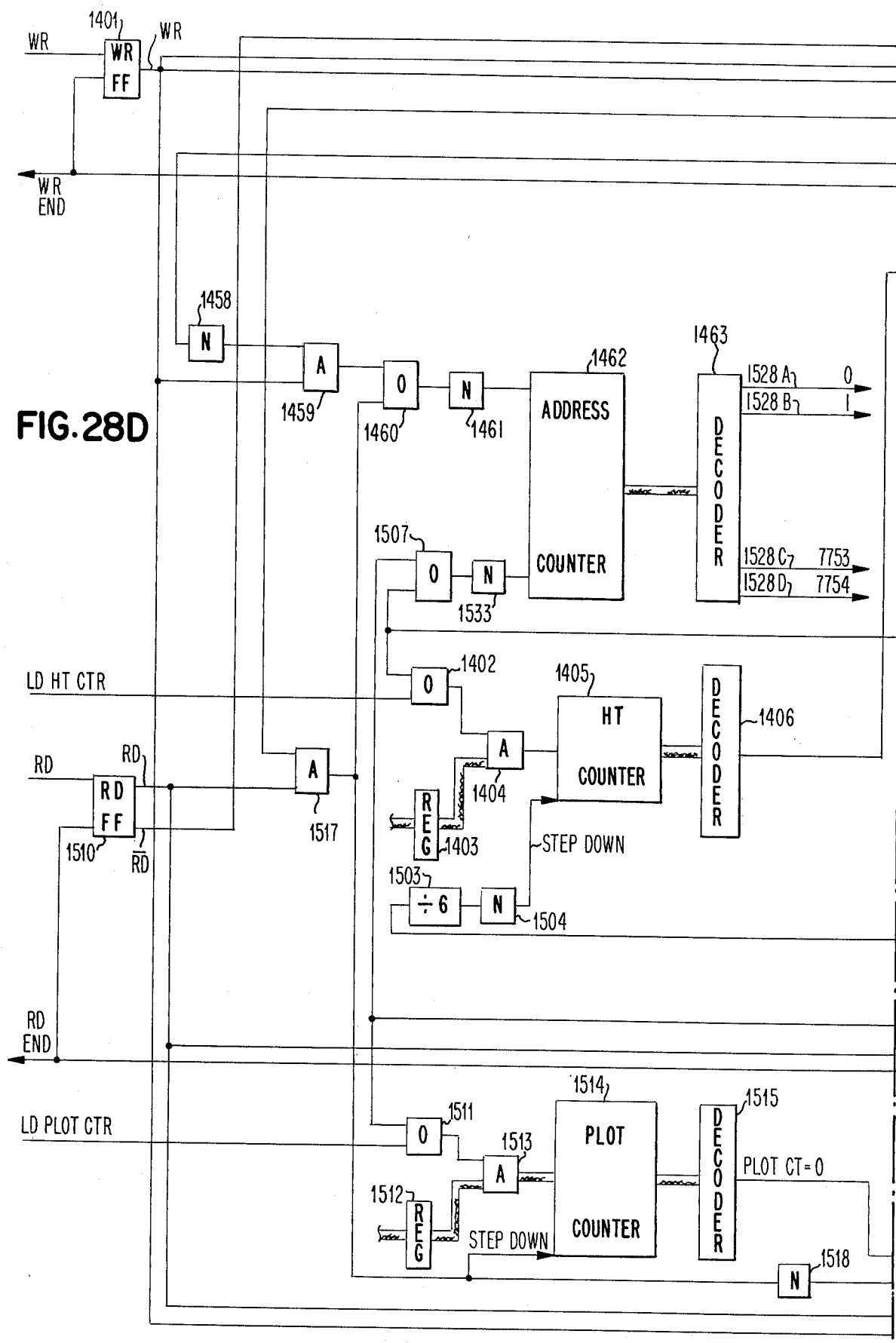
Figure 28E:
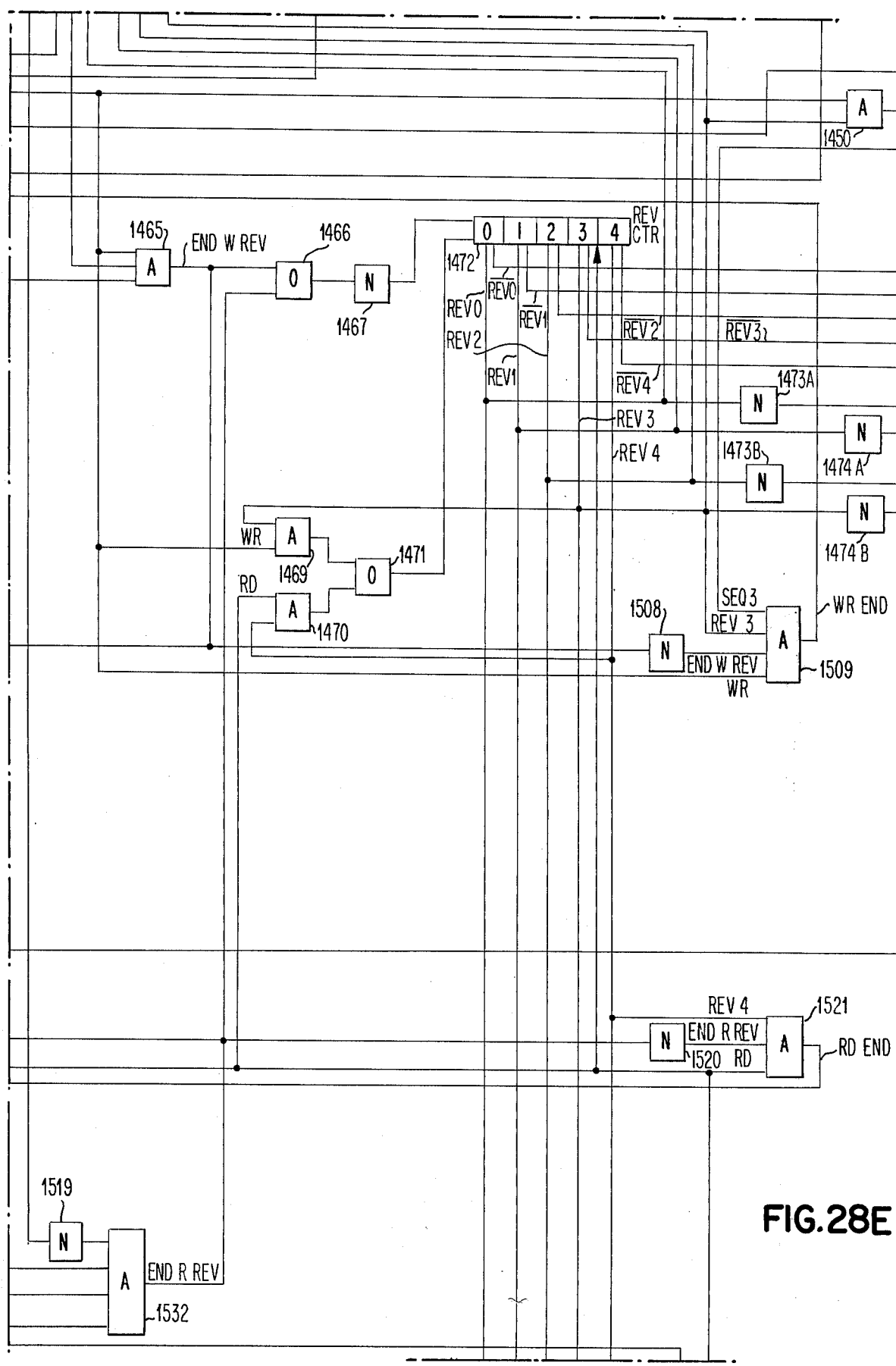
Figure 28G:
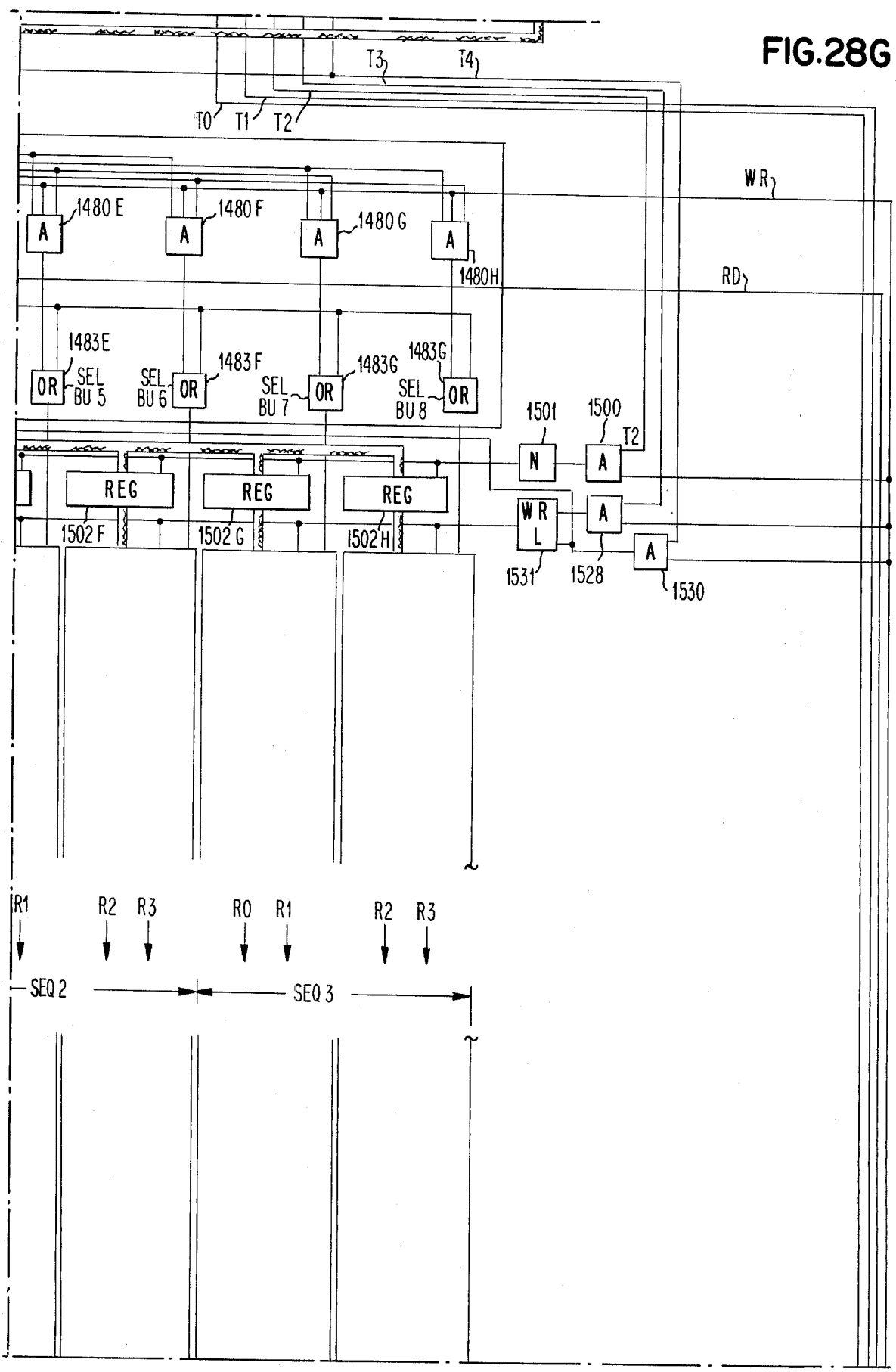
Figure 28:
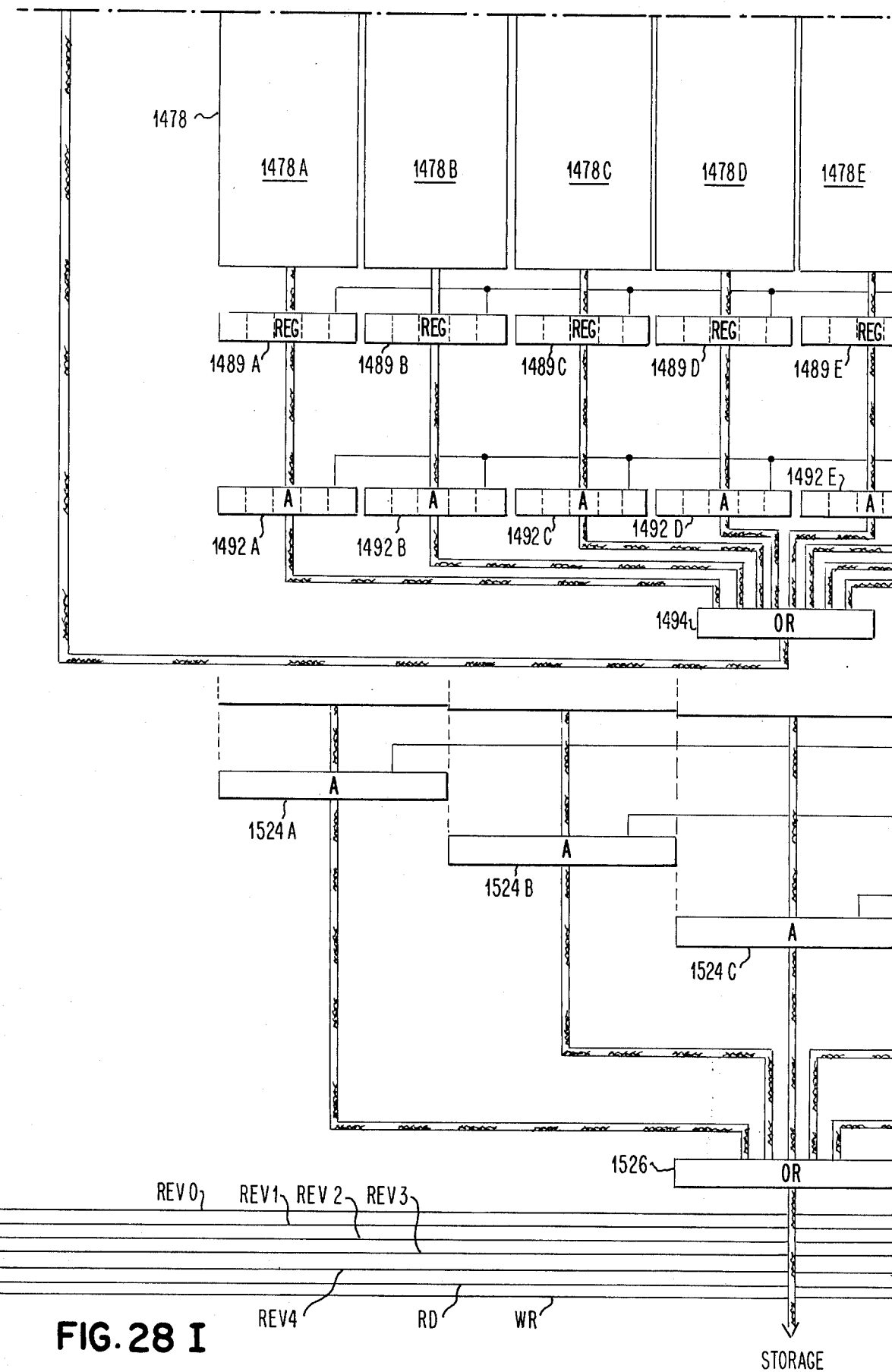
FIG. 28 is a diagram of how FIGS. 28A through 28J may be placed to form a composite block diagram.

Referring now to FIG. 28, data processing logic is shown for receiving the quadrant halftone number list, extracting binary plot pattern data for each received quadrant halftone number value, formatting it with adjacent cell binary plot pattern data to provide a meshed cell binary data configuration in a buffer storage. The assembled pattern data is then added into main storage, a record block of byte data at a time, the starting location of which is placed in the address portion of a write command for the plotting operation. When a plot operation is called for and the scanner/plotter control unit is set up, the data processor then proceeds to transmit the assembled plot data in a data record byte form to the scanner/plotter control unit for plotting.

Write Operation

Figure 29:
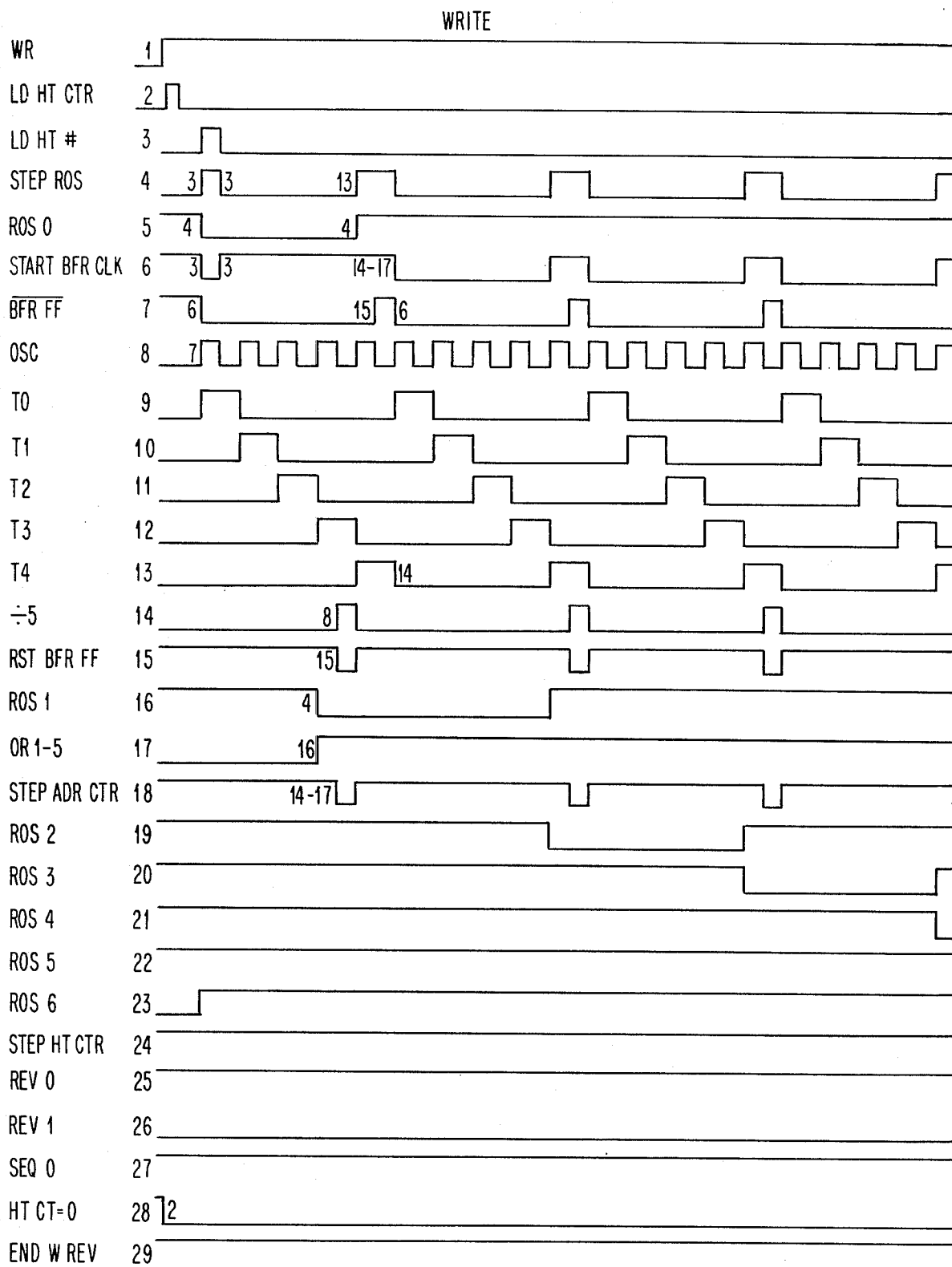
FIG. 29 is a diagram of how FIGS. 29A and 29B may be placed to form a composite block diagram.
Figure 30:
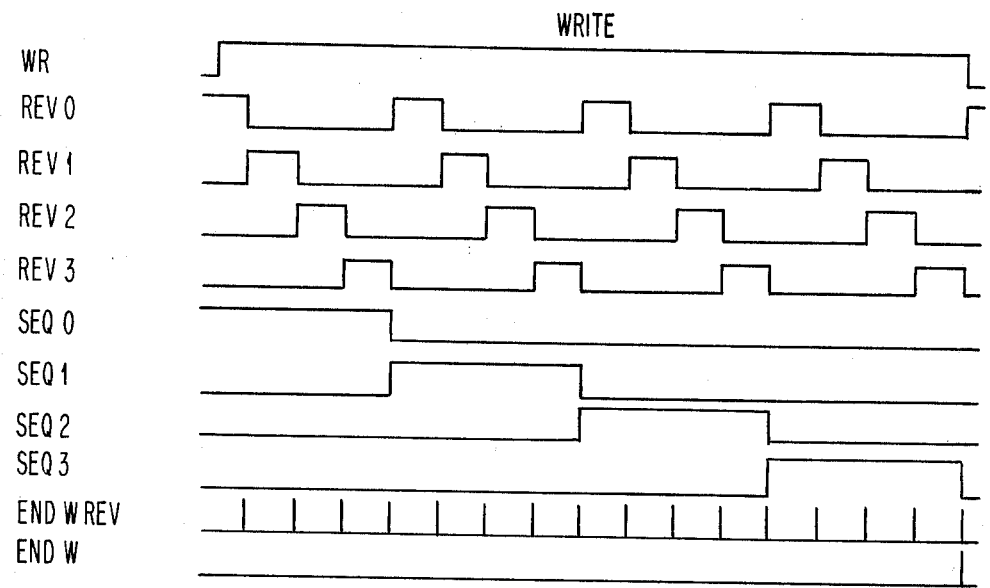
FIG. 30 illustrates the relationship between revolutions and sequences during a write operation of the data processing apparatus.

At the start of the write operation a system reset is applied to reset all counters and registers in preparation for the write operation. The write operation can be followed in conjunction with the timing diagrams in FIGS. 29 and 30. Referring now to FIG. 28D, a write pulse is applied to turn on write flip flop 1401 producing a positive signal on the WR line indicating a write operation is to be performed. Following this, a control signal is applied to the load halftone counter line and via the OR circuit 1402 renders the AND circuit 1404 effective to pass a preset value in register 1403 to the halftone counter 1405, the value in the register 1403 corresponding to the number of scan samples taken in a scan line of the document to be processed. Referring now to FIG. 28A, the positive signal on the WR line is applied as one input to the AND circuits 1412 to 1419 of a sequencer. Second inputs to the AND circuits 1412 to 1419 are connected to the REV outputs of the revolution counter 1472 shown in FIG. 28E. The revolution counter 1472 operates as a four stage ring counter during a write operation and by controlling the intercoupling between stage 3 and stage 4 operates as a 5 stage ring counter during a read operation. The revolution counter 1472 is initially reset such that the first stage is turned on while the remaining stages are turned off producing a positive signal on the REV 0 line and negative signals on REV 1, REV 2, REV 3, and REV 4 lines. Accordingly, the AND circuits 1412 and 1413 of the sequencer are conditioned while all the remaining AND circuits are deconditioned. At this point, the halftone number list is called for and the first quadrant halftone number is applied to AND circuit 1407 and a positive control signal pulse is applied to the load halftone number line to render the AND circuit 1407 effective to load the first quadrant halftone number into register 1409. The positive control pulse on the load halftone number line is inverted by inverter 1408 and applied to turn on the sequence flip flop 1411 which in being turned on renders the Q4 AND circuit 1412 effective to pass a signal via the Q4 OR circuit 1420 to condition the AND circuits 1426 of the Q4 pattern selector 1424A. At the same time the Q4 halftone number stored in the register 1409 is decoded by decoder 1410 to apply a positive signal to one of the 50 output lines of the decoder. The positive signal on the decoded output line is applied to an OR circuit 1425 of the Q4 pattern selector 1424A in accordance with the decoded halftone number value and via a corresponding conditioned AND circuit 1426 and OR circuit 1427 to condition one of fourteen groups of six AND circuits e.g. 1435 in decoder 1434. It should be noted that the halftone number list is provided in Q4, Q3, Q4, Q3 . . . , Q1, Q2, Q1, Q2 . . . , Q3, Q4, Q3, Q4 . . . . and Q2, Q1, Q2, Q1 sequence corresponding to each successive four scan lines. Accordingly, it will be apparent that during REV 0 as a set of halftone numbers is received, the sequence flip flop 1411 is switched on and off to permit AND circuits 1412 and 1413 to provide the alternate Q4 and Q3 sequence. In a similar manner, during REV 1, REV 2 and REV 3 as each set of halftone numbers is received, sequence flip flop 1411 is switched on and off to respectively control AND circuits 1414 and 1415 to provide the alternate Q1 and Q2 sequence, AND circuits 1416 and 1417 to provide the alternate Q3 and Q4 sequence and AND circuits 1418 and 1419 to provide the Q2 and Q1 sequence. As the quadrant of the halftone number is identified, it is used to select one of the four pattern selectors 1424 for operation in selecting a quadrant pattern from the read only storage (ROS) pattern table 1436.

Referring now to FIG. 12, it will be observed that the Q4 quadrant of the halftone cell has 13 different assigned values ranging from the value 3 to the value 49. It was previously indicated that for a different quadrant all bit positions in that quadrant having assigned values that are equal to or less than the halftone number value are designated as a 1 bit. Accordingly, if the halftone number value equals 1 or 2, the entire quadrant will consist of 0 bits; if the halftone number value equals 3, 4, 5 or 6 then the assigned value 3 position will contain a 1 bit and all other positions within the quadrant will contain 0 bits; if the halftone number value equals 7, 8, 9 or 10 then the assigned value 3 and 7 positions will contain 1 bits and all other positions within the quadrant will contain 0 bits, etc. Thus it should be apparent that there are 13 different possible Q4 plot patterns corresponding to the 13 different assigned values of the Q4 quadrant and one additional all 0 bit plot pattern corresponding to halftone numbers having values less than the lowest assigned value for the quadrant. Similarly, it should be apparent that there are 12 different possible Q3 plot patterns, 13 different possible Q2 plot patterns, and 12 different possible Q1 plot patterns corresponding to the different assigned values of the Q3, Q2 and Q1 quadrant plus one additional all 0 bit plot pattern for each of the Q3 and Q2 quadrants. Referring now to FIGS. 28A, 28B and 28C, it should be apparent that the sequencer will designate the quadrant of the halftone numbers being processed to select the appropriate pattern selector 1424 which, in response to the decoded halftone number, will be used to select an appropriate quadrant pattern from the ROS pattern table 1436.

At the same time that the quadrant pattern is being selected, the negative control pulse from the inverter 1408 is applied via the OR circuit 1429 to the ROS counter 1432. The ROS counter 1432 is initially reset such that stage 6 is set on while stages 0 to 5 are turned off. Accordingly, a positive signal from stage 6 together with a positive signal on the WR line renders the AND circuit 1430 effective to apply a conditioning signal via inverter 1431 to condition stage 0 of the ROS counter 1432. Therefore, the positive control signal from the OR circuit 1429 is effective to turn on stage 0 and to turn off stage 6 of the ROS counter. Stage 0 in being turned on applies a negative signal to the inverter 1433A where it is inverted to a positive signal and applied to the first AND circuit e.g. 1435A of the group of six conditioned AND circuits selected by the pattern selector. The first AND circuit is rendered effective to apply a signal to read out a line of binary pattern data from the ROS Table 1436 to the read out AND circuits 1448. Since a positive signal is presently maintained on the Q4 line and negative signals are maintained on the Q3, Q2 and Q1 lines from the sequencer, only AND circuits 1448A are effective to pass the first 5 bit byte of binary pattern data of the selected quadrant via the OR circuits 1449 and inverters 1495 to load the register 1496 in FIG. 28G with the first 5 bit byte of binary pattern data for the Q4 quadrant in accordance with the halftone number value being processed.

Referring now to FIGS. 28A, 28B and 28C, the negative control signal from the inverter 1408 is passed via the OR circuit 1441 and the inverter 1442A to turn on the buffer flip flop 1443 which is being turned on applies a negative signal via OR circuit 1444 to render a gated oscillator 1445 effective to produce a series of oscillator pulses which are applied to the buffer clock 1447. The buffer clock 1447 is a five stage ring counter which is initially reset such that stages 0 to 4 are turned off with the off sides of each stage being combined to condition stage 0 for operation. Accordingly, succeeding pulses from the oscillator 1445 are applied to step the clock 1447 from stage 0 through stage 4 producing successive T0, T1, T2, T3 and T4 positive pulses for each buffer cycle.

Buffer 1478 consists of 8 buffer storage units, each having 7755 addressable locations for storing 5 bit bytes. Buffer addressing is provided by an address counter 1462 shown in FIG. 28D which together with the decoder 1463 provides 7755 address drive lines for the buffer 1478. Referring now to FIGS. 28F and 28G, buffer unit selector 1479 is provided for uniquely selecting individual buffer units 1478A to 1478H during a buffer write operation and for simultaneously selecting all buffer units during a buffer read operation. During a buffer write operation, buffer unit selector 1479 is controlled in accordance with the states of the revolution counter 1472 and sequence counter 1477 shown in FIGS. 28E and 28F. The REV 0 and REV 1 output lines of the revolution counter 1472 are connected via inverters 1473A and 1474A, respectively, OR circuit 1475A, and REV 0/1 line to AND circuits 1480A, 1480C, 1480E and 1480G of the buffer unit selector 1479. The REV 2 and REV 3 output lines of revolution counter 1472 are connected via inverters 1473B and 1474B, respectively, OR circuit 1475B, and REV 2/3 line to AND circuits 1480B, 1480D, 1480F and 1480H of the buffer unit selector 1479. The SEQ 0, SEQ 1, SEQ 2 and SEQ 3 output lines of the sequence counter 1477 are connected to successive pairs of AND circuits 1480A and 1480B, 1480C and 1480D, 1480E and 1480F and 1480G and 1480H, respectively. With this arrangement it will be apparent that during a buffer write operation, AND circuit 1480A is rendered effective during revolution 0 and revolution 1 of sequence 0 to apply a signal via OR circuit 1483A and select buffer unit 1 line to uniquely select buffer unit 1478A for operation while all remaining buffer units remain unselected. During revolution 0, successive Q4 and Q3 pattern data is loaded into buffer storage unit 1478A while during revolution 1, successive Q1 and Q2 pattern data is loaded into buffer storage unit 1478A and meshed with previously loaded Q4 and Q3 pattern data. Similarly, AND circuit 1480B is rendered effective during revolution 2 and revolution 3 of sequence 0 to apply a signal via OR circuit 1483B and select buffer unit 2 line to uniquely select the buffer unit 1478D for operation. During revolution 2, successive Q3 and Q4 pattern data is loaded into buffer storage unit 1478B while during revolution 3 successive Q2 and Q1 pattern data is loaded into buffer storage unit 1478B and meshed with previously loaded Q3 and Q4 pattern data. In similar fashion, each succeeding buffer storage unit is selected in accordance with the states of the revolution counter 1472 and sequence counter 1477 to properly mesh the quadrant pattern data into the buffer 1478. During a buffer read operation, buffer unit selector 1479 is controlled in accordance with the states of the revolution counter 1472. The REV 0, REV 1, REV 2, REV 3 and REV 4 output lines of the revolution counter 1472 are connected via OR circuit 1481 to the AND circuit 1482. Accordingly, during a read operation AND circuit 1482 is effective to apply a signal via all of the OR circuits 1483 to simultaneously select all buffer units thereby permitting a full line of buffer pattern data to be read out of the buffer 1478. This will permit an 8 bit band of pattern plot data to be selected preparatory to performing a plot operation as will be described in greater detail hereafter.

Figure 28J:
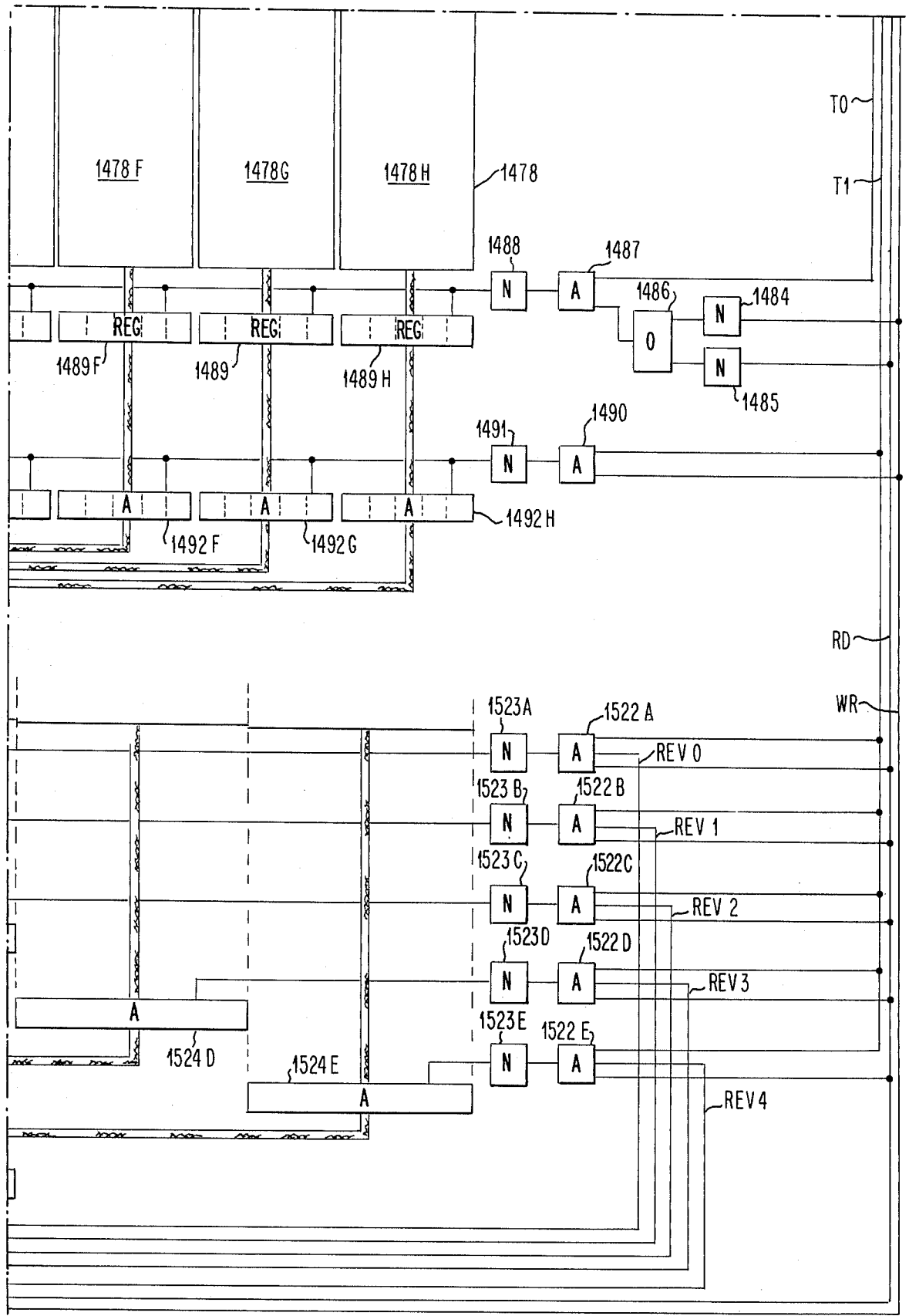

Associated with the buffer 1478 are a set of write input registers 1502, a set of output registers 1489, a set of write output AND circuits 1492 and associated OR circuits 1494 and a set of read output AND circuits 1524 and associated OR circuits 1526. A W/R latch 1531 is also provided which in its OFF state conditions the buffer 1478 for read out and in its ON state conditions the buffer 1478 for write in. At the start of write operation, the revolution counter 1472 is reset to state REV 0, the sequence counter 1477 is reset to state SEQ 0, the address counter 1462 is reset to address 0 and the W/R latch 1530 is reset applying a negative signal to condition all buffer units for read out. However, buffer unit selector 1479 under control of the REV 0 and SEQ 0 states of the revolution counter 1472 and sequence counter 1477, respectively, is effective to select buffer unit 1478A for operation. The reset state of the address counter 1462 is decoded by decoder 1463 to apply a signal to the address 0 drive line to cause a 5 bit byte of data, presently all zeros, to be read out of location 0 of the selected buffer unit 1478A. Referring now to FIGS. 28I and 28J, the positive signal on the WR line is inverted by inverter 1484 and passed via the OR circuit 1486 to condition the AND circuit 1487. At T0 time of the buffer clock cycle, the T0 clock pulse is passed via the now conditioned AND circuit 1487 and inverter 1488 to load the 5 bit byte of data read out from the addressed location of the selected buffer unit 1478A to the register 1489A. The positive signal on the WR line is also applied to condition the AND circuit 1490 such that at T1 time of the buffer clock cycle, the T1 clock pulse is passed via the conditioned AND circuit 1490 and inverter 1491 to the gates 1492. As a result, the 5 bit byte of data presently stored in register 1489A is gated via the AND circuits 1492A and the OR circuits 1492 and inverters 1497 in FIG. 28F and loaded into register 1498. The 5 bit byte of pattern data read out from the pattern table 1436 presently stored in register 1496 and the 5 bit byte of data, presently all zeros, read out from the selected buffer storage unit 1478A and presently stored in register 1498 are meshed by OR circuits 1499 to provide a 5 bit byte of meshed pattern data which is applied via inverters 1499A to the write input registers 1502. Referring now to FIG. 28G, the positive signal on the WR line is applied to condition the AND circuit 1500. At T2 time of the buffer clock cycle, the T2 clock pulse is passed via the now conditioned AND circuit 1500 and inverter 1501 to apply a gating signal to load the meshed pattern into the write input registers 1502. The positive signal on the WR line is also applied to condition the AND circuit 1528. At T3 time of the buffer clock cycle, the T3 clock pulse is passed via the now conditioned AND circuit 1528 to turn on the W/R latch 1531 which, in being turned on applies a positive write signal to the buffer units. Since only buffer unit 1478A has been selected for operation by the buffer unit selector 1479, the 5 bit byte of meshed pattern data in write input register 1502A is loaded back into location 0 of the buffer unit 1478A. The positive signal on the WR line is also applied to condition AND circuit 1530 so that at T4 time of the buffer clock cycle, and AND circuit 1530 is rendered effective to produce a negative pulse. The leading edge of this negative pulse is applied to reset the W/R latch 1531 in preparation for the next buffer cycle of operation.

Referring now to FIG. 28B, the AND circuit 1428 conditioned by the positive signal on the WR line is effective to pass the T4 clock pulse via the OR circuit 1429 to step the ROS counter 1432 so that stage 0 is turned off and stage 1 is turned on. Stage 1 of the ROS counter 1432 in being turned on applies a negative signal to OR circuit 1437 which, in turn, applies a positive signal to condition AND circuits 1438 and 1440. The oscillator 1445 is connected to a frequency divider 1446 which responds to the trailing edge of each oscillator pulse and produces one pulse for every five pulses produced by the oscillator 1445. The positive pulse from the frequency divider 1446 is produced at T4.5 time and is applied via the inverter 1442B to reset the buffer flip flop 1443 at T4.5 time. The positive pulse from the frequency divider 1446 is also applied to the now conditioned AND circuit 1438 which is rendered effective to apply a negative signal at T4.5 time to the inverter 1458 in FIG. 28D where it is inverted to a positive signal and applied to the AND circuit 1459. The AND circuit 1459 conditioned by a positive signal on the WR line 1401 passes a negative signal to the OR circuit 1460 which in turn applies a positive signal to the inverter 1461 where it is inverted to a negative signal to step the address counter 1462 to address 1. Decoder 1463 decodes the address and applies a drive signal on the address 1 drive line to cause the next line of data to be read out of the buffer 1478 starting at T4.5 time. Referring back to FIG. 28B, the trailing edge of the positive pulse from the frequency divider 1446, which occurs at the end of T4 time, is applied to reset stage 4 of the buffer clock 1447. Stage 4 of the buffer clock 1447 in being reset terminates the T4 clock pulse and the negative transition of the trailing edge of the T4 clock pulse is applied to the inverter 1439 where it is inverted to a positive transition and applied to render the AND circuit 1440, conditioned by the positive signal from the OR circuit 1437, effective to apply a negative transition to the OR circuit 1441. The OR circuit 1441, in turn, applies a positive transition signal to the inverter 1442A which inverts it a negative transition signal to turn on the buffer flip flop 1443. The buffer flip flop 1443 in being turned on applies a negative signal to OR circuit 1444 which, in turn, applies a positive signal to condition the oscillator 1445 to produce another series of oscillator pulses for stepping the buffer clock 1447.

It will be noted that there are six 5-bit bytes of pattern data per quadrant stored in the pattern table 1436. Accordingly, the ROS counter 1432 must be stepped six times to read out each of the six 5-bit bytes of quadrant pattern data and, likewise, the buffer clock 1447 must also be cycled six times to permit the six 5-bit bytes of quadrant pattern data read out of the pattern table 1436 to be meshed with six 5-bit bytes of data addressed in the selected buffer unit and reloaded back into the same six address locations. Accordingly, during each of the five succeeding buffer cycles of operation, the following sequence occurs: At T0 time, the 5-bit byte from the next addressed locaton is read out of the selected buffer unit and loaded into register 1489; at T1 time, the 5 bit byte of data is gated from register 1489 and loaded into register 1498; at T2 time, a 5 bit byte of data representing a meshed combination of the content of registers 1498 storing 5 bit byte of data read out of the address location of the selected buffer unit and the contents of register 1496 presently storing a 5 bit byte of pattern data previously read out of the pattern table 1436 is loaded into register 1502; at T3 time, the W/R latch 1531 is set to the write state and the 5 bit byte of meshed pattern data is loaded back into the addressed location of the selected buffer unit; at T4 time, the leading edge of the T4 pulse is applied to reset the W/R latch 1531 to the read status and to step the ROS counter 1432 so that via decoder 1434 the next 5 bit byte of quadrant pattern data is read out of the pattern table 1436 and loaded into register 1496; at T4.5 time, the leading edge of the pulse from the frequency divider 1446 is effective to reset the buffer flip flop 1443 and via the AND circuit 1438 produce a signal to step the address counter 1462 to the next address location; at the end of the T4 time, the trailing edge of the pulse from the frequency divider 1446 is applied to reset stage 4 of the buffer clock 1447 and the trailing edge of the T4 pulse is effective via AND circuit 1440 to set the buffer flip flop 1443 to initiate the next cycle of operation of the buffer clock 1447. The sixth cycle is the same as that described above for the preceding five cycles except that at T4 time when the ROS counter 1432 is stepped from stage 5 to stage 6 the OR circuit 1437 will now apply a negative signal to decondition the AND circuits 1438 and 1440. As a consequence, the AND circuit 1438 is blocked from producing a signal to step the address counter 1462 at T4.5 time. Since the address counter 1462 is not stepped at the end of the sixth cycle of the buffer, it will be apparent that the first 5 bit byte of the next six 5-bit bytes of quadrant pattern data from the pattern table 1436 will be meshed with the last 5 bit byte of the previous six 5-bit bytes of quadrant pattern data. This overlap of pattern data is necessary in order to properly mesh the successive qaudrant data patterns as can be seen in the illustration shown in FIG. 28F. Additionally, referring to FIG. 28G, at T4 time during every cycle the negative pulse from the AND circuit 1530 is applied to the frequency divider 1503 in FIG. 28D. This frequency divider 1503 produces one output pulse for every six input pulses applied thereto. Accordingly, during this sixth cycle when the sixth pulse from the AND circuit 1530 is applied to the frequency divider 1503, a positive output pulse is produced by frequency divider 1503 which is inverted to a negative pulse and applied to decrement the halftone counter 1405 indicating that one halftone number has been processed. Referring back to FIG. 28B, during the sixth cycle since the AND circuit 1440 is deconditioned at the beginning of T4 time due to the negative output of the OR circuit 1437 when the ROS counter 1432 stepped to stage 6, the trailing edge of the T4 pulse is ineffective to render the AND circuit 1440 effective to set the buffer flip flop 1443. As a consequence, the oscillator 1445 is deconditioned to inhibit further production of oscillator pulses to cycle the buffer clock 1447.

The next halftone number representing a Q3 quadrant value is next applied and upon application of a load halftone number control signal the process previously described above is repeated to permit the proper quadrant pattern data to be loaded into the buffer 1478A after which the halftone counter 1405 is again decremented by 1. The pattern data for the halftone number sequence of Q4, Q3, Q4, Q3 . . . , is successively loaded into the selected buffer unit 1478A until such time as the halftone counter 1405 is decremented to 0. Referring now to FIG. 28D, the decoder 1406 decodes that the halftone counter is at 0 and applies a positive signal to the AND circuit 1465 in FIG. 28E. A second input of the AND circuit 1465 is connected to the WR line which has a positive signal maintained thereon to thereby condition the AND circuit 1465. At the occurance of the next positive pulse from the frequency divider 1446 in FIG. 28C, the AND circuit 1465 is rendered effective to apply a negative pulse to the END W REV line. The negative pulse on this line is applied to the OR circuit 1466 which in turn applies a positive pulse to the inverter 1467 where it is inverted to a negative pulse to step the revolution counter 1472 from stage 0 to stage 1. Stage 1 of the revolution counter 1472 in being turned on applies a positive signal on the REV1 line to condition the sequencer in FIG. 28A to switch between quadrants Q1 and Q2 during revolution 1. The positive signal on the REV1 line is also applied to the inverter 1474A where it is inverted to a negative signal and applied to the OR circuit 1475A to maintain a positive signal on the REV0/1 line which is applied to the buffer unit selector 1479 in FIGS. 28F and 28G. This will maintain the buffer 1478A as the selected buffer unit for this revolution thereby permitting the Q1 and Q2 pattern data to be meshed in with the previously loaded Q4 and Q3 pattern data in buffer unit 1478A. The negative pulse on the END W REV line is also applied to OR circuits 1402 and 1507 in FIG. 28D. OR circuit 1402 in response thereto applies a positive signal to reload the preset value in register 1403 into the halftone counter 1405 while OR circuit 1507 in response thereto applies a positive pulse to inverter 1533 where it is inverted to a negative pulse to reset the address counter 1462 in preparation for the next revolution.

During revolution 1 the Q1 and Q2 halftone number sequence is applied to the processor which operates in the same manner as previously described to extract the proper pattern data for each received quadrant halftone number value, format it with adjacent Q4 and Q3 pattern data previously loaded in the buffer during revolution 0 to provide a meshed data configuration in the selected buffer unit 1478A. At the end of revolution 1 when the halftone counter 1405 is stepped to a count of 0 the revolution counter is again stepped from stage 1 to stage 2. Stage 2 of the revolution counter 1472 in being turned on applies a positive signal on the REV2 line to condition the sequencer in FIG. 28A to sequence between quadrants 3 and 4 during revolution 2. Additionally, the positive signal on the REV2 line is applied to the inverter 1473B where it is inverted to a negative signal and applied to the OR circuit 1475B which, in turn, applies a positive signal to the buffer unit selector 1479 causing the buffer unit 1478B to be the selected buffer unit during this revolution. Accordingly, during revolution 2, the processor receives the Q3 and Q4 halftone numbers from the halftone number list, extracts the proper pattern data for each received quadrant halftone number value and loads it into the now selected buffer unit 1478B. At the end of revolution 2, when the halftone count equals 0, a negative pulse on the END W REV line is again applied to step the revolution counter 1472 from stage 2 to stage 3, reset the address counter 1462 and reload the halftone counter 1405. Stage 3 of the revolution counter 1472 in being turned on applies a positive signal via the REV3 line sequencer in FIG. 28A to switch between quadrants Q2 and Q1 during revolution 3 and also to maintain a positive signal on the REV2/3 line to control the buffer unit selector 1479 to maintain buffer unit 1478B as the selected buffer unit. Accordingly, during revolution 3, the processor logic receives the Q2 and Q1 halftone numbers from the halftone number list, extracts the proper pattern data from the pattern table 1436 and formats it with adjacent Q3 and Q4 pattern data loaded in buffer 1478B during revolution 2 to provide a meshed data configuration in buffer storage unit 1478B. Referring now to FIG. 28E, the positive signal on the REV3 line is also applied to render the AND circuit 1469, conditioned by the positive signal on the WR line, effective to apply a negative signal to OR circuit 1471 which in turn applies a positive conditioning signal to stage 0 of the revolution counter 1472 in preparation for stepping the counter from stage 3 back to stage 0. At the end of revolution 3, the negative pulse on the END W REV line is applied to step the revolution counter from stage 3 back to stage 0. As a result, the negative trailing edge of the positive signal on the REV3 line is applied to decondition AND circuit 1450, previously conditioned by positive signals on the WR and REV3 lines. The AND circuit 1450 in being deconditioned is effective to apply a positive signal to the inverter 1451 in FIG. 28F where it is inverted to a negative signal and applied to step sequence counter 1477 from stage 0 to stage 1. Thus, it will be apparent that the sequence counter 1477 is stepped once for each cycle of the revolution counter 1472 and during each sequence, the next set of Q4, Q3 . . . Q1, Q2 . . . Q3, Q4 . . . Q2, Q1 halftone data is received, the proper pattern data extracted from the pattern table and loaded into the succeeding buffer units selected in accordance with the states of the revolution counter 1472 and the sequence counter 1477.

Referring now to FIG. 28E, during REV3 of SEQ3, positive signals on the WR, REV3 and SEQ3 lines are applied to condition AND circuit 1509. At the end of REV3 of SEQ3, the negative pulse on the END W REV line is supplied to inverter 1508 where it is inverted to a positive pulse to render AND circuit 1509 effective to produce a negative signal on the WR END line. The negative signal on the WR END line is applied to reset the write flip flop 1401 and to signal the end of the write operation.

Read Operation

Figure 31:
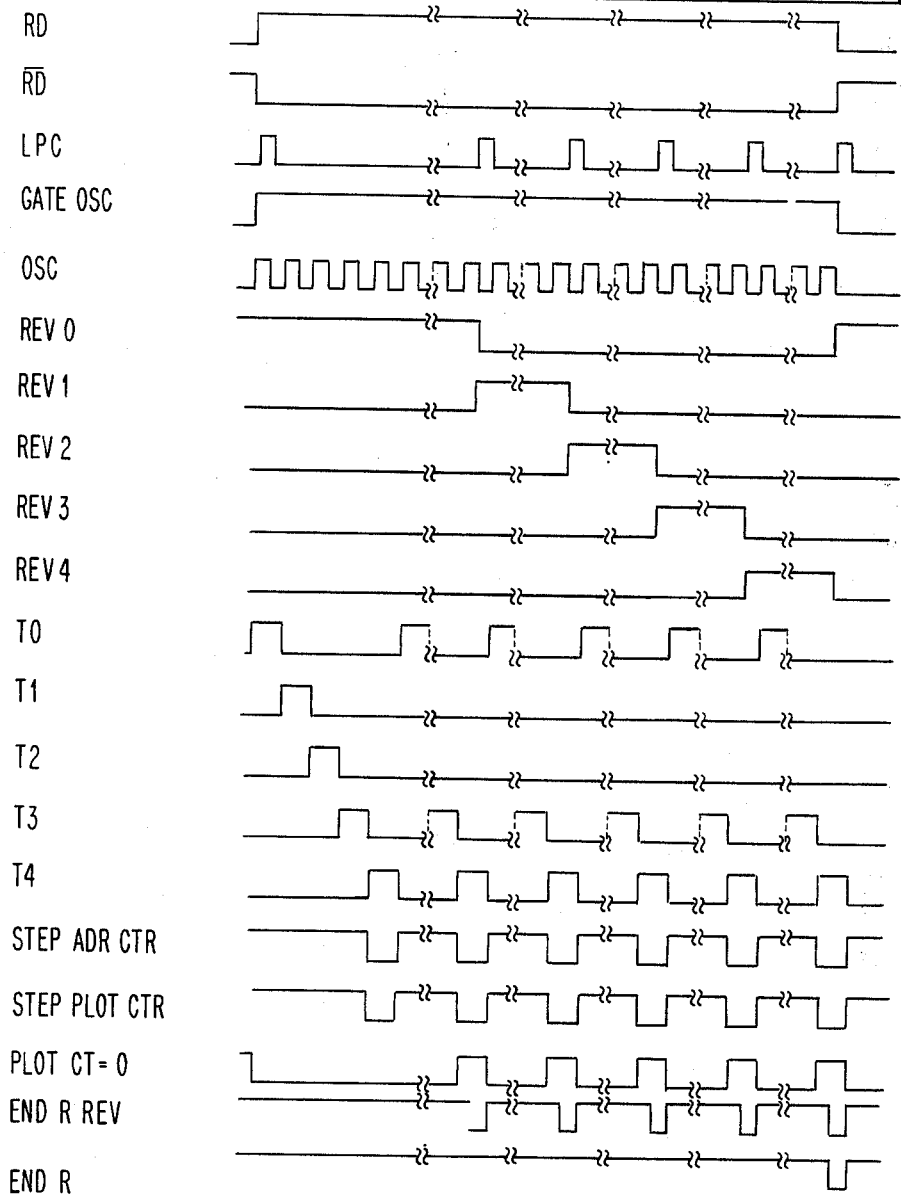
FIG. 31 comprises a timing diagram of a cycle of operation of the data processing apparatus for a read operation.

At the start of the read operation, a system reset is applied to reset all counters and registers in preparation for the read operation. The read operation can be followed in conjunction with the timing diagram in FIG. 31. Referring now to FIG. 28D, a read pulse is applied to turn on read flip flop 1510 producing a positive signal on the RD line and a negative signal on the $\overline{RD}$ line indicating a read operation is to be preformed. Following this, a control signal is applied to the load plot counter line and via OR circuit 1511 renders the AND circuit 1513 effective to pass a preset value in register 1403 to the plot counter 1514, the value in the register 1512 corresponding to the number of lines of pattern data stored in the buffer 1478 during the write operation. The negative signal on the $\overline{RD}$ line is applied to the OR circuit 1444 in FIG. 28B which, in turn, applies a positive signal to gate on the oscillator 1445 in FIG. 28C to produce a train of oscillator pulses to cycle the buffer clock 1447 so long as the read flip flop 1510 is maintained on. The revolution counter 1472 in FIG. 28E in being reset maintains stage 0 on and stages 1 to 4 off. Stage 0 in being turned on applies a negative signal via the $\overline{REV\ 0}$ line to the OR circuit 1481 in FIG. 28F which, in turn, applies a positive conditioning signal to the AND circuit 1482. Accordingly, the positive signal on the RD line is applied to render the AND circuit 1482 effective to apply a negative signal to the OR circuits 1483 which, in turn, apply positive signals to simultaneously select all buffer units for operation. Additionally, the W/R latch 1531 is in a reset condition and, accordingly, applies a signal to maintain all selected buffer units conditioned for a read out operation. Also, the decoder 1463 in FIG. 28D decodes the reset condition of the address counter and produces a drive signal on the address zero line to address the zero location of all the storage buffer units.

Referring now to FIGS. 28I and 28J, the positive signal on the RD line is applied to the inverter 1485 where it is inverted to a negative signal and applied to the OR circuit 1486 which, in turn, applies a positive signal to condition the AND circuit 1487. At T0 time, the T0 clock pulse renders the AND circuit 1487 effective to apply a negative signal to the inverter 1488 which in turn applies a positive gating signal to load the registers 1489 with the first line of pattern data read out of location zero of the buffer 1487. At T1 time, the T1 clock pulse has no effect at the AND circuit 1490 inasmuch as it is deconditioned by a negative signal on the WR line. The positive signal on the RD line is applied to one input of the AND circuits 1522. Since stage 0 of the revolution counter 1472 is on and all the remaining stages are off, a positive signal is applied via the REV0 line to condition AND circuit 1522A while negative signals on the REV1 to REV4 lines are applied to decondition the AND circuits 1522B to 1522E. Accordingly, at T1 time, the T1 clock pulse is applied to render the AND circuit 1522A effective to apply a negative pulse to the inverter 1523A where it is inverted to a positive pulse and applied to AND circuits 1524A to gate an 8 bit wide band of pattern data which includes the 5 bits stored in register 1489A and the 3 leftmost bits stored in register 1489B via the OR circuits 1526 to main storage where it will be stored at a designated location in preparation for writing the plot pattern data to the scanner/plotter control unit. Referring now to FIG. 28G, the T2, T3 and T4 clock pulse are ineffective at the buffer 1478 inasmuch as the AND circuits 1500, 1528 and 1530 are deconditioned at this time by a negative signal on the WR line. Referring now to FIG. 28D, the positive signal on the RD line is applied to condition the AND circuit 1517 so that at T4 time, the T4 clock pulse renders the AND circuit 1517 effective to apply a negative signal to decrement the plot counter 1514 by a count of one. The negative signal from the AND circuit 1517 is also applied to the OR circuit 1460 which, in turn, applies a positive signal to the inverter 1461 where it is inverted to a negative signal to step the address counter 1462 to address 1. In a similar fashion, succeeding 8 bit bytes of pattern data are read out of buffer units 1478A and 1478B and transferred to main storage as an 8 bit byte wide band of record data.

Referring now to FIGS. 28D and 28E, at T4 of the cycle in which the plot counter 1514 is stepped to zero, AND circuit 1517 is rendered effective by a T4 clock pulse to apply a negative signal to step the plot counter 1514 to a count of zero and is also applied to inverter 1518 where it is inverted to a positive signal and applied to one input of AND circuit 1532. The positive signal on the RD line is applied to a second input of the AND circuit 1532. Decoder 1515 decodes the plot count equal to zero and applies a positive signal to a third input of the AND circuit 1532 thereby conditioning the AND circuit 1532. At T4.5 time the oscillator 1445 in FIG. 28C applies a negative pulse to the inverter 1519 in FIG. 28E where it is inverted to a positive signal to render the AND circuit 1532 effective to produce a negative pulse on the END R REV line which is applied to OR circuits 1507 and 1511. Or circuit 1507 in response thereto applies a positive pulse to inverter 1533 where it is inverted to a negative reset pulse to reset the address counter 1462 in preparation for the next revolution while OR circuit 1511 applies a positive signal to AND circuit 1513 to permit the contents of the register 1512 to be reloaded in the plot counter 1514 for the next revolution operation. The negative pulse on the END R REV line is also applied to the OR circuit 1466 which, in turn, applies a positive pulse to the inverter 1467 where it is inverted to a negative pulse to step the revolution counter 1472 from stage 0 to stage 1. During REV1 and each of the succeeding revolutions REV2, REV3 and REV4, the processor logic operates in the same manner as that described above for REV0 except that AND circuits 1524B, 1524C, 1524D and 1524E are rendered effective during each succeeding revolution to read out the next band of 8 bit bytes of pattern record data to main storage. It should be noted that the feedback path from stage 3 of the revolution counter 1472 to stage 0 is blocked during a read operation by the negative signal maintained on the WR line input to the AND circuit 1469. Also, it should be noted that the positive signal on the RD line is applied to condition the coupling between stage 3 and stage 4 so that at the end of REV3 when a stepping pulse is applied to the revolution counter 1472, it is stepped from stage 3 to stage 4. Stage 4 in being turned on applies a positive signal on the REV4 line which in combination with the positive signal on the RD line renders AND circuit 1470 effective to apply a negative signal to OR circuit 1471 which, in turn, applies a positive conditioning signal to stage 0 of the revolution counter 1472. Accordingly, upon the occurrence of the negative pulse on the END R REV line at the end of REV4, the revolution counter 1472 will be stepped from stage 4 back to stage 0.

Referring now to FIG. 28E, during the cycle in which the plot counter 1514 is stepped to zero in REV4, positive signals are applied on the RD and REV4 lines to condition the AND circuit 1521. Accordingly, at T4.5 time of the cycle, the negative pulse on the END R REV line is applied to inverter 1520 where it is inverted to a positive signal to render the AND circuit 1521 effective to apply a negative pulse on the RD END line. The negative pulse on the RD END line is applied in FIG. 28D to reset the read flip flop 1510 and signal the end of the read operation. The read flip flop 1510 in being reset applies a positive signal on the $\overline{RD}$ line to the OR circuit 1444 in FIG. 28B which, in turn, applies a negative signal to decondition oscillator 1445 to inhibit further production of oscillator pulses. At this point, the buffer 1478 has been completed unloaded and another write operation may be initiated whereby halftone number values from the halftone number list may be applied to the processor to permit the next set of pattern data to be loaded into the buffer 1478. In this fashion the buffer 1478 may be alternately loaded and unloaded with a succession of write and read operations.

Detailed Description of Plot Operation

Initial Set Up Operation

Referring to FIG. 1, the film or photosensitive material is mounted on the drum 2 and by a combination of the operation of the single/continuous and right/left switches at the operator panel, the head assembly is moved into position adjacent an edge of the document to be plotted. At the operator panel, by operation of a combination of the mirror/normal and positive/negative switches, the operator has the option of plotting normal-positive, normal-negative, mirror-positive or mirror-negative as shown in FIG. 16.

Referring now to FIG. 23D the M/N switch applies a positive or ground signal via the MIRROR/NORMAL line to the inverter 1146 and AND circuit 1148 in the Buffer and Bus Control 1100 in FIG. 23C. If the M/N switch is set to the NORM point in FIG. 23D, a ground signal is applied to inverter 1146 where it is inverted to a positive signal to condition the AND circuits 1150 to pass data in normal form from the data register 1144 to the OR circuits 1156. On the other hand if the M/N switch is positioned to the MIRROR point, a positive signal is applied to render the AND circuits 1148 effective to pass the plot data in permuted form from the data register 1144 and the P BOX 1152 to the OR circuits 1156.

The P/N switch when positioned to the NEG point applies a negative signal to set the true complement circuit 202 in the complement condition so that plot data, whether in mirror or normal form, received on the S/P IN BUS is passed in complement form to the AND circuits 204. On the other hand, if the P/N switch is positioned to the POS point, then a positive signal is applied to set the true complement circuit 202 to the true condition and thereby pass plot data, whether in mirror or normal form, as received to the AND circuits 204.

At the head assembly, the scan/plot lever 44 is moved to the plot position and the mode switch 20 in FIG. 23A is switched to the plot position to apply a ground signal via the PLOT SW line to the inverter 403 in FIG. 23D where it is inverted to a positive signal to condition the PLOT flip flop 404 for being turned on and condition the AND circuit 814 in FIG. 23K for setting a fixed value in the Y counter 820 as will be described hereafter. The ground signal on the PLOT SW line is also applied to the inverter 916 in FIG. 23M where it is inverted to a positive signal to condition the AND circuits 921 and 923 in preparation for the plot operation. Further, the ground signal on the PLOT SW line is applied to the motor control for signaling the motor to operate at the slower speed. The operator then presses the START DRUM push button in FIG. 23A to produce a start drum signal, in a manner as previously described in connection with the scan operation, to initiate movement of the drum motor. When the drum reaches the operating speed for the plot operaton, a signal is applied via the drum up to speed line to condition the AND circuit 320. When the index point is reached i.e. the index pulse is detected, the index pulse renders the AND circuit 320 effective to apply a negative pulse to turn on the DRUM RDY flip flop 322 to produce a positive signal on the DRUM RDY line which is applied via FIGS. 23E and 23D and the common control bus to common control 1000 which in turn transmits a ready device end signal to the data processor to initiate the sequence of commands for the plot operation.

Control Set Up Command Operation

The data processor first issues a control setup command to the scanner/plotter control unit followed by the series of control bytes as shown in FIG. 17, the 3rd and 4th bytes in this case containing the plot count and the 5th byte identifying whether the plot data is being plotted on film or paper. The execution of the control setup command is identical to that previously described in connection with the scan operation except as indicated above in so far as the meaning of the 3rd and 4th control bytes and the use made of the 5th control byte. Accordingly, referring to FIG. 23D, when the 5th control byte is received, the AND circuit 602 is rendered effective to apply a negative pulse via the BIT 3 line to turn on or not the PAPER flip flop 920. If bit 3 of the control byte is a 0 bit it indicates a film is to be processed and, accordingly, the PAPER flip flop 920 is not turned on. Therefore, a positive signal is applied from the lower output of the PAPER flip flop 920 to render the AND circuit 923 effective to apply a negative signal to condition the single shot 924. On the other hand, if the bit 3 is a 1 bit then the PAPER flip flop 920 is turned on and a positive signal is applied to render the AND circuit 921 effective to apply a negative condition signal to the single shot 922. At the completion of the execution of the control setup command, common control 1000 transmits a channel end and device end signal to the data processor to indicate the completion of the execution of the command.

Write Command Operation

The data processor next issues a write command, as shown in FIG. 22, followed by a record block of halftone plot data to common control 1000 of the scanner/plotter control unit. common control 1000 decodes the command and applies a positive signal on the W CMD line to the Buffer and Bus control 1100 in FIG. 23B. The positive signal on the W CMD line is applied to condition the AND circuits 1142 for passing halftone plot data via the in bus to the data register 1144 and to the inverter 1138 where it is inverted to a negative signal to decondition the AND circuits 1140. Common control 1000 then issues a negative pulse on the RES BAR line to reset the BAR CTR 1132 and then a series of negative pulses on the WR line to the Buffer and Bus Control 1100 each of which initiates a cycle of operation to load a byte of halftone plot data via the IN BUS, data register 1144 and DATA IN BUS to the Buffer 1200. Thus, each negative pulse on the WR line is applied to the OR circuit 1104 which in turn initiates a cycle of operation of the Buffer and Bus Control 1100 in a similar manner to that described for the write buffer operation during the Load Scan Buffer Command operation when scan data was being loaded into the buffer except that in this case it is the halftone plot data that is passed to the Buffer 1200 rather than scan data. After Buffer 1200 is loaded with the record block of halftone plot data and the BAR CTR 1132 reaches the maximum count, decoder 1134 decodes this condition and applies a positive signal via the BFR END line to signal common control 1000 that the buffer write operation has been completed. Common control 1000 then transmits a channel end signal to the data processor to indicate that the first band or record block of halftone plot data has been loaded in the Buffer 1200. Common control 1000 then issues a positive pulse via the common control bus to the START S/P line in FIG. 23D. The operation of the scanner/plotter control unit can now be followed in conjunction with the timing diagram shown in FIG. 33, which illustrates a representative example of the plot operation where the reproduction parameters have the following values; skip=2 and byte count=3. The positive control pulse on the START S/P control line is applied to the plot flip flop 404 which was previously conditioned when the mode switch 20 in FIG. 23A was positioned for the plot mode operation. Accordingly, the plot flip flop 404 is turned on to apply a positive signal to the plot mode line and a negative signal to the not plot mode line. The positive signal on the plot mode line is applied to condition the AND circuit 304 in FIG. 23A in preparation for receiving the index pulse while the negative signal on the not Plot mode line is applied to the OR circuit 418 which in turn applies a positive signal via the ANY OP line to condition the END S/P single shot 422. The Index flip flop 310 in being initially in a reset state applies a positive signal on the not index line in FIG. 23D to render the AND circuits 511 effective to pass the X skip value in register 510 via the OR circuits 518 to the inputs of the Skip counter 522. Accordingly, the positive pulse on the start S/P control line is applied to the inverter 515 where it is inverted to a negative pulse and applied to the OR circuit 516 which, applies a positive load signal to the Skip counter 522 to effectively load the X Skip value from the skip register 510 into the Skip counter 522. As a result of loading the X skip value in the Skip counter 522, decoder 526 in FIG. 23E decodes the fact that a 0 value is no longer contained in the skip counter and a negative signal is applied and maintained on the SKIP CTR=0 line until the X skip value is decremented to 0.

Referring again to FIG. 23D, the positive pulse on the start S/P line is applied as a load signal to load the plot count in the S/P byte count register 512 into the S/P byte counter 524. Decoder 528 in FIG. 23E decodes the fact that a 0 value is no longer stored in the byte counter and, therefore, applies and maintains a negative signal on the BYTE CNT=0 line until such time as the plot count is decremented to 0.

A positive pulse is produced on the Index Pulse line and applied to the AND circuit 304 which is now conditioned by a positive signal on the plot mode line and is rendered effective to apply a negative pulse to the OR circuit 306 which in turn applies a positive pulse to the inverter 308 where it is inverted to a negative pulse to turn on the Index flip flop 310. The Index flip flop 310 in being turned on applies a positive signal which in combination with the positive index pulse renders the AND circuit 311 effective to apply a negative pulse to the inverter 313 where it is inverted to a positive pulse on the gated index pulse line. Following this, the first drum line is sensed and a positive pulse is produced on the drum pulse line and applied to the AND circuit 312 which is conditioned by a positive signal from the Index flip flop 310. The AND circuit 312 is rendered effective to apply a negative pulse to the inverter 326 where it is inverted to a positive pulse on the gated drum pulses line to the AND circuit 514 in FIG. 23D, which is conditioned by a positive signal on the not SKIP CTR=0 FF line since the SKIP CTR=0 flip flop 532 is initially in a reset condition. Accordingly, the AND circuit 514 is rendered effective to apply a negative pulse via the step line to decrement the X skip value in the Skip counter 522. In a similar fashion, each succeeding gated drum pulse is applied to decrement the X skip value by 1 until such time as the X skip value reaches the count of 0. At that time, decoder 526 in FIG. 23E decodes this condition and applies a positive signal via the SKIP CTR=0 to the AND circuit 904 in FIG. 23M, which is conditioned by positive signals on the PLOT MODE and not SKIP CTR=0 FF lines. Accordingly, the AND circuit 904 is rendered effective to produce a negative transition signal. Referring again to FIG. 23E, the positive signal on the SKIP CTR=0 line in combination with the gated drum pulse that caused the Skip counter 522 to step the X skip value to a count of 0 renders the AND circuit 530 effective to apply a negative pulse to the OR circuit 531 which, in turn, applies a positive pulse to the SKIP CTR=0 flip flop 532. The negative trailing edge of the positive pulse is effective to turn on the SKIP CTR=0 flip flop 532 which, in being turned on applies a positive signal to the SKIP CTR=0 FF line and a negative signal to the not SKIP CTR=0 FF line. The negative signal on the not SKIP CTR=0 FF line is applied to decondition the AND circuit 904 and produce a positive transition signal. It should be apparent that the AND circuit 904 produces a negative pulse from the time that a positive pulse is applied to the SKIP CTR=0 line to the time that a negative signal is applied to the SKIP CTR=0 FF line. The negative pulse from the AND circuit 904 is applied to the OR circuit 907 which, in turn, applies a positive pulse to the WR flip flop 910 which is conditioned for being turned on by the positive signal on the PLOT MODE line. Accordingly, the positive pulse from the OR circuit 907 is effective to turn on the WR flip flop which, in being turned on, applies a positive signal to the WR line and a negative signal to the not WR line. The positive pulse from the OR circuit 907 is also applied to the inverter 914 where it is inverted to a negative pulse and applied via the DATA FETCH line to the OR circuit 1104 in FIG. 23B to initiate a cycle of operation of the Buffer and Bus Control 1100 similar to that described for the read buffer command operation when scan data was being read out of the buffer and transmitted to the data processor except that in this case it is the halftone plot data that is read out of the Buffer 1200 and transmitted to the scanner/plotter control unit rather than scanned data. The halftone plot data byte read out of the Buffer 1200 and loaded into the data register 1144 is passed via a normal path including AND circuits 1150 or a mirror path consisting of AND circuits 1148 and permutation box 1152, depending on the setting of the M/N switch in FIG. 23D, and the OR circuits 1156 to the AND circuits 1158. The positive signal on the PLOT MODE line renders the AND circuits 1158 effective to pass the halftone plot data byte via the OR circuits 1164 and the S/P in bus to the true complement circuit 202 in FIG. 23D. Depending upon the document to be plotted upon, the true complement circuit 202 is set to a true or complement condition to pass the halftone plot data byte, whether in normal or mirror form, to the AND circuit 204 in true or complement form.

Figure 23M:
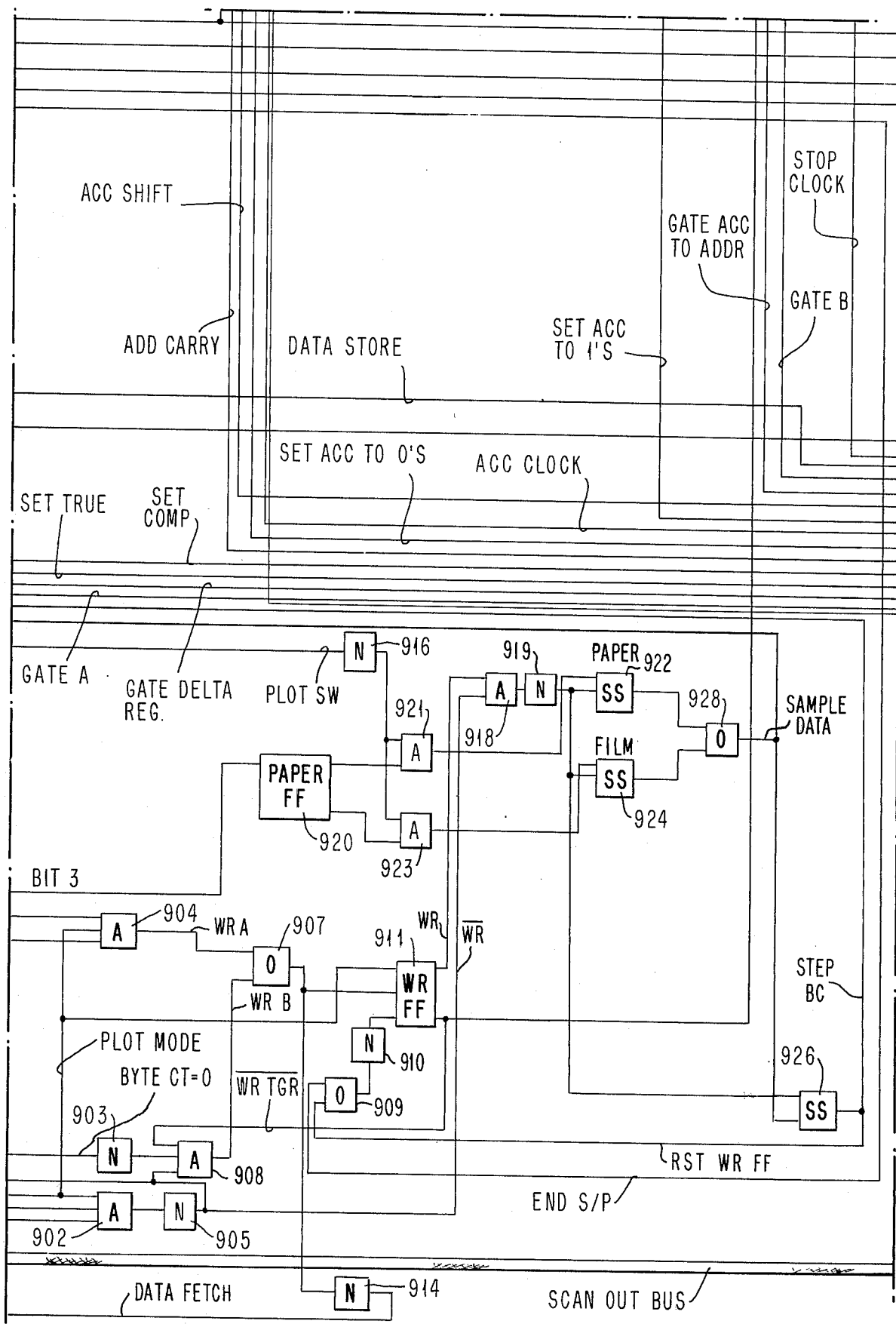
Figure 23N:
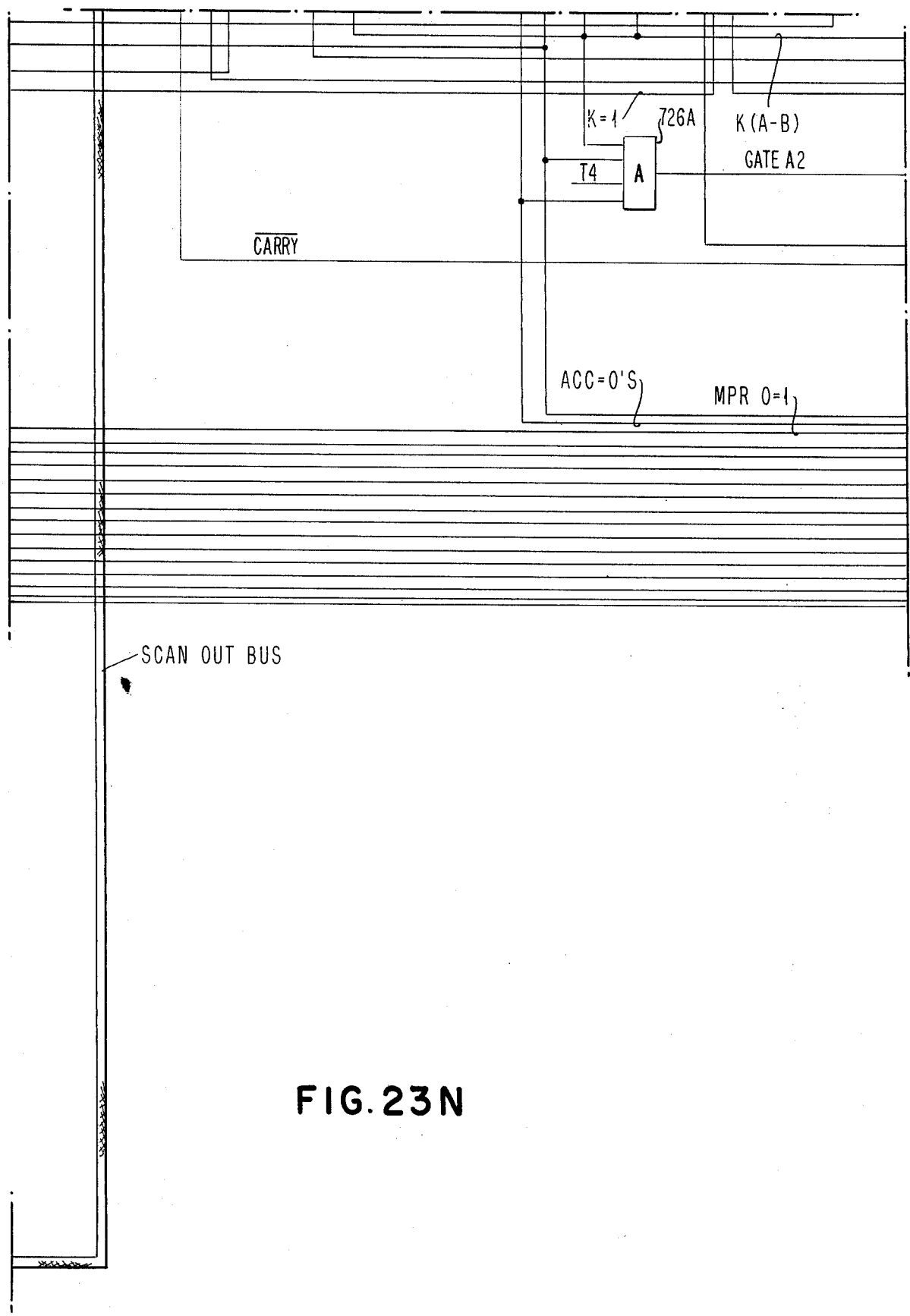

Referring now to FIG. 23M, positive signals on the PLOT MODE and SKIP CTR=0 FF lines are applied to condition the AND circuit 902 so that upon the next occurring gated drum pulse, after that which caused the X skip value to decrement to a value of 0, is applied to render the AND circuit 902 effective to apply a negative pulse to the inverter 905 where it is inverted to a positive pulse and applied to the AND circuits 908 and 918. The positive pulse is ineffective at the AND circuit 908 inasmuch as it is deconditioned by the negative signal on the not WR line. However, the positive pulse is effective at the AND circuit 918, which is conditioned by the positive signal on the WR line, to render the AND circuit effective to apply a negative pulse to inverter 919 where it is inverted to a positive pulse which is applied to condition single shot 926 and the positive leading edge of which is effective to fire one of the single shots 922 or 924, depending upon the state of the PAPER flip flop 920. The negative pulse from the single shots 922 or 924 is applied to the OR circuit 928 which in turn applies a positive pulse to the SAMPLE DATA line, the period of the pulse being longer if the FILM single shot 924 is fired then if the PAPER single shot 922 is fired. Referring now to FIG. 23D, the positive pulse on the SAMPLE DATA line is applied to render the AND circuit 204 effective to pass the halftone plot data byte via the PLOT DATA BUS to the LED DRIVER CIRCUITS 206 in FIG. 23A. The LED DRIVER CIRCUITS 206 control the light emitting diodes 60 to be turned on or not in accordance with the bits of the halftone plot data byte to pass light via the fiber optics 62 for the sample data period and via the mirror 40 and lens 32 to plot the halftone data byte on the document. Referring back to FIG. 23M, if the positive pulse on the SAMPLE DATA line results from the shorter period PAPER single shot 922 having been fired then the negative trailing edge of this positive pulse is effective to fire the single shot 926 whereas if the positive pulse on the SAMPLE DATA line results from the longer period FILM single shot 924 having been fired then the negative trailing edge of the positive pulse from the inverter 919 is effective to fire the single shot 924. The single shot 924 in being fired applies a negative pulse to the RST WR FF/STEP BC lines. The negative pulse on the RESET WR FF line is applied to the OR circuit 909 which, in turn, applies a positive pulse to the inverter 910 where it is inverted to a negative pulse to turn off the WR flip flop 911 which, in being turned off, applies a negative signal to the WR line and a positive signal to the not WR line. The negative pulse from the single shot 926 is also applied via the STEP BC line to step the S/P byte counter 524 in FIG. 23B to decrement the plot count by 1. If the plot count is not at a value of 0, a negative signal is maintained on the BYTE CNT=0 line which is applied to the inverter 903 in FIG. 23M where it is inverted to a positive signal which in combination with the positive signal on the not WR line condition the AND circuit 908. Accordingly, the next gated drum pulse, effective via the AND circuit 902 and inverter 905, renders the AND circuit 908 effective to apply a negative pulse to the OR circuit 907 which, in turn, applies a positive pulse to again turn on the WR flip flop 911 which, in being turned on, again applies a positive signal on the WR line to condition the AND circuit 918 and a negative signal on the not WR line to decondition the AND circuit 908. The positive pulse from the OR circuit 907 is also applied to the inverter 914 where it is inverted to a negative pulse and applied via the DATA FETCH line to signal the Buffer and Bus Control 1100 to initiate a second cycle of operation to read out the next halftone plot data byte.

Referring now to the timing diagram in FIG. 33, it is apparent that after the X skip value is decremented to a value of 0 that each alternate gated drum pulse is effective to produce a DATA FETCH pulse to signal the Buffer and Bus Control 1100 to initiate a cycle of operation of the Buffer 1200 to fetch the next byte of halftone plot data which is then passed to the scanner/plotter control unit and that each next succeeding alternate gated drum pulse is effective to produce the SAMPLE DATA pulse to sample the halftone plot data which is then passed to the head assembly for plotting on the document. Since it requires 2 drum pulses per data plot and since the drum moves in the X dimension at the rate of 1.1 mils per drum pulse, it should be apparent that a byte of halftone plot data is plotted every 2.2 mils on the document.

The plot process is repeated for each halftone plot data byte and continues until the plot count in the S/P byte counter 524 in FIG. 23D is decremented to a count of 0. Decoder 528 in FIG. 23E decodes this condition and applies a positive signal via the BYTE CNT=0 line to one input of the AND circuit 406 and to the inverter 903 in FIG. 23M where it is inverted to a negative signal to decondition the AND circuit 908. The AND circuit 908 in being deconditioned blocks any further gated drum pulse from being effective to turn on the WR flip flop 911. Consequently, at the end of the last plot cycle, when the WR flip flop 911 is turned off a positive signal is applied via the not WR line which in combination with the positive signal on the BYTE CNT=0 line conditions the AND circuit 406 in FIG. 23E. At the start of the next gated drum pulse, the AND circuit 902 is again rendered effective to apply a negative signal to the inverter 905 where it is inverted to a positive signal and applied to the AND circuit 908, which is now deconditioned by the negative signal on the not WR line, and to render the AND circuit 406 in FIG. 23E effective to apply a negative pulse to the END P line. The negative pulse on the END P line is applied to the OR circuit 420 which, in turn, applies a positive pulse to fire the single shot 422 to produce a negative pulse on the END S/P line. The negative pulse on the END S/P line is applied to the OR circuit 323 in FIG. 23A which, in turn, applies a positive pulse to the inverter 325 where it is inverted to a negative pulse to reset the INDEX flip flop 310. The INDEX flip flop 310 in being reset applies a negative signal from the upper output thereof to decondition the AND circuit 312 and thereby block further production of the gated drum pulses. The negative pulse on the END S/P line is also applied to the OR circuit 525 in FIG. 23E which, in turn, applies a positive pulse to the inverter 529 where it is inverted to a negative pulse to reset the SKIP CTR=0 flip flop 532. Additionally, the negative pulse on the END S/P line is also applied to reset the PLOT flip flop 404 in FIG. 23D to terminate the plot operation. Also, the negative pulse on the END S/P line is applied via the COMMON CONTROL BUS to signal the COMMON CTRL 1000 that the plot operation has been completed. COMMON CTRL 1000, in turn transmits a device end signal to the data processor to indicate that the execution of the write command has been completed.

Y Control - Plot Operation

At the end of the plot operation, COMMON CTRL 1000 applies a positive pulse via COMMON CONTROL BUS and the STAT RES DE line to the AND circuit 814 in the FIG. 23K which is presently conditioned by a positive signal on the PLOT MODE SW line. Accordingly, AND circuit 814 is rendered effective to apply a negative signal to load a bit in the high order stage of the Y CTR 820 in preparation for stepping the head assembly axially in the Y direction in accordance with a fixed count (32) prior to the next revolution of the drum when the next band of record plot data is to be plotted on document. The negative pulse from the AND circuit 814 is also applied to the OR circuit 815 which in turn applies a positive pulse to the inverter 816 where it is inverted to a negative pulse to turn on the SCAN/PLOT flip flop 828, the STEP CTR flip flop 832 and to reset CRT CTRL flip flop 836 to initiate the Y stepping operation in a manner as previously described in order to move the head assembly a fixed distance of 17.6 mils, which is the width of a plot band, in preparation for plotting the next band of record plot data.

At the end of the execution of the write command and while the head assembly is moving in the Y direction, the data processor transmits a second write command followed by another record block of halftone plot data to common control 1000. Common control 1000 again decodes the command and signals the Buffer and Bus Control 1100 to initiate a series of cycles of operation to load the record block of halftone plot data into the buffer 1200. After Buffer 1200 is loaded with the record block of halftone plot data, common control 1000 transmits a channel end signal to the data processor to indicate that the second band or record block of halftone plot data has been loaded in the Buffer 1200. If the head assembly is still moving in an axial direction the execution of the write command does not proceed until such time as a head stopped signal is received from the Y control, in a similar manner as previously described. When the head stopped signal is received or if it has already been received, execution of the write command is continued to plot the next band of halftone plot data on the document in the same manner as previously described with respect to the first write command. In a similar manner, by successive write commands, each followed by a fixed Y increment of the head assembly, the entire halftone reproduction is plotted on the document.

When the data processor determines the number of plot bands required to be plotted has been completed, a control drum stop command is next transmitted to the scanner/plotter control unit in order to stop the operation of the drum, in a manner as previously described, to effectively end the plot operation.

What is claimed is:

1. Apparatus for producing a halftone image reproduction of a continuous tone original image comprising:
   means scanning said original image along a series of scan lines to provide reflected light from continuous sets of concentric sharp and unsharp areas of said image,
   means responsive to said reflected light from said concentric areas to produce continuous sets of corresponding sharp and unsharp analog signals proportional to the light reflective density of said concentric areas,
   analog to digital conversion means receiving said sharp and unsharp analog signals,
   means providing a first set of incremental control parameter signals in accordance with a predetermined one of a series of reproduction ratios which vary from an enlargement to a reduction of said original image to define scan sample points on said series of scan lines,
   means responsive to said first set of incremental control parameter signals for controlling said analog to digital conversion means to produce successive sets of digital sharp and unsharp gray level data signals at said scan sample points proportional to the light reflective density of successive sets of concentric sharp and unsharp areas of said image at said scan sample points with the sharp area at each scan sample point corresponding to the general area of a predetermined portion of a halftone cell, means providing a second set of incremental control parameter signals in accordance with said predetermined one of said reproduction ratios to define the distance between succeeding scan lines, means responsive to said second set of incremental control parameter signals for positioning said scanning means to succeeding scan lines, means combining said successive sets of digital sharp and unsharp gray level data signals in a predetermined manner to produce a succession of digital resultant gray level data signals, means converting said succession of digital resultant gray level data signals to a succession of digital halftone data signals, and means responsive to said succession of digital halftone data signals for producing a halftone image reproduction corresponding to said continuous tone original image.

2. Apparatus as in claim 1 wherein said scanning means includes, means having a first set of apertures corresponding to different size sharp elemental areas of said original image, means having a second set of apertures corresponding to different size unsharp elemental areas of said original image concentric with said different size sharp elemental areas with the size of corresponding ones of said apertures of said first and second set being proportional to different ones of said series of reproduction ratios, means controlling said first and second aperture means to position corresponding apertures of said first and second aperture set in the path of the light reflected from elemental areas of said original image and producing signals identifying the corresponding apertures in the light path, means providing a control parameter signal identifying corresponding apertures of said first and second aperture set in accordance with said predetermined one of said reproduction ratios, and means enabling said aperture controlling means to successively position succeeding corresponding apertures of said first and second aperture set in the light path until a match is detected between the signal identifying the corresponding apertures in the light path and the control parameter signal so that the light reflective density from the concentric sharp and unsharp areas are proportional to said predetermined one of said reproduction ratios.

3. Apparatus as in claim 1 further comprising means providing an incremental control parameter signal defining the distance from a starting point to the first scan sample point of said series of scan lines, and means disabling said controlling means in accordance with said distance defining incremental control parameter signal until said first scan sample point is reached for each of said series of scan lines.

4. Apparatus according to claim 1 further comprising means providing an incremental control parameter signal defining the number of scan samples to be taken along each scan line, and means disabling said controlling means in accordance with said number defining incremental control parameter signal after a number of successive sets of digital sharp and unsharp gray level data signals is produced equal to the number defined by said number defining incremental control parameter signal.

5. Apparatus as in claim 1 further comprising means providing a digital data signal representing a sharpness factor having a predetermined value in accordance with the original image being scanned, and wherein said combining means combines said successive sets of digital sharp and unsharp gray level data signals in accordance with said digital sharpness factor data signal in a predetermined manner to produce said succession of digital resultant gray level data signals.

6. Apparatus as in claim 5 wherein the predetermined manner in which said combining means combines said successive sets of digital sharp and unsharp gray level data signals in accordance with said digital sharpness factor data signal to produce said succession of digital resultant gray level data signals is in a form expressed by $A+K(A-B)$ wherein A is the value of the digital sharp gray level data signal, B is the value of the digital unsharp gray level data signal and K is the value of the sharpness factor signal.

7. Apparatus as claimed in claim 1 wherein the sharp area at each scan sample point corresponds to the general area of a quadrant of a halftone cell.

8. Apparatus as in claim 1 wherein said halftone image reproduction means includes, storage means successively storing said succession of digital halftone data signals in record blocks of digital halftone data signals, means controlling said storage means to successively read out said record blocks of digital halftone data signals, photosensitive material, means for plotting digital halftone data signals on said photosensitive material, and means successively transferring said record blocks of digital halftone data signals from said storage means to said plotting means for producing said halftone image reproduction corresponding to said continuous tone original image.

9. Apparatus as in claim 8 wherein said photosensitive material is photographic film.

10. Apparatus as in claim 8 wherein said photosensitive material is photographic paper.

11. Apparatus as in claim 8 further comprising means providing an incremental control parameter signal defining the number of digital halftone data signals to be plotted for each of said record blocks of digital halftone data signals, and means controlling said plotting means in accordance with said number defining incremental control parameter signal to plot a number of digital halftone data signals equal to the number defined by said incremental control parameter signal.

12. Apparatus as in claim 8 further comprising, means providing an incremental control parameter signal to define a distance equal to the width of a digital halftone data signal plotted on said photosensitive material, and means responsive to said distance defining incremental control parameter signal for positioning said plotting means after each record block of digital halftone data signals is plotted to a position for plotting the next record block of halftone data signals adjacent to the preceding record block of halftone data signals.

13. Apparatus as in claim 8 further comprising means controlling said transferring means to invert the digital halftone data signals of said record blocks of digital halftone data signals for producing a negative image reproduction corresponding to said continuous tone original image.

14. Apparatus as in claim 8 further comprising means controlling said transferring means to permute the digital halftone data signals of said record blocks of digital halftone data signals for producing a permuted image reproduction corresponding to said continuous tone original image.

15. Apparatus as in claim 14 further comprising means controlling said transferring means to invert the permuted digital halftone data signals of said permuted record blocks of digital halftone data signals for producing a negative permuted image reproduction corresponding to said continuous tone original image.

16. In apparatus for producing a halftone image reproduction of a continuous tone original image a scanner controller comprising:

means scanning said original image along a series of scan lines to provide reflected light from continuous sets of concentric sharp and unsharp areas of said image, means responsive to said reflected light from said concentric areas to produce continuous sets of corresponding sharp and unsharp analog signals proportional to the light reflective density of said concentric areas, analog to digital conversion means receiving said sharp and unsharp analog signals, means providing a first set of incremental control parameter signals in accordance with a predetermined one of a series of reproduction ratios which vary from an enlargement to a reduction of said original image to define scan sample points on said series of scan lines, means responsive to said first set of incremental control parameter signals for controlling said analog to digital conversion means to produce successive sets of digital sharp and unsharp gray level data signals at said scan sample points proportional to the light reflective density of successive sets of concentric sharp and unsharp areas of said image at said scan sample points with the sharp area of each scan sample point corresponding to the general area of a predetermined portion of a halftone cell, means providing a second set of incremental control parameter signals in accordance with said predetermined one of said reproduction ratios to define the distance between succeeding scan lines, means responsive to said second set of incremental control parameter signals for positioning said scanning means to succeeding scan lines, and means combining said successive sets of digital sharp and unsharp gray level data signals in a predetermined manner to produce a succession of digital resultant gray level data signals each corresponding to a predetermined portion of a halftone cell.

17. In apparatus for producing a halftone image reproduction of a continuous tone original image a scanner controller comprising:

means scanning said original image along a series of scan lines which repeats every four scan lines to provide reflected light from continuous sets of concentric sharp and unsharp areas of said image, means responsive to said reflected light from said concentric areas to produce continuous sets of corresponding sharp and unsharp analog signals proportional to the light reflective density of said concentric areas, analog to digital conversion means receiving said sharp and unsharp analog signals, means providing a first incremental control parameter signal in accordance with a predetermined one of a series of reproduction ratios which vary from an enlargement to a reduction of said original image to define a Y major distance between scan lines, means providing a second incremental control parameter signal in accordance with said predetermined one of said reproduction ratios to define a Y minor distance between scan lines, means controlling said scanning means in accordance with said first and second incremental control parameter signals so that successive scan lines are alternately taken at said Y minor and Y major distances, means providing a third incremental control parameter signal in accordance with said predetermined one of said reproduction ratios to define an X major distance between scan sample points, means providng a fourth incremental control parameter signal in accordance with said predetermined one of said reproduction ratios to define a X minor distance between scan sample points, means controlling said analog to digital conversion means to produce successive sets of digital sharp and unsharp gray level data signals at said scan sample points along each scan line proportional to the light reflective density of successive sets of concentric sharp and unsharp areas of said image at said scan sample points with the sharp area at each scan sample point corresponding to the general area of a quadrant of a halftone cell, said controlling means effective while said scanning means scans each first and fourth scan line of said series of scan lines to successively control said analog to digital conversion means in accordance with said third and fourth incremental control parameter signals so that successive scan samples are alternately taken at said X major and X minor distances, means providing a fifth incremental control parameter signal in accordance with said predetermined one of said reproduction ratios to define a slip distance in the scan direction by which the first scan sample point of each second and third scan line is offset from the first scan sample point of each first and fourth scan line of said series of scan lines, means effective while said scanning means scans each second and third scan line of said series of scan lines to disable said conversion controlling means in accordance with said fifth incremental control parameter signal so that the first scan sample for the second and third scan line of said series of scan lines is taken at said slip distance, said conversion controlling means effective thereafter while said scanning means scans each second and third scan line of said series of scan lines to successively control said analog to digital conversion means in accordance with said fourth and third incremental control parameter signals so that successive scan samples are alternately taken at said X minor and X major distances, and means combining said successive sets of digital sharp and unsharp gray level data signals in a predetermined manner to produce a succession of digital resultant gray level data signals each corresponding to a quadrant of a halftone cell.

18. Apparatus as in claim 17 further comprising means providing a sixth incremental control parameter signal defining a skip distance from a starting point to the first scan sample point of said series of scan lines, and means disabling said conversion controlling means in accordance with said sixth incremental control parameter signal until said first scan sample point is reached by said scanning means for each scan line.

19. A method of producing a halftone image reproduction of a continuous tone original image comprising the steps of:

scanning said original image along a series of scan lines to provide reflected light from continuous sets of concentric sharp and unsharp areas of said image, producing continuous sets of corresponding sharp and unsharp analog signals proportional to the light reflective density of said concentric areas, providing analog to digital conversion for said sharp and unsharp analog signals, providing a first set of incremental control parameter signals in accordance with a predetermined one of a series of ratios which may vary from an enlargement to a reduction of said original image to define scan sample points for each of said series of scan lines, controlling said analog to digital conversion in accordance with said first set of incremental control parameter signals to produce successive sets of digital sharp and unsharp gray level data signals at said scan sample points proportional to the light reflective density of successive sets of concentric sharp and unsharp areas of said image at said scan sample points with the sharp area at each scan sample point corresponding to the general area of a predetermined portion of a halftone cell, providing a second set of incremental control parameter signals in accordance with said predetermined one of said reproduction ratios to define the distance between succeeding scan lines, controlling the positioning of said scanning at succeeding scan lines in accordance with said second set of incremental control parameter signals, combining said succesive sets of digital sharp and unsharp gray level data signals in a predetermined manner to produce a succession of digital resultant gray level data signals, converting said succession of digital resultant gray level data signals to a succession of digital halftone data signals, and producing a halftone image reproduction corresponding to said continuous tone original image from said succession of digital halftone data signals.

20. In a system for producing a halftone image reproduction of a continuous tone original image a method of scanning the original image comprising the steps of:

scanning said original image along a series of scan lines to provide reflected light from continuous sets of concentric sharp and unsharp areas of said image, producing continuous sets of corresponding sharp and unsharp analog signals proportional to the light reflective density of said concentric areas, providing analog to digital conversion for said sharp and unsharp analog signals, providing a first set of incremental control parameter signals in accordance with a predetermined one of a series of reproduction ratios which vary from an enlargement to a reduction of said original image to define scan sample points on said series of scan lines, controlling said analog to digital conversion in accordance with said first set of incremental control parameter signals to produce successive sets of digital sharp and unsharp gray level data signals at said scan sample points proportional to the light reflective density of successive sets of concentric sharp and unsharp areas of said image at said scan sample points with the sharp area at each scan sample point corresponding to the quadrant of a halftone cell, providing a second set of incremental control parameter signals in accordance with said predetermined one of said reproduction ratios to define the distance between succeeding scan lines, controlling the positioning of said scanning at succeeding scan lines in accordance with said second set of incremental control parameter signals, and combining said successive sets of digital sharp and unsharp gray level data signals in a predetermined manner to produce a succession of digital resultant gray level data signals each corresponding to a quadrant of halftone cell.

* * * * *